United States Patent
Moriyama et al.

(10) Patent No.: US 12,050,328 B2
(45) Date of Patent: Jul. 30, 2024

(54) LIGHT BEAM EMISSION SYSTEM

(71) Applicant: Panasonic Intellectual Property Corporation of America, Torrance, CA (US)

(72) Inventors: Tsuyoshi Moriyama, Osaka (JP); Kohei Noma, Osaka (JP); Hideki Aoyama, Osaka (JP); Mitsuaki Oshima, Kyoto (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 18/376,257

(22) Filed: Oct. 3, 2023

(65) Prior Publication Data
US 2024/0027660 A1    Jan. 25, 2024

Related U.S. Application Data

(63) Continuation of application No. 17/599,640, filed as application No. PCT/JP2020/013944 on Mar. 27, 2020.
(Continued)

(30) Foreign Application Priority Data
Aug. 29, 2019   (JP) .................................. 2019-156481

(51) Int. Cl.
*F21V 8/00*    (2006.01)
*B05B 7/16*    (2006.01)
*G02B 5/02*    (2006.01)

(52) U.S. Cl.
CPC .......... *G02B 5/0273* (2013.01); *B05B 7/1606* (2013.01); *G02B 6/0086* (2013.01); *G02B 6/0096* (2013.01)

(58) Field of Classification Search
CPC .. G02B 5/0273; G02B 6/0086; G02B 6/0096; G02B 6/0008; G02B 6/0006;
(Continued)

(56) References Cited

U.S. PATENT DOCUMENTS

RE45,980 E  *  4/2016  Ohnishi ................ G08C 17/00
2008/0223953 A1   9/2008  Tomono et al.
(Continued)

FOREIGN PATENT DOCUMENTS

JP   2015-179130   10/2015
RU   137598        2/2014

OTHER PUBLICATIONS

International Search Report (ISR) from International Searching Authority (Japan Patent Office) in International Pat. Appl. No. PCT/JP2020/013944, dated Jun. 9, 2020, together with an English language translation.
(Continued)

*Primary Examiner* — Donald L Raleigh
(74) *Attorney, Agent, or Firm* — Greenblum & Bernstein, P.L.C.

(57) ABSTRACT

A light beam emission system includes a blower that forms a flow path in which aerosol flows, an emitter that emits a laser beam, and a light guide that guides the laser beam to the flow path in which the aerosol flows. The light guide is hollow, and at least a part of the laser beam passing through the light guide and guided to the flow path propagates along the flow path of the aerosol.

8 Claims, 45 Drawing Sheets

Related U.S. Application Data

(60) Provisional application No. 62/833,412, filed on Apr. 12, 2019, provisional application No. 62/826,418, filed on Mar. 29, 2019.

(58) Field of Classification Search
CPC .. G02B 5/0284; G02B 5/0278; B05B 7/1606; B05B 7/2486; B05B 7/2491; B05B 7/0012; B05B 17/06; G03B 21/608
See application file for complete search history.

(56) References Cited

U.S. PATENT DOCUMENTS

| | | | |
|---|---|---|---|
| 2010/0321478 A1* | 12/2010 | Sliwa | G03B 21/562 |
| | | | 348/51 |
| 2014/0263740 A1 | 9/2014 | Esaki et al. | |
| 2018/0353632 A1 | 12/2018 | Divisi | |
| 2019/0128490 A1* | 5/2019 | Boucher | B05B 7/0012 |
| 2024/0027660 A1* | 1/2024 | Moriyama | G02B 6/0086 |

OTHER PUBLICATIONS

Fomenko et al., English Language Translation of Russian Pub. No. 137598 (Year: 2014).

\* cited by examiner

FIG. 5A

When amount of aerosol spouted is 9,000 (cc/h)

| Length H (cm) | 0.0 | 0.5 | 1.0 | 1.5 | 2.0 | 2.5 | 3.0 | 3.5 | 4.0 | 4.5 | 5.0 | 5.5 |
|---|---|---|---|---|---|---|---|---|---|---|---|---|
| Whether light beam is made visible | × | × | × | ○ | ○ | ○ | ○ | ○ | ○ | ○ | × | × |

○: Vis

FIG. 5B

When amount of aerosol spouted is 18,000 (cc/h)

| Length H (cm) | 0.0 | 0.5 | 1.0 | 1.5 | 2.0 | 2.5 | 3.0 | 3.5 | 4.0 | 4.5 | 5.0 | 5.5 |
|---|---|---|---|---|---|---|---|---|---|---|---|---|
| Whether light beam is made visible | × | × | × | × | × | ○ | ○ | ○ | ○ | ○ | ○ | × |

○:

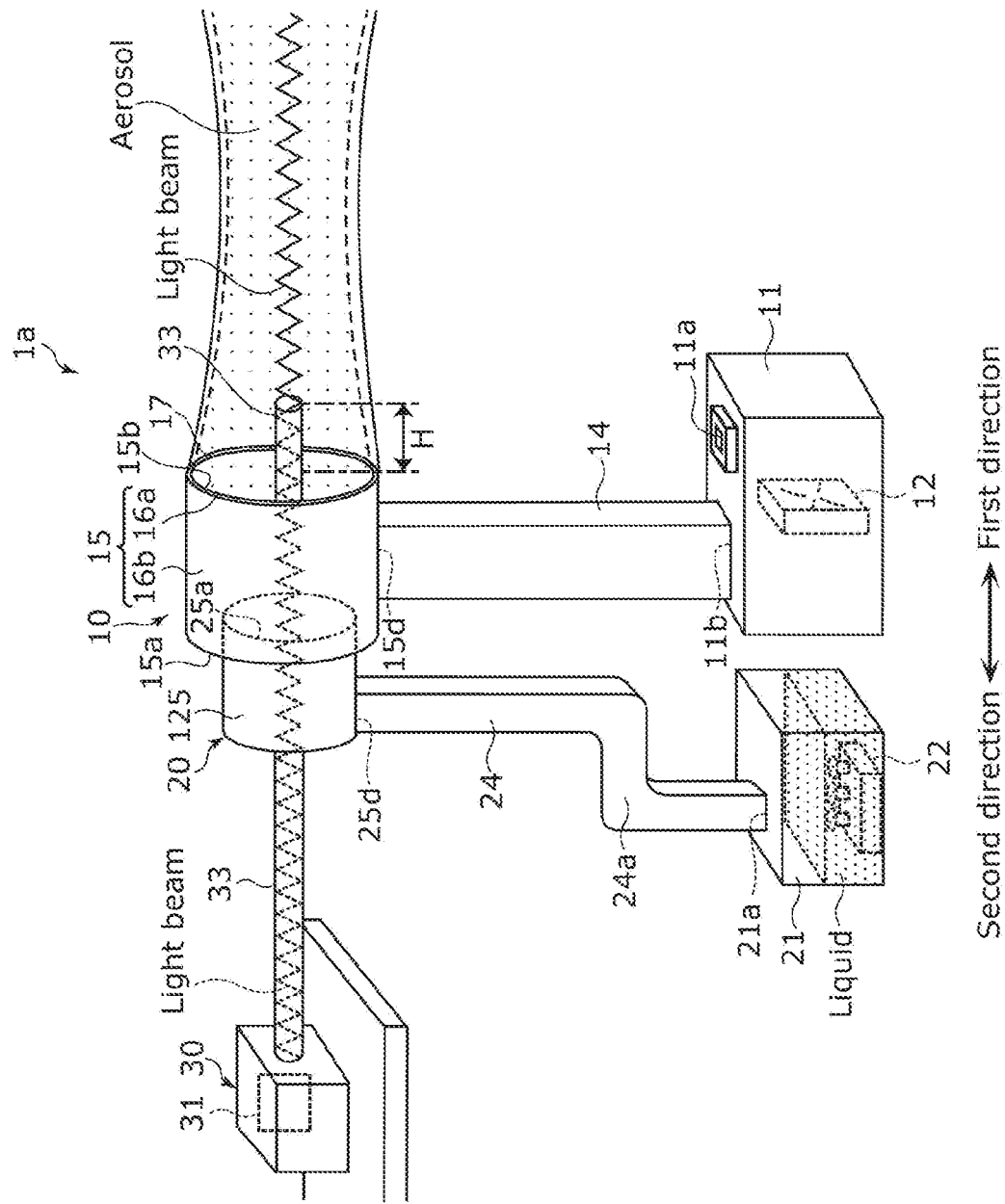

Light beam
Aerosol

Liquid

Second direction ⟵⟶ First direction b

430  Liquid  420  10                 1d
       424

Aerosol
Light beam

Second direction ⟵⟶ First direction

FIG. 27
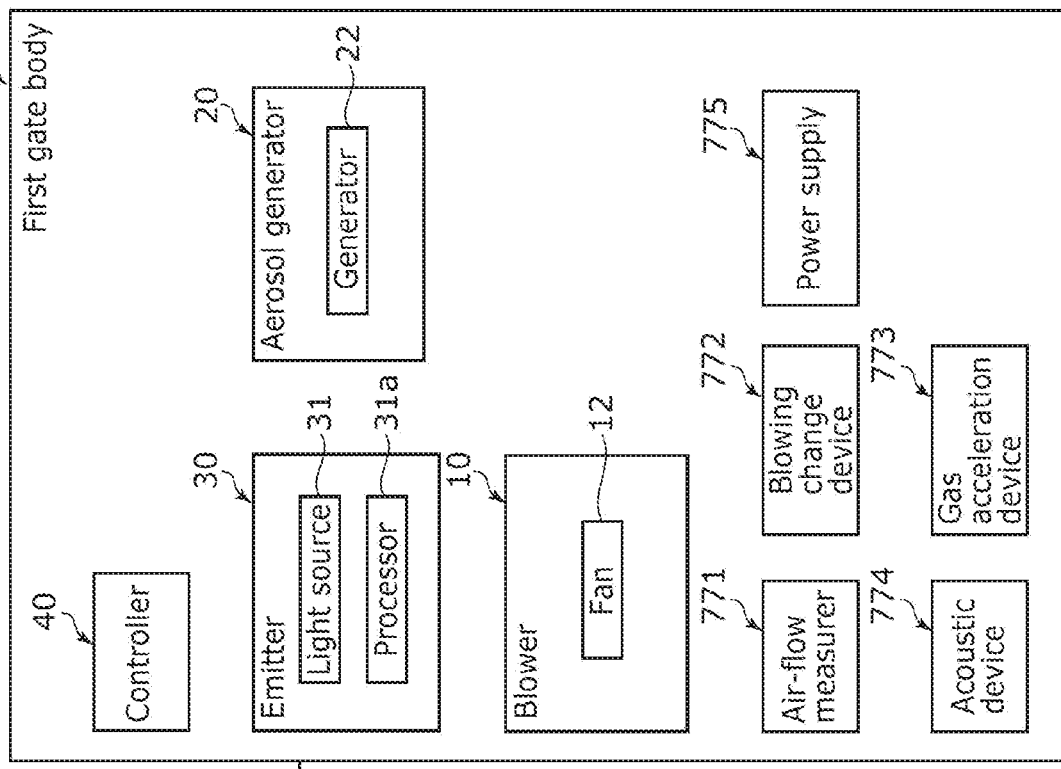
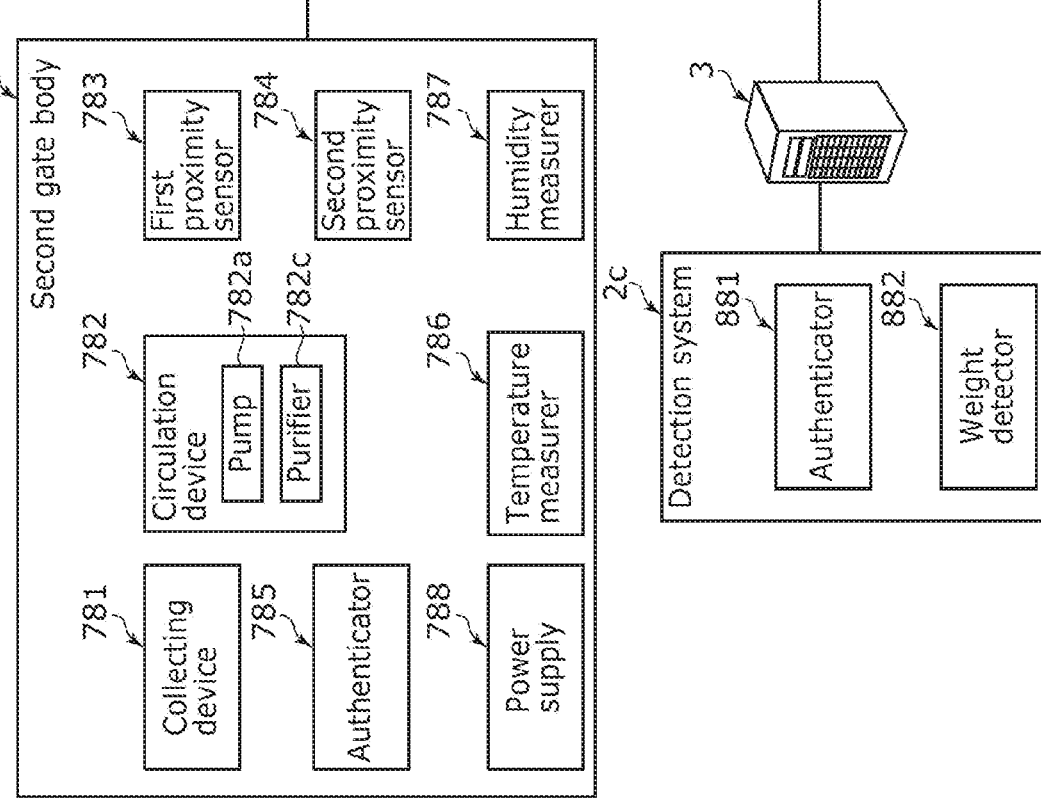

```
                    Start
                      │
                      ▼
        ┌─────────────────────────────┐
        │ Detect approaching object that │──S181
        │ approaches pair of gate bodies │
        └─────────────────────────────┘
                      │
                      ▼
        ┌─────────────────────────────┐
        │ Check whether approaching   │──S182
        │ object can be permitted to pass │
        └─────────────────────────────┘
                      │
                      ▼
              ◇ Is passing permitted? ◇──S183
                   Yes │ No
                       │ └──────────────────┐
                       │                    ▼
                       │          ┌──────────────────────┐
                       │          │ Form flow paths in which │──S184
                       │          │ aerosol flows in first   │
                       │          │ direction                │
                       │          └──────────────────────┘
                       │                    │
                       │                    ▼
                       │          ┌──────────────────────┐
                       │          │ Emit light beams along │──S185
                       │          │ aerosol                │
                       │          └──────────────────────┘
                       │                    │
                       │                    ▼
                       │          ┌──────────────────────┐
                       │          │ Stop emitting light   │──S186
                       │          │ beams                 │
                       │          └──────────────────────┘
                       │                    │
                       │                    ▼
                       │          ┌──────────────────────┐
                       │          │ Stop forming flow paths │──S187
                       │          │ in which aerosol flows  │
                       │          └──────────────────────┘
                       │                    │
                       ◄────────────────────┘
                       ▼
                     End
```

FIG. 37

```
Start
  ↓
Detect approaching object that        ~S181
approaches pair of gate bodies
  ↓
Is direction in which                 ~S192
approaching object         ──No──┐
moves toward gate body?          │
  │Yes                           │
Form flow paths in which   ~S184 │
aerosol flows in first direction │
  ↓                              │
Emit light beams along aerosol ~S185
  ↓                              │
Stop emitting light beams  ~S186 │
  ↓                              │
Stop forming flow paths in ~S187 │
which aerosol flows              │
  ↓←───────────────────────────── ┘
End
```

FIG. 38
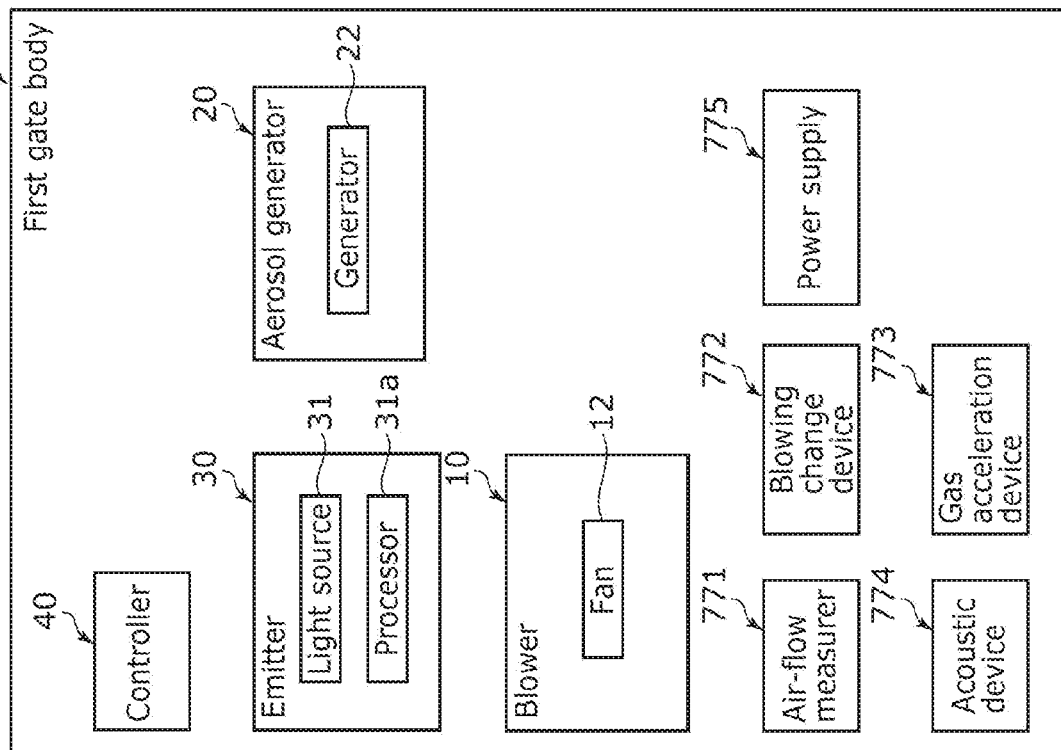
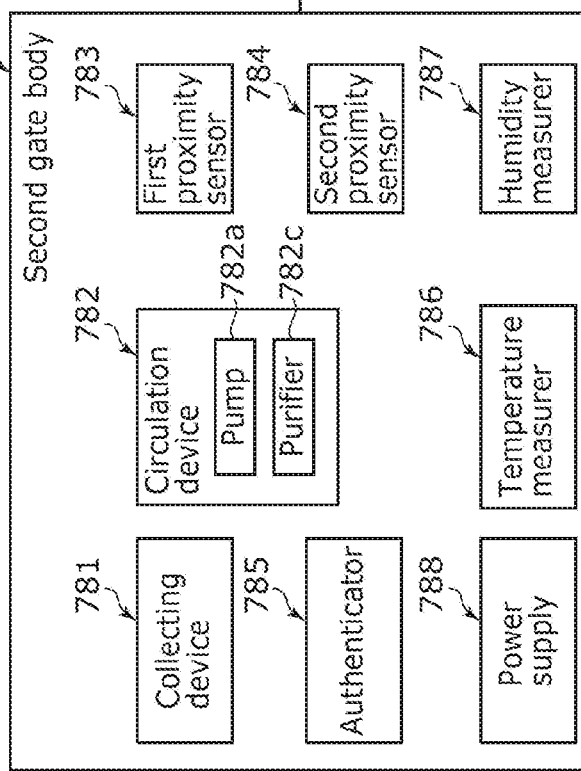
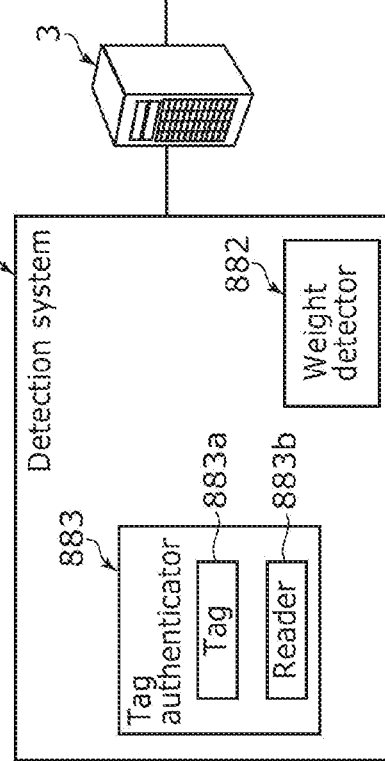

LIGHT BEAM EMISSION SYSTEM

CROSS-REFERENCE TO RELATED APPLICATIONS

This is a continuation of U.S. patent application Ser. No. 17/599,640, filed Sep. 29, 2021, which is a National Stage Entry of International Pat. Appl. No. PCT/JP2020/013944, filed Mar. 27, 2020, which claims the benefit of U.S. Provisional Patent Appl. No. 62/833,412, filed Apr. 12, 2019, the benefit of U.S. Provisional Patent Appl. No. 62/826,418, filed Mar. 29, 2019, and priority to Japanese Patent Appl. No. 2019-156481, filed Aug. 29, 2019. The entire disclosure of each of the above-identified documents is incorporated herein by reference in its entirety.

TECHNICAL FIELD

The present disclosure relates to a light beam emission system.

BACKGROUND ART

A conventional projection system that is disclosed includes a discharge control means that discharges mist into an image projection space, and a projection means that projects an image onto a screen (see Patent Literature (PTL) 1, for example).

CITATION LIST

Patent Literature

[PTL 1] Japanese Unexamined Patent Application Publication No. 2015-179130

SUMMARY OF INVENTION

Technical Problem

However, with such a conventional projection system, it is difficult to make a boundary surface uniformly flat that is located between an area in which mist that is an example of aerosol is diffused and an area in which mist is not diffused. An image that is an example shown using a light beam projected onto mist depends on the shape of the interface, and thus such a rough boundary surface is less likely to allow light used to show the image to be clearly perceived.

In view of this, an object of the present disclosure is to provide a light beam emission system that allows a light beam to be clearly perceived.

Solution to Problem

In order to achieve the above object, an aspect of a light beam emission system according to the present disclosure includes: a blower that forms a flow path in which aerosol flows; and an emitter that emits a light beam. At least part of the light beam propagates along the flow path of the aerosol.

Note that these general and specific aspects may be implemented using a system, a method, an integrated circuit, a computer program, or a computer-readable recording medium such as a CD-ROM, or any combination of systems, methods, integrated circuits, computer programs, or recording media.

Advantageous Effects of Invention

The light beam emission system according to the present disclosure allows a light beam to be clearly perceived.

BRIEF DESCRIPTION OF DRAWINGS

FIG. 5A illustrates results of viewing and checking whether a light beam can be made visible while changing a protrusion length of the light guide from a second opening when the amount of aerosol spouted is 9000 (cc/h).

FIG. 5B illustrates results of viewing and checking whether a light beam can be made visible while changing the protrusion length of the light guide from the second opening when the amount of aerosol spouted is 18000 (cc/h).

FIG. 6 is a perspective view illustrating a light beam emission system according to a variation of Embodiment 1.

FIG. 7 is a cross sectional view illustrating the light beam emission system according to the variation of Embodiment 1 when the light beam emission system is cut in the first direction.

Figure 10:
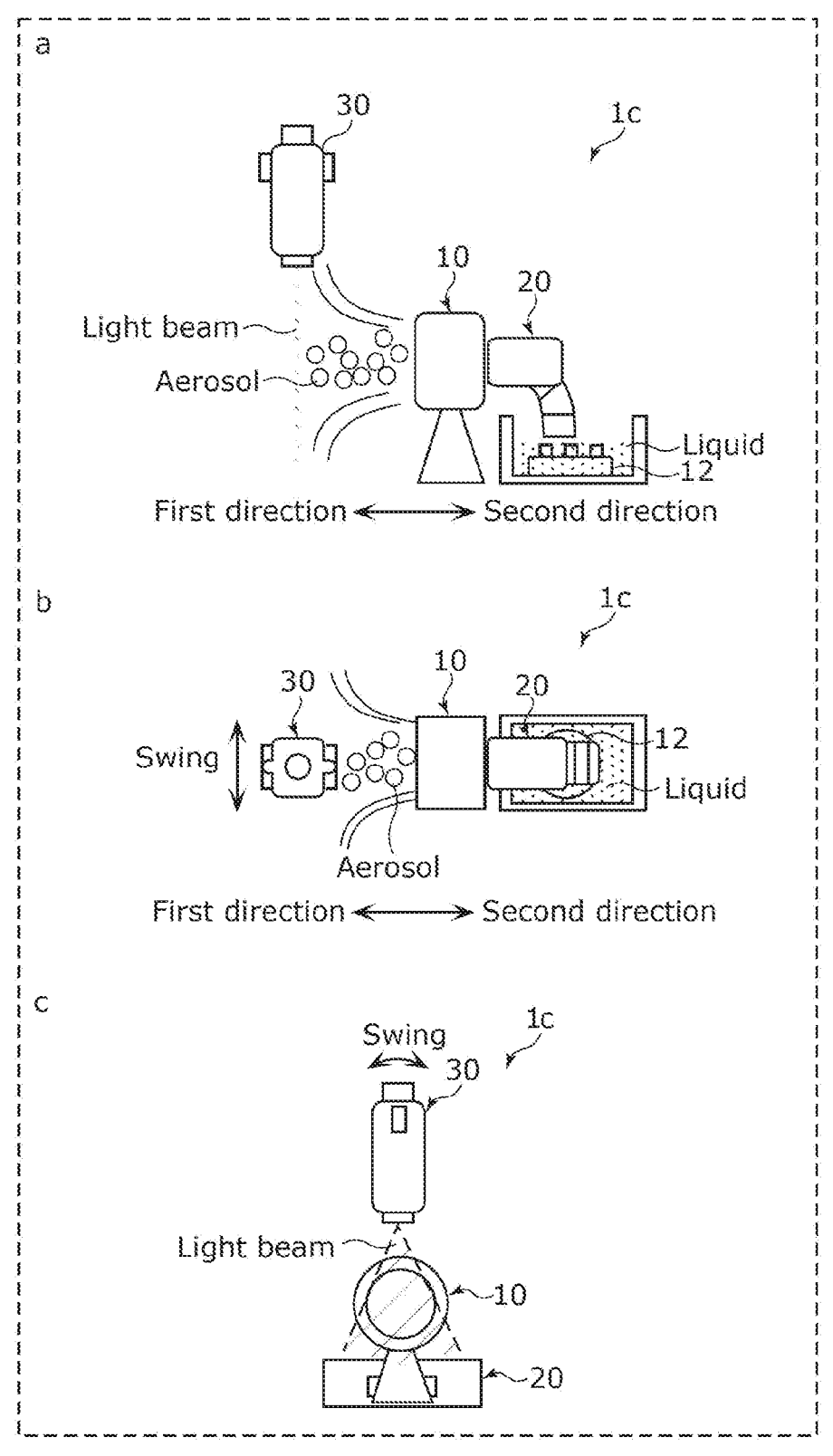

FIG. 10 is a schematic view illustrating the light beam emission system according to Embodiment 3.

FIG. 12 is a schematic diagram illustrating the light beam emission system according to Embodiment 4.

FIG. 14 illustrates the case where an image according to image information is displayed on a display surface formed by flow paths in which aerosol flows.

FIG. 16 illustrates the case where aggregates of aerosol according to image information are discharged onto a display surface formed by flow paths in which aerosol flows while an emitter is off.

FIG. 19 is a schematic diagram illustrating a light beam emission system according to Embodiment 5.

Figure 22:
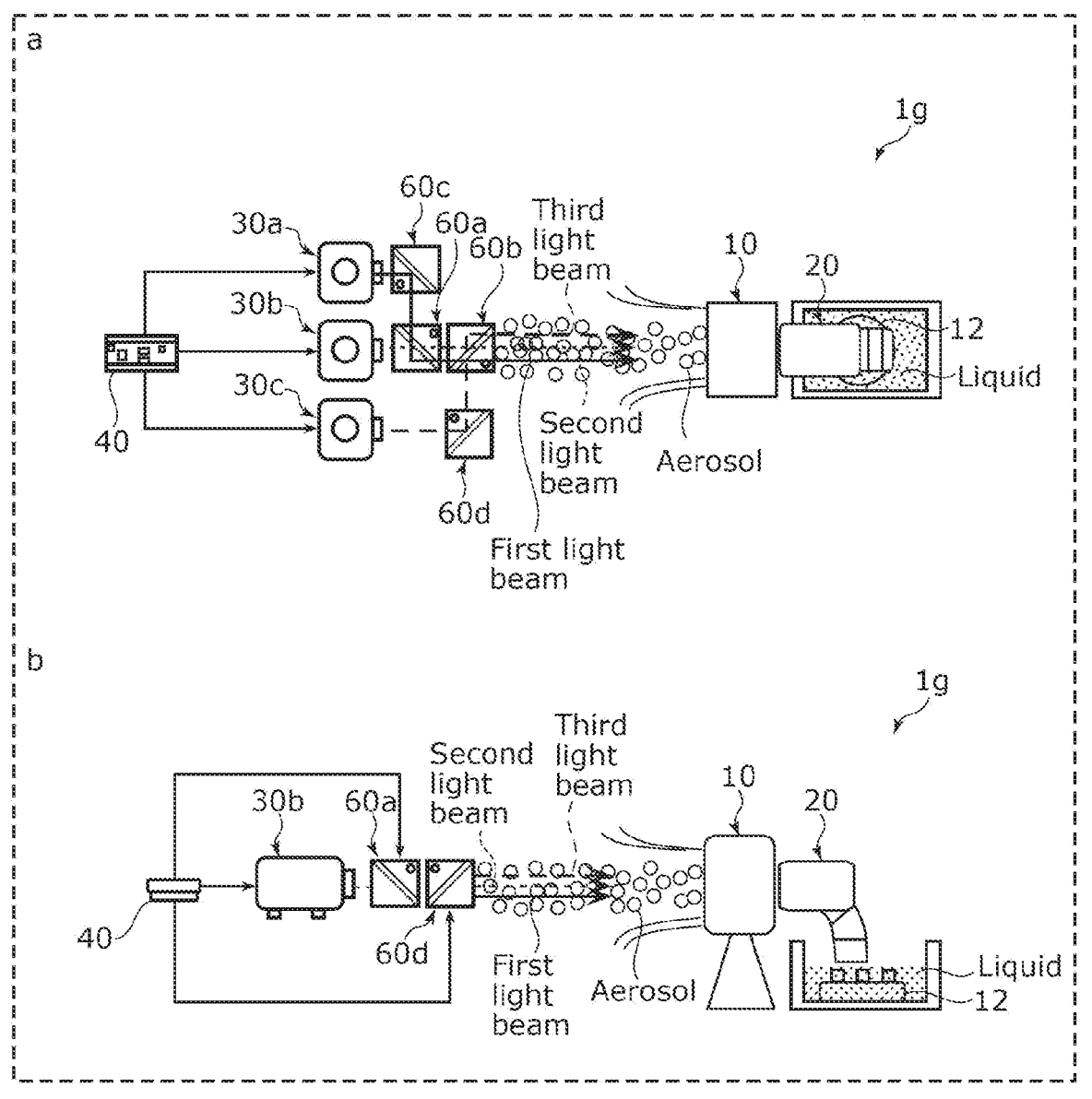

FIG. 22 is a schematic diagram illustrating the case where four beam splitters are used in the light beam emission system according to Embodiment 6.

FIG. 27 is a block diagram illustrating a light beam emission system according to Embodiment 8.

FIG. 32 is a schematic diagram illustrating a state in which the light beam emission system according to Embodiment 8 is disposed on a T-intersection.

FIG. 36 is a flowchart showing Example 1 of operation of the light beam emission system according to Embodiment 8.

FIG. 37 is a flowchart showing Example 2 of operation of the light beam emission system according to Embodiment 8.

FIG. 38 is a block diagram illustrating a light beam emission system according to a variation of Embodiment 8.

DESCRIPTION OF EMBODIMENTS

Figure 1:
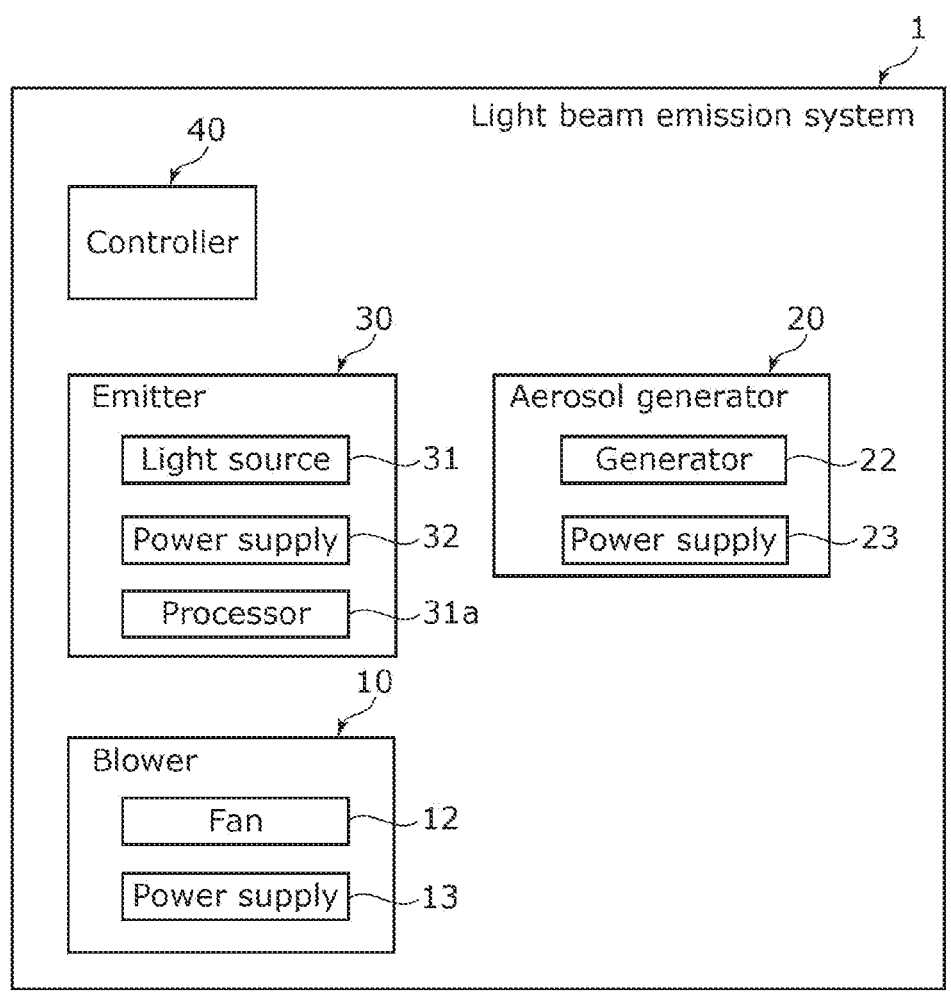
FIG. 1 is a block diagram illustrating a light beam emission system according to Embodiment 1.

A light beam emission system according to the present disclosure includes: a blower that forms a flow path in which aerosol flows; and an emitter that emits a light beam. At least part of the light beam propagates along the flow path of the aerosol.

According to this, since a light beam is emitted onto aerosol flowing along the flow path, the emitted light beam can be caused to appear. Stated differently, diffusion of a light beam in aerosol causes the flow path in which the aerosol flows to give off light, thus allowing the light beam to be readily perceived even in a bright space.

Accordingly, the light beam emission system allows a light beam to be clearly perceived.

In particular, a light beam can be perceived from any direction, and thus the place where the light beam emission system is installed is not limited.

In the light beam emission system according to another aspect of the present disclosure, the aerosol includes mist.

According to this, since aerosol is mist, a light beam can be readily made visible.

In the light beam emission system according to another aspect of the present disclosure, the blower causes the aerosol to flow in a first direction, and the at least part of the light beam propagates along the first direction.

According to this, the emitter can emit a light beam in a direction similar to the first direction in which the blower causes aerosol to flow. Thus, the emitter can be disposed near the blower, and thus the area for disposing the light beam emission system is less likely to increase.

In the light beam emission system according to another aspect of the present disclosure, the blower causes the aerosol to flow in a first direction, and the at least part of the light beam propagates along a second direction opposite the first direction.

According to this, even if the emitter is disposed in a position spaced apart from the blower, a light beam can be clearly perceived. Furthermore, the disposition of the emitter can be given a high degree of freedom.

In the light beam emission system according to another aspect of the present disclosure, a direction in which the at least part of the light beam propagates coincides with the first direction.

According to this, a light beam is emitted in a direction along and coinciding with the direction in which aerosol flows, and thus a light beam can be maintained visible over a longer distance.

In the light beam emission system according to another aspect of the present disclosure, a direction in which the at least part of the light beam propagates coincides with the second direction.

The light beam emission system can also achieve operations and effects similar to the above.

In the light beam emission system according to another aspect of the present disclosure, an angle between the first direction and a direction in which the at least part of the light beam propagates is less than or equal to 15 degrees.

For example, if the angle between the first direction and the direction in which at least part of a light beam propagates is greater than 15 degrees, most of the light beam is radiated from the aerosol flowing in the flow path, so that the light beam cannot be maintained visible over a long distance. However, according to the present disclosure, a light beam propagates along the flow path of aerosol, and thus the light beam can be maintained visible over a longer distance.

In the light beam emission system according to another aspect of the present disclosure, an angle between the second direction and a direction in which the at least part of the light beam propagates is less than or equal to 15 degrees.

For example, if the angle between the second direction and the direction in which at least part of a light beam propagates is greater than 15 degrees, most of the light beam is radiated from the aerosol flowing in the flow path, so that the light beam cannot be maintained visible over a long distance. However, according to the present disclosure, since a light beam propagates along the flow path of aerosol, and thus the light beam can be maintained visible over a longer distance.

In the light beam emission system according to another aspect of the present disclosure, the at least part of the light beam emitted is scattered and made visible by the aerosol.

According to this, aerosol diffuses a light beam, which ensures that a user perceives the light beam.

In the light beam emission system according to another aspect of the present disclosure, the blower includes: a first barrel that includes a first opening through which the aerosol is sucked along an air current, and a second opening from which the aerosol sucked through the first opening is discharged to the flow path; and a fan that generates the air current in the first barrel.

According to this, a flow path of aerosol can be formed in a direction extending from the first opening toward the second opening by an air current (wind) generated by the fan in the first barrel. Accordingly, if a light beam is emitted along the flow path, the light beam is diffused in the aerosol, so that the flow path in which the aerosol flows can be caused to give off light.

The light beam emission system according to another aspect of the present disclosure further includes: an aerosol generator that generates the aerosol.

According to this, aerosol can be readily generated.

In the light beam emission system according to another aspect of the present disclosure, the aerosol generator includes: a container in which a liquid is stored; and at least one of a heater that generates the aerosol by heating the liquid, an ultrasonic vibrator that vibrates the liquid, or a fan that sends a gas to the liquid.

According to this, aerosol can be readily generated from a liquid.

In the light beam emission system according to another aspect of the present disclosure, the blower includes: a fan that forms the flow path in which the aerosol flows by generating an air current; and a first barrel that includes a first opening through which the aerosol is sucked along the air current, and a second opening from which the aerosol sucked through the first opening is discharged to the flow path, and the aerosol generator includes a second barrel that guides the aerosol to the first opening.

According to this, a flow path extending from the first opening toward the second opening is formed, so that aerosol generated by the aerosol generator can be readily put on the flow path (caused to flow) from the first opening. Accordingly, a flow path of aerosol can be readily formed.

In the light beam emission system according to another aspect of the present disclosure, the blower includes: a fan that forms the flow path in which the aerosol flows by generating an air current; and a first barrel that includes a first opening through which a gas is sucked, and a second opening from which the gas sucked through the first opening is discharged, the aerosol generator includes a second barrel that guides the aerosol to the flow path, and the second barrel is inserted from the first opening, and held, being spaced apart from the first barrel.

According to this, an air current from the first opening toward the second opening is generated between the first barrel and the second barrel by the blower, and a flow path is formed. Thus, the air current forms a flow path that surrounds the second barrel, and thus the aerosol guided by and discharged from the second barrel forms a flow path. Accordingly, aerosol can be caused uniformly flow along the flow path.

In the light beam emission system according to another aspect of the present disclosure, the first barrel is a double-wall barrel that includes: an inner barrel that defines the first opening and the second opening; and an outer barrel that is connected to the inner barrel at an end at the first opening, and covers an outer circumference of the inner barrel such that a space is formed between the inner barrel and the outer barrel, and the first barrel defines the space and a third opening between the inner barrel and the outer barrel, the space being a space into which a gas sent by the fan flows, the third opening being an opening from which the gas that flows into the space is discharged.

According to this, an air current flowing from the third opening in the first direction is generated, and thus an air current flowing from the first opening toward the second opening can be generated by the Coanda effect on the inner circumferential side of the inner barrel. According to this, an air current having a force greater than or equal to the force of the air current generated by the fan can be generated from the first barrel.

In the light beam emission system according to another aspect of the present disclosure, the aerosol generator is located between the blower and the emitter.

According to this, aerosol generated by the aerosol generator can be readily caused to flow in the flow path generated by the blower.

In the light beam emission system according to another aspect of the present disclosure, the blower is located between the emitter and the aerosol generator.

According to this, the blower, the emitter, and the aerosol generator can be disposed close to one another, and thus the size of the light beam emission system is less likely to increase.

In the light beam emission system according to another aspect of the present disclosure, the emitter includes: one or more light sources that emit one or more light beams; and one or more light guides that guide, in one-to-one correspondence, the one or more light beams emitted by the one or more light sources to the aerosol, the one or more light guides being elongated.

According to this, a plurality of types of light beams having different wavelengths can be emitted using one or more light sources. Accordingly, by forming flow paths in which aerosol flows and causing the plurality of types of light beams to propagate along the flow paths, the flow paths in which aerosol flows can be made visible in a planarized manner.

Further, the color(s) of light beams that propagate along the flow paths in which aerosol flows can be changed by using light beams having different colors from a plurality of light sources, and thus how the flow paths in which aerosol flows are viewed can be changed.

In the light beam emission system according to another aspect of the present disclosure, the emitter includes a beam splitter that splits a first light beam into a first split light beam and a second split light beam, the first light beam being one of the one or more light beams emitted by the one or more light sources, the second split light beam having a wavelength different from a wavelength of the first split light beam.

According to this, a plurality of types of light beams having different wavelengths can be emitted using one light source. Accordingly, the color of a light beam propagating along the flow path in which aerosol flows can be changed, and thus how the flow path in which aerosol flows is viewed can be changed.

In the light beam emission system according to another aspect of the present disclosure, the first split light beam propagates along the flow path of the aerosol.

According to this, aerosol is irradiated with the first split light beam, and thus it can be ensured that the first split light beam is made visible.

In the light beam emission system according to another aspect of the present disclosure, the emitter includes an optical element that changes a direction of the second split light beam to a direction along the flow path of the aerosol.

According to this, aerosol is irradiated with the second split light beam, and thus it can be ensured that the second split light beam is made visible. Accordingly, the second split light has a color different from the color of the first split light beam so that the color of a light beam propagating along the flow path in which aerosol flows can be changed, and thus how the flow path in which aerosol flows is viewed can be changed.

In the light beam emission system according to another aspect of the present disclosure, the emitter includes: a light source that emits the light beam; and a light guide that guides the light beam emitted by the light source, the light guide being elongated, and the light guide passes through the first barrel from the first opening to the second opening, the light guide protruding from the second opening.

According to this, the light guide protruding from the second opening guides a light beam to the flow path in which aerosol flows, and thus attenuation of the light beam from the light source to this flow path can be reduced. In particular, the density of aerosol near the second opening is high, and thus excessive attenuation of a light beam due to the highly dense aerosol can be reduced. Accordingly, this ensures that a light beam is guided to aerosol, and thus it can be further ensured that a light beam propagating in the aerosol is perceived.

In the light beam emission system according to another aspect of the present disclosure, the one or more light sources are each a light emitting diode (LED) or a laser diode.

According to this, the light beam emission system can be readily achieved with use of an LED or a laser diode that are generally distributed.

In the light beam emission system according to another aspect of the present disclosure, the emitter further includes a processor that switches between emitting the light beam and stopping emitting the light beam.

According to this, a light beam that appears in aerosol can be viewed or not viewed.

The light beam emission system according to another aspect of the present disclosure further includes: a driver that swings the emitter.

According to this, a flow path in which aerosol flows can be irradiated with a planarized light beam, and thus the planarized light beam can be made visible.

A light beam emission system according to another aspect of the present disclosure includes: an aerosol generator that generates aerosol; a blower that forms a flow path in which the aerosol flows; a first emitter that emits a first light beam; an optical element that changes a direction in which the first light beam propagates to a direction along the flow path of the aerosol; and a second emitter that emits a second light beam. At least part of the second light beam propagates along the flow path of the aerosol.

According to this, since the first light beam and the second light beam are emitted onto aerosol flowing along the flow path, the emitted first and second light beams can be caused to appear. Stated differently, diffusion of a light beam in aerosol causes the flow path in which the aerosol flows to give off light, thus allowing the first and second light beams to be readily perceived even in a bright space.

Thus, the light beam emission system allows the first and second light beams to be clearly perceived.

In particular, the first and second light beams can be perceived from any direction, and thus the place where the light beam emission system is installed is not limited.

In the light beam emission system according to another aspect of the present disclosure, a wavelength of the first light beam is different from a wavelength of the second light beam.

According to this, a plurality of types of light beams can be caused to appear in aerosol. Accordingly, the color of a light beam propagating along the flow path in which aerosol flows can be changed using light beams having two or more colors, and thus how the flow path in which aerosol flows is viewed can be changed.

The following specifically describes embodiments with reference to the drawings.

Note that the embodiments described below each show a general or specific example. The numerical values, shapes, materials, elements, the locations and connection of the elements, steps, the processing order of the steps, and others indicated in the following embodiments are mere examples, and therefore are not intended to limit the present disclosure. Thus, among the elements in the following embodiments, elements not recited in any of the independent claims are described as arbitrary elements.

Further, the drawings are schematic diagrams, and do not necessarily provide strictly accurate illustration. In addition, the same numeral is given to the same structural member throughout the drawings. In the embodiments below, terms such as substantially parallel are used. For example, substantially parallel means not only completely parallel, but also generally parallel, so that the meaning includes an error of about several percent, for example. Furthermore, substantially parallel means being parallel in a range in which the present disclosure achieves advantageous effects of the present disclosure. The same applies to other expressions that include "substantially".

Embodiment 1

[Configuration: Light Beam Emission System 1]

Figure 2:
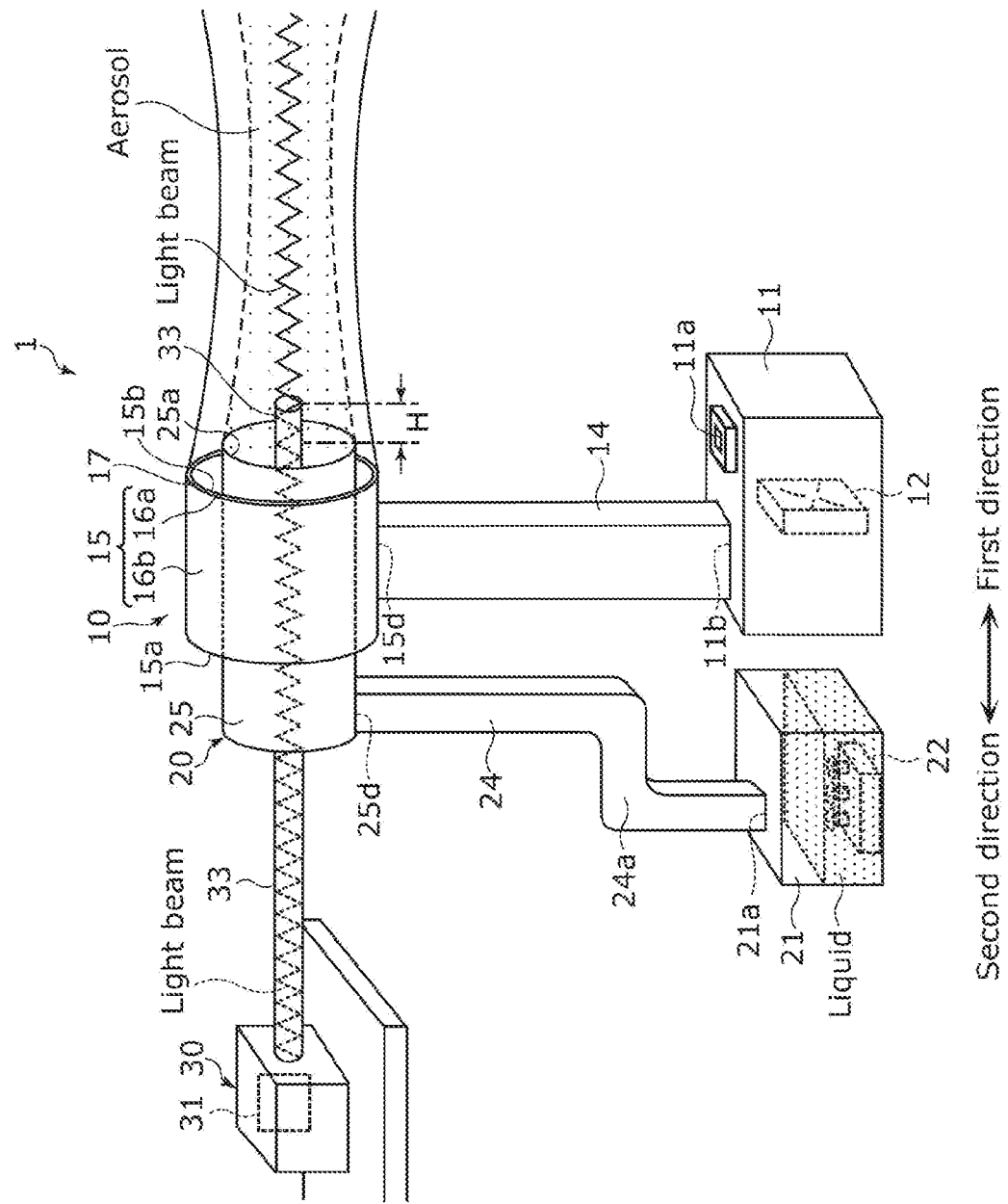
FIG. 2 is a perspective view illustrating the light beam emission system according to Embodiment 1.

FIG. 1 is a block diagram illustrating light beam emission system 1 according to Embodiment 1. FIG. 2 is a perspective view illustrating light beam emission system 1 according to Embodiment 1.

As illustrated in FIG. 1 and FIG. 2, light beam emission system 1 causes aerosol to flow in a gas flow path obtained by generating an air current, irradiates the flow path with a light beam so that the aerosol diffuses the light beam, and causes the flow path of the aerosol to appear. Here, aerosol is a mixture of a solid or a liquid as a disperse phase (also referred to as a dispersoid) and a gas as a continuous phase. Thus, aerosol indicates a mixture in which solid or liquid fine particles are dispersed and floating in a gas. Aerosol includes mist, for example. A gas is air in the present embodiment, but may be a gas other than air, such as oxygen or nitrogen. In the present embodiment, aerosol may include a reflective material that reflects light.

Light beam emission system 1 includes blower 10, aerosol generator 20, emitter 30, and controller 40.

<Blower 10>

Figure 3:
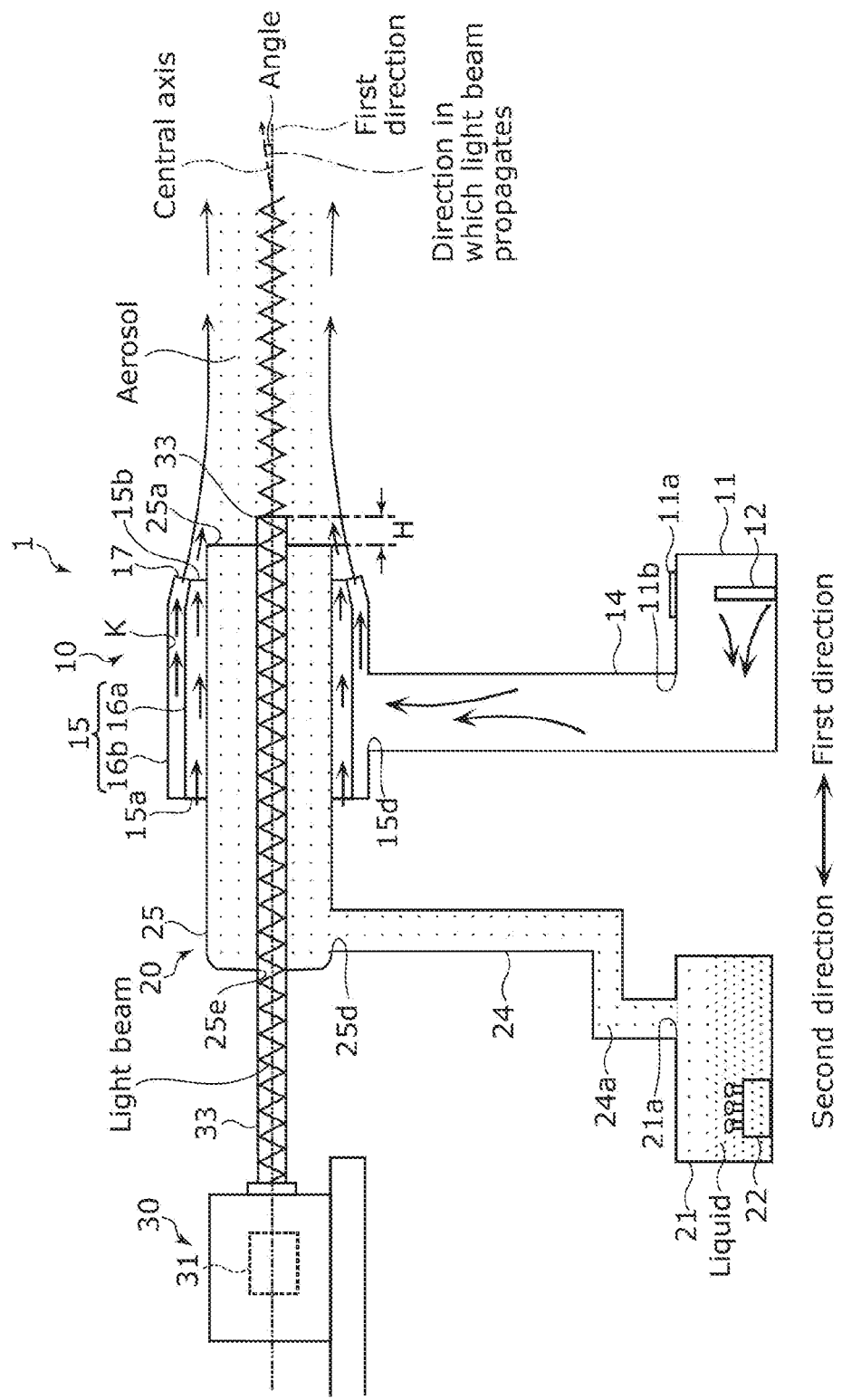
FIG. 3 is a cross sectional view illustrating the light beam emission system according to Embodiment 1 when the light beam emission system is cut in a first direction.

FIG. 3 is a cross sectional view illustrating light beam emission system 1 according to Embodiment 1 when light beam emission system 1 is cut in a first direction.

As illustrated in FIG. 2 and FIG. 3, blower 10 is an air-blowing device that generates an air current to form a flow path in which a gas flows in the first direction. Blower 10 generates a gas flow path to cause aerosol to flow in the flow path. Thus, blower 10 forms a flow path in which aerosol flows. The first direction is a blowing direction that indicates a direction in which blower 10 causes a gas to flow, and is frontward in the present embodiment. In the following, the first direction may be referred to as frontward.

Blower 10 is disposed frontward than aerosol generator 20 and emitter 30, or more specifically, is disposed immediately before aerosol generator 20. Frontward is a direction in which aerosol generator 20 discharges aerosol, and in which emitter 30 emits a light beam.

Blower 10 includes storage 11, fan 12, power supply 13 in FIG. 1, air guide 14, and first barrel 15.

Storage 11 is a casing that stores fan 12, and is placed on a placement surface such as ground or a floor. In the present embodiment, storage 11 is disposed vertically below first barrel 15. Note that storage 11 may not be disposed vertically below first barrel 15.

Inlet hole 11a and exhaust hole 11b are formed in storage 11. Inlet hole 11a is an opening formed in, for example, a position close to the front or a position in a lateral side of storage 11, and lets in a gas for fan 12 to send the gas. In the present embodiment, exhaust hole 11b is formed in the ceiling side of storage 11, and connected to air guide 14. Thus, exhaust hole 11b is an opening through which a gas discharged by fan 12 is guided to air guide 14.

Fan 12 lets in a gas through inlet hole 11a of storage 11 and lets out the gas through exhaust hole 11b, to generate an air current in blower 10. The air current generated by fan 12 is guided through exhaust hole 11b of storage 11 to air guide 14 and first barrel 15, and flows out of blower 10. Fan 12 forms a flow path in which aerosol flows by generating an air current. In the present embodiment, fan 12 is stored in storage 11 and placed so as to generate an air current toward exhaust hole 11b.

Fan 12 adjusts the air volume when fan 12 obtains a control command from controller 40. Thus, fan 12 can increase and decrease the air volume by being controlled by controller 40.

As illustrated in FIG. 1, power supply 13 is a power module that supplies power for driving fan 12. Power supply 13 provides and stops power supply to fan 12 by being controlled by controller 40.

As illustrated in FIG. 2 and FIG. 3, air guide 14 is an elongated pipe extending in a vertical direction, which guides an air current generated by fan 12 upward. Air guide 14 is fixed such that a lower end in the vertical direction that is one end is connected to exhaust hole 11b of storage 11, surrounding exhaust hole 11b. Further, air guide 14 is fixed such that an upper end in the vertical direction that is another end is connected to connection hole 15d of first barrel 15.

First barrel 15 generates a flow path in which aerosol flows in the first direction by causing an air current generated by fan 12 to flow in the first direction. Thus, first barrel 15 is an air sending body that can define a direction of the flow path. Connection hole 15d is formed in the circumferential lateral surface of first barrel 15, and an air current generated by fan 12 flows inside first barrel 15 through connection hole 15d via air guide 14.

First barrel 15 is connected to and fixed at the upper end of air guide 14 in the vertical direction such that connection hole is surrounded.

First barrel 15 is open in the front-and-back direction and has no closed ends. Specifically, first barrel 15 includes first opening 15a through which a gas is sucked and second opening from which the sucked gas is discharged. Backward is an example of a second direction, and is opposite the first direction. In the following, the second direction may be referred to as backward.

Figure 4:
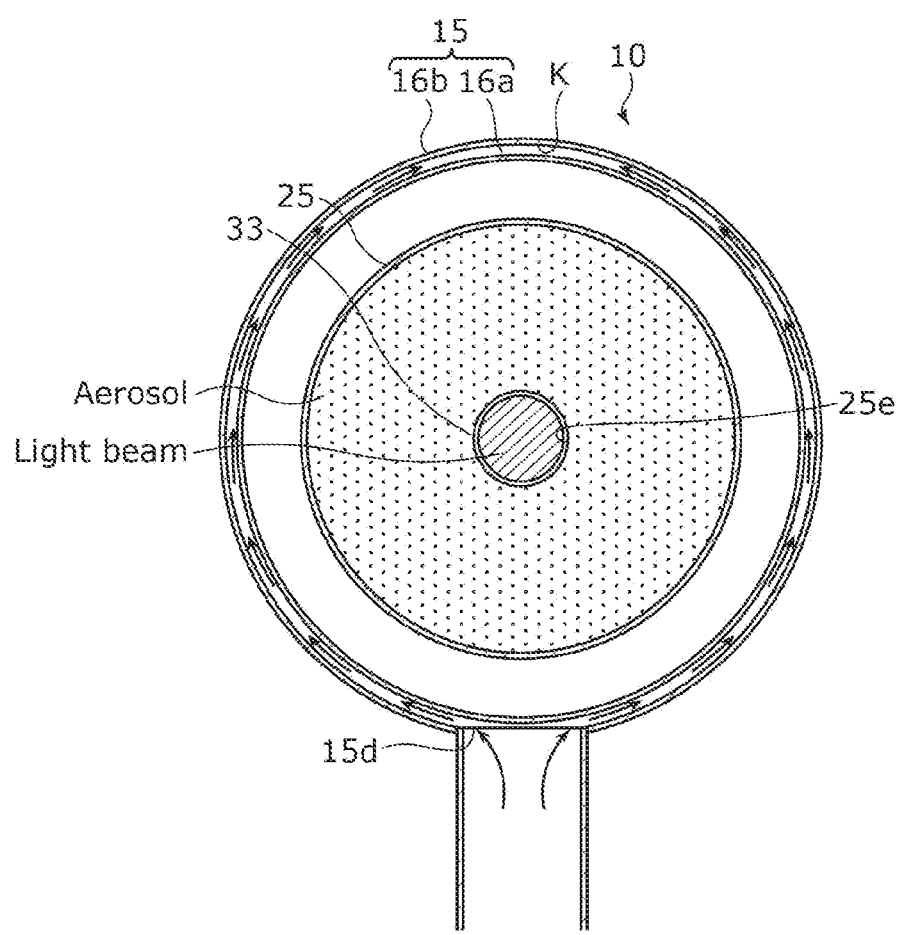
FIG. 4 is a cross sectional view illustrating a first barrel, a second barrel, and a light guide in the light beam emission system according to Embodiment 1.
Figure 8:
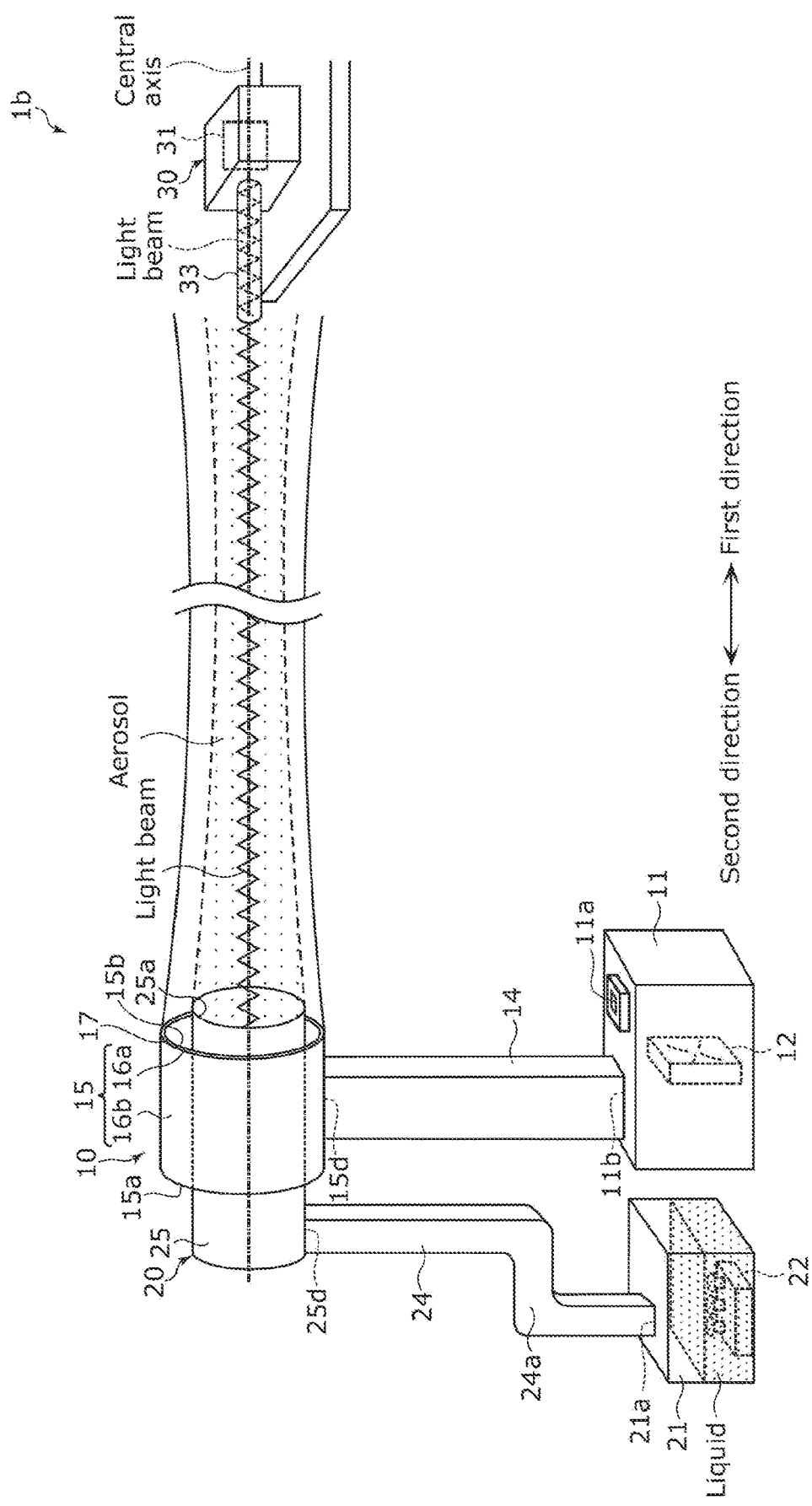
FIG. 8 is a perspective view illustrating a light beam emission system according to Embodiment 2.
Figure 9:
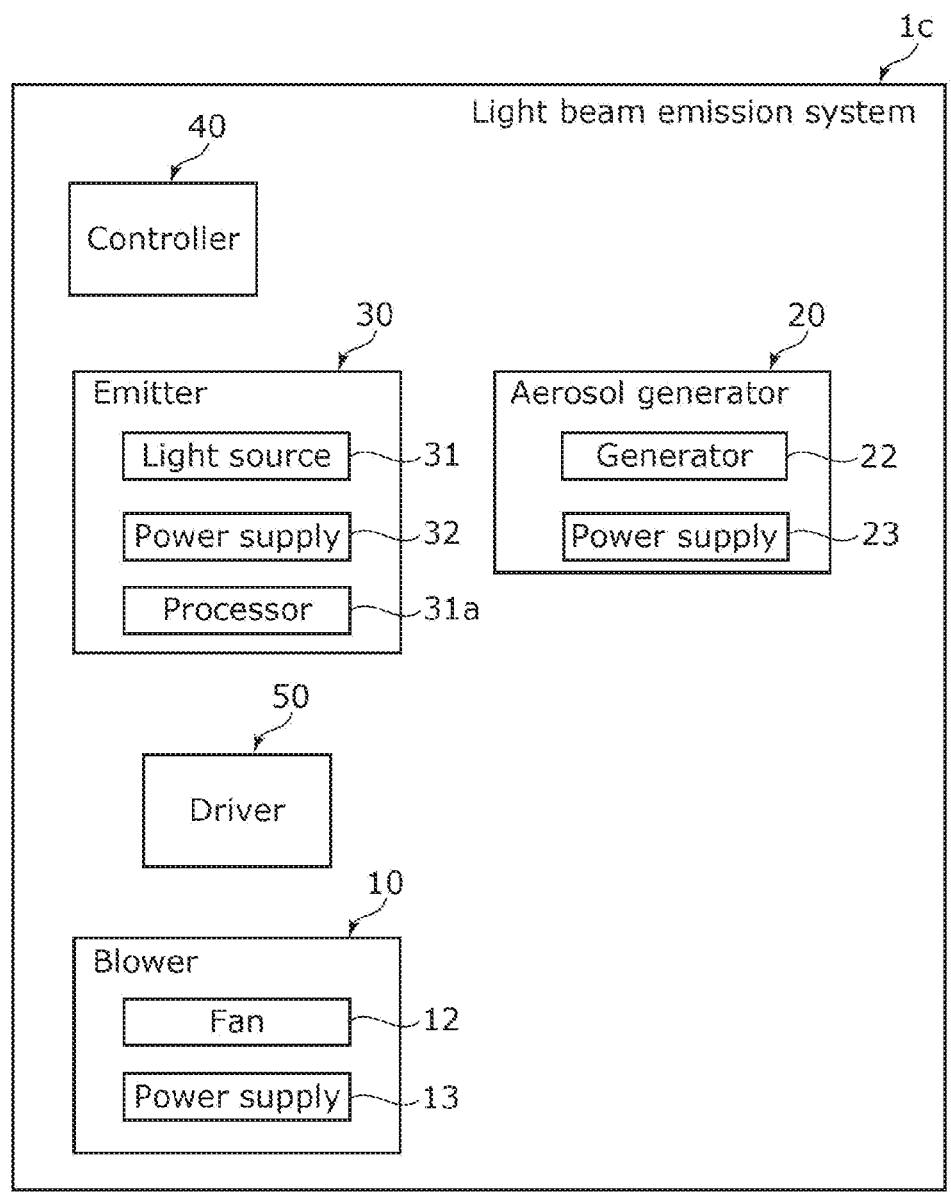
FIG. 9 is a block diagram illustrating a light beam emission system according to Embodiment 3.

FIG. 4 is a cross sectional view illustrating first barrel 15, second barrel 25, and light guide 33 in light beam emission system 1 according to Embodiment 1.

More specifically, first barrel 15 is a double-wall barrel that includes inner barrel 16a and outer barrel 16b, as illustrated in FIG. 3 and FIG. 4. Furthermore, in first barrel 15, space K (gap) into which a gas sent by fan 12 flows is formed between inner barrel 16a and outer barrel 16b, and third opening 17 from which the gas that flows into space K is discharged is formed.

Inner barrel 16a is open in the front-and-back direction and has no closed ends. In the present embodiment, inner barrel 16a has a cylindrical shape, but may have a prism shape. Inner barrel 16a defines first opening 15a and second opening and is disposed on an inner circumferential side of outer barrel 16b.

Outer barrel 16b is open in the front-and-back direction and has no closed ends. Outer barrel 16b has a shape that conforms to inner barrel 16a, and has a cylindrical shape in the present embodiment, but may have a prism shape.

Outer barrel 16b is disposed on an outer circumferential side of inner barrel 16a such that the central axis of outer barrel 16b coincides with the central axis of inner barrel 16a, and is concentric with inner barrel 16a. Outer barrel 16b is connected to inner barrel 16a at an end at first opening 15a, and covers the outer circumference of inner barrel 16a such that space K is formed between outer barrel 16b and inner barrel 16a. Accordingly, in order that first barrel 15 generates an air current that flows in the first direction, that is, frontward, inner barrel 16a and outer barrel 16b are joined at first opening 15a that is one end side of inner barrel 16a and outer barrel 16b, to close the space between inner barrel 16a and outer barrel 16b.

Connection hole 15d for connecting outer barrel 16b to the upper end of air guide 14 in the vertical direction is formed in the circumferential lateral surface of outer barrel 16b. Accordingly, an air current is generated by fan 12 in space K formed between inner barrel 16a and outer barrel 16b. The air current generated in space K travels in the first direction along the inner circumferential surface of outer barrel 16b and the outer circumferential surface of inner barrel 16a, through third opening 17. Since a gas flows in the first direction out of third opening 17, a gas moves on the inner circumferential surface side of inner barrel 16a due to the Coanda effect. Stated differently, a gas flows from first opening 15a toward second opening 15b of inner barrel 16a.

As illustrated in FIG. 2 and FIG. 3, second barrel 25 of aerosol generator 20 is inserted in first barrel 15 from first opening 15*a* toward second opening 15*b*. In the present embodiment, the front end of second barrel 25 protrudes from second opening 15*b* by protrusion length. The protrusion length is the amount of light guide 33 protruding from second opening 15*b* in the first direction.

In the present embodiment, the velocity of a gas flowing from first barrel 15 ranges from 5 (m/sec) to 30 (m/sec).

<Aerosol Generator 20>

Aerosol generator 20 is a device that generates aerosol and discharges the generated aerosol. Aerosol generator 20 is located between blower 10 and emitter 30.

Aerosol generator 20 includes container 21, generator 22, power supply 23 in FIG. 1, aerosol guide 24, and second barrel 25.

Container 21 is a casing that stores a liquid, which is a base for generating aerosol, and is placed on a placement surface such as ground or a floor. In the present embodiment, container 21 is disposed vertically below second barrel 25. Note that container 21 may not be disposed vertically below second barrel 25. A liquid, that is, aerosol may include a reflective material that reflects light and a fluorophore, for instance. A liquid is water or oil, for instance.

Discharge hole 21*a* for discharging aerosol is formed in container 21. Discharge hole 21*a* is formed on the ceiling side of container 21, and is connected to aerosol guide 24. Thus, discharge hole 21*a* is an opening for guiding aerosol to aerosol guide 24.

Generator 22 is a device that generates aerosol, and is stored in container 21. In the present embodiment, generator 22 is placed in a liquid. For example, generator 22 is at least one of a heater that generates aerosol by heating the liquid, an ultrasonic vibrator that vibrates the liquid, or a fan that sends a gas to the liquid. Generator 22 includes a fan that sends the generated aerosol, and causes the aerosol to flow in the flow path generated by blower 10 through aerosol guide 24 and second barrel 25.

Generator 22 obtains a control command from controller to adjust the temperature of aerosol that is generated and/or the amount of aerosol spouted (generated) per unit time. Thus, generator 22 can increase or decrease the temperature of aerosol and furthermore the amount of aerosol spouted, by being controlled by controller 40.

As illustrated in FIG. 1, power supply 23 is a power module that supplies power for driving generator 22. Power supply 23 provides and stops power supply to generator 22 by being controlled by controller 40.

As illustrated in FIG. 2 and FIG. 3, aerosol guide 24 is an elongated pipe extending in the vertical direction, which guides aerosol upward. Aerosol guide 24 is connected to discharge hole 21*a* of container 21 and fixed such that a lower end in the vertical direction that is one end surrounds discharge hole 21*a*. Further, aerosol guide 24 is fixed by an upper end in the vertical direction that is another end being connected to connection hole of second barrel 25.

Aerosol guide 24 includes crank portion 24*a* that is a portion bent into a crank shape (an S-shape). Crank portion 24*a* is provided with a water receptacle and a mesh portion that are not illustrated in the drawings. The water receptacle is a hollow (a recess) formed in crank portion 24*a*, and accumulates droplets generated on the inner surface of aerosol guide 24. Droplets are generated by aerosol returning back to a liquid, and some of the droplets fall in aerosol guide 24 due to their own weight. The mesh portion is disposed in the water receptacle, and absorbs and keeps droplets. The mesh portion is, for example, a sponge or a cloth.

Note that aerosol guide 24 may not include crank portion 24*a*. Stated differently, aerosol guide 24 may extend linearly from discharge hole 21*a* of container 21 to connection hole 25*d* of second barrel 25 described later. In this case, aerosol guide 24 may be provided with a water receptacle and a mesh portion or may not include both. Thus, crank portion 24*a*, the water receptacle, and the mesh portion are not structural elements necessary for aerosol generator 20.

Second barrel 25 is a guide that guides aerosol to the gas flow path generated by blower 10. Connection hole 25*d* is formed in the circumferential lateral surface of second barrel 25, and aerosol generated by generator 22 passes through aerosol guide 24 and flows into second barrel 25 through connection hole 25*d*.

Second barrel 25 is connected to and fixed at the upper end of aerosol guide 24 in the vertical direction such that connection hole 25*d* is surrounded. Insertion hole 25*e* into which light guide 33 of emitter 30 described later is inserted is formed in a bottom portion of second barrel 25, which is an end portion of second barrel 25 on the back side. Insertion hole 25*e* in FIG. 4 is formed in the center portion of the bottom portion of second barrel 25. In the present embodiment, the surface with an opening that is insertion hole 25*e* is substantially orthogonal to the central axis of second barrel 25.

Second barrel 25 is disposed on the inner circumferential side of first barrel 15, concentrically with first barrel 15, such that the central axis of second barrel 25 coincides with the central axis of first barrel 15. Second barrel 25 is supported by aerosol guide 24, being spaced apart from first barrel 15. Second barrel 25 is inserted into first barrel 15 from first opening 15*a* toward second opening 15*b*. In the present embodiment, second barrel 25 passes through first barrel 15.

Second barrel 25 is open on the front side and has a closed bottom. Specifically, discharge port 25*a* from which aerosol is discharged and which is for causing the aerosol to flow in the flow path is formed in second barrel 25. In the present embodiment, discharge port 25*a* is located frontward than second opening 15*b* of first barrel 15. Note that discharge port may be located between first opening 15*a* and second opening 15*b* of first barrel 15 or may be located backward than first opening 15*a*.

In the present embodiment, the range that aerosol reaches depends on the performance of blower 10, but is from several meters to several tens of meters, for example.

<Emitter 30>

Emitter 30 is an emitter device that emits a light beam in a defined wavelength range. Emitter 30 is disposed backward than blower 10 and aerosol generator 20, and emits a light beam along aerosol flowing in the flow path. Accordingly, the light beam propagates along the flow path of aerosol. Propagating along the flow path means that a light beam is parallel or substantially parallel to the first direction along which the flow path of aerosol extends, and propagates within the flow path of aerosol. In the present embodiment, emitter 30 emits a light beam in the first direction. Specifically, an angle between the first direction and a direction in which a light beam propagates is less than or equal to 15 degrees.

The light beam may coincide or may substantially coincide with the central axis of the flow path of aerosol. In the present embodiment, a light beam propagates in aerosol (that is, the flow path). Further, in the present embodiment, at least part of the light beam propagates along the flow path of aerosol. At least part of a light beam emitted is scattered and made visible by aerosol. Since a light beam propagates along a flow path in this manner, aerosol that flows in the flow path gives off light.

Further, a light beam is light that propagates in a straight line in a space, and is substantially parallel to the optical axis of light emitted by light source 31. For example, a light beam is collimated light.

Emitter 30 includes one or more light sources 31, processor 31a, power supply 32 in FIG. 1, and one or more light guides 33. Unless otherwise stated in particular, one light source 31 and one light guide 33 are used in the present embodiment, and thus description of one light source 31 and one light guide 33 is given.

Light source 31 is a light emitting module supported in an orientation in which light source 31 emits a light beam in the first direction. Light source 31 emits a light beam in the first direction, to irradiate a flow path in which aerosol flows with the light beam via light guide 33 and second barrel 25. Light source 31 is a light emitting diode (LED) or a laser diode, for example.

Light source 31 emits light of two or more colors. Specifically, light source 31 has an RGB three-color light source, and emits three single-color light beams having red, blue, and green colors, and furthermore color light or white light obtained by controlling such three single-color light beams. Light source 31 changes the color of light to be emitted, by being controlled by controller 40.

Processor 31a adjusts output of a light beam that light source 31 emits, by obtaining a control command from controller Thus, processor 31a can increase and decrease the output of a light beam emitted by light source 31, by being controlled by controller 40.

Processor 31a adjusts output of a light beam that light source 31 emits, by obtaining a control command from controller Thus, processor 31a can increase and decrease the output of a light beam emitted by light source 31, by being controlled by controller 40.

Processor 31a is communicably connected to controller 40, and obtains a control command from controller 40 so as to control and turn on and off light source 31. Specifically, processor 31a obtains a control command to switch light source 31 from off to on to cause light source 31 to irradiate aerosol with a light beam, and to switch light source 31 from on to off to cause light source 31 to stop irradiating aerosol with a light beam.

As illustrated in FIG. 1, power supply 32 is a power module that includes a lighting circuit that supplies power for causing light source 31 to emit light. Power supply 32 converts an alternating current supplied from an external power supply such as a commercial power supply into a direct-current power having a predetermined level by, for instance, rectifying, smoothing, and stepping down the voltage of the alternating current, and supplies the direct-current power to light source 31. Power supply 32 provides and stops power supply to light source 31 by being controlled by controller 40. Note that power supply 32 may include a combination of a light control circuit and a step-up circuit, for instance.

As illustrated in FIG. 2 and FIG. 3, light guide 33 is an optical member for guiding a light beam emitted from light source 31 toward aerosol. More specifically, light guide 33 is an optical member elongated in the first direction, which causes a light beam emitted by light source 31 to propagate along a flow path in which aerosol flows. Light guide 33 guides a light beam emitted by light source 31 to aerosol in order to reduce attenuation of the light beam.

Light guide 33 extends from a light emitting surface of light source 31 in the first direction and passes through second barrel 25 from insertion hole 25e. Specifically, light guide 33 passes through second barrel 25 from insertion hole 25e to discharge port 25a, and protrudes from second opening 15b. The front end of light guide 33 protrudes from discharge port in the first direction by protrusion length H. Thus, light guide 33 passes through first barrel 15 from first opening 15a to second opening 15b. Stated differently, light guide 33 protrudes from second opening 15b in the first direction by a length greater than protrusion length H. Accordingly, the front end of light guide 33 in the first direction is located in a flow path in which aerosol flows. This ensures that light guide 33 guides a light beam into a flow path in which aerosol flows.

Note that the front end of light guide 33 in the first direction may not protrude from second opening 15b in the first direction. Thus, the front end of light guide 33 in the first direction may be located between insertion hole 25e of second barrel 25 and discharge port 25a of second barrel 25, or may be located farther in the second direction opposite the first direction, than insertion hole 25e of second barrel 25.

A space between light guide 33 and insertion hole 25e of second barrel 25 is closed by connecting light guide 33 and second barrel 25 so as to prevent aerosol from flowing out from the space between light guide 33 and insertion hole 25e of second barrel 25.

Light guide 33 is, for example, an optical fiber or a hollow or solid light guide, but is a hollow light guide in the present embodiment. Light guide 33 is made of metal such as aluminum or a light-transmitting member such as an acrylic or glass member. The cross section of light guide 33 is circular or polygonal, for instance, but is circular in the present embodiment. Thus, light guide 33 is a cylindrical pipe extending in the first direction and having no closed ends, in the present embodiment.

<Controller 40>

As illustrated in FIG. 1 to FIG. 3, controller 40 is a control device that can control blower 10, aerosol generator 20, and emitter 30.

Controller 40 is communicably connected to blower 10, and performs control to allow switching blower 10 between on and off. Specifically, controller 40 outputs a control command to drive fan 12 by switching blower 10 from off to on, and to stop fan 12 by switching fan 12 from on to off.

Controller 40 adjusts the velocity of an air current generated by blower 10. For example, controller 40 outputs a control command to switch the air volume of blower 10 from a first air volume to a second air volume higher than the first air volume or from the second air volume to the first air volume.

Controller 40 is communicably connected to aerosol generator 20, and performs control to allow switching between on and off of aerosol generator 20. Specifically, controller 40 outputs a control command to drive and cause generator 22 to generate aerosol by switching aerosol generator 20 from off to on, and to stop generator 22 by switching generator 22 from on to off.

Controller 40 adjusts the temperature of aerosol generated by aerosol generator 20, and adjusts the amount of aerosol spouted (generated) per unit time. For example, controller 40 outputs a control command to switch the temperature of aerosol from a first temperature to a second temperature higher than the first temperature, and from the second temperature to the first temperature. Controller 40 outputs a control command to switch the amount of aerosol spouted per unit time from a first spout amount to a second spout amount greater than the first spout amount and from the second spout amount to the first spout amount.

Controller 40 is communicably connected to emitter 30, and performs control to allow switching between on and off of emitter 30. Specifically, controller 40 outputs a control command to switch emitter 30 from off to on to cause emitter 30 to emit a light beam to aerosol, and to switch emitter 30 from on to off to cause emitter 30 to stop emitting a light beam to aerosol.

For instance, controller 40 changes the color of a light beam that light source 31 emits. For example, controller 40 switches a light beam having a first light color to a light beam having a second light color different from the first light color, and causes light source 31 to emit a light beam having the second light color.

Further, controller 40 changes the output of a light beam that light source 31 emits. For example, controller 40 outputs a control command to switch the output of a light beam from a first output to a second output that is higher than the first output and from the second output to the first output.

[Measurement Result]

Protrusion length H of light guide 33 is to be described.

FIG. 5A illustrates results of viewing and checking whether a light beam can be made visible while changing protrusion length H of light guide 33 from second opening 15b when the amount of aerosol spouted is 9000 (cc/h).

In FIG. 5A, whether a light beam can be made visible is checked when protrusion length H of light guide 33 is 0 (mm), 0.5 (mm), 1.0 (mm), 1.5 (mm), 2.0 (mm), 2.5 (mm), 3.0 (mm), 3.5 (mm), 4.0 (mm), 4.5 (mm), 5.0 (mm), and 5.5 (mm).

As illustrated in FIG. 5A, it is difficult to perceive a light beam when the length is 0 (mm), 0.5 (mm), 1.0 (mm), 5.0 (mm), and 5.5 (mm) in the case where the amount of aerosol spouted is 9000 (cc/h). However, if protrusion length H of light guide 33 is 1.5 (mm), 2.0 (mm), 2.5 (mm), 3.0 (mm), 3.5 (mm), 4.0 (mm), and 4.5 (mm), the light beam can be made visible. Accordingly, when the amount of aerosol spouted is 9000 (cc/h), protrusion length H of light guide 33 that readily makes a light beam visible is presumed to be approximately 3.0 (mm).

FIG. 5B illustrates results of checking whether a light beam can be made visible while changing protrusion length H of light guide 33 from second opening 15b when the amount of aerosol spouted is 18000 (cc/h).

As illustrated in FIG. 5B, it is difficult to perceive a light beam when the length is 0 (mm), 0.5 (mm), 1.0 (mm), 1.5 (mm), 2.0 (mm), and 5.5 (mm) in the case where the amount of aerosol spouted is 18000 (cc/h). However, if protrusion length H of light guide 33 is 2.5 (mm), 3.0 (mm), 3.5 (mm), 4.0 (mm), 4.5 (mm), and 5.0 (mm), a light beam is made visible. Accordingly, when the amount of aerosol spouted is 18000 (cc/h), protrusion length H of light guide 33 that readily makes a light beam visible is presumed to be approximately 3.75 (mm).

This shows that although appropriate protrusion length H of light guide 33 differs depending on the amount of aerosol spouted, light guide 33 is preferably protrudes in the first direction from second opening 15b.

The particle diameter of aerosol, the amount of aerosol spouted, and the flow velocity (the air velocity) of aerosol flowing in the flow path are considered to also relate to making a light beam visible.

The results of the experiments show that if the particle diameter of aerosol is increased without changing the amount of aerosol spouted, a light beam tends to be readily made visible. This is because the density of aerosol per unit volume in a flow path increases with an increase in the particle diameter of aerosol without changing the amount of aerosol spouted, and thus a light beam is readily reflected by aerosol.

If the amount of aerosol spouted is increased, a light beam tends to be readily made visible. This is because the density of aerosol per unit volume in a flow path if the amount of aerosol spouted is increased, and thus a light beam is readily reflected by aerosol.

Furthermore, also when the flow velocity of aerosol flowing in a flow path is increased, a light beam tends to be readily made visible. This is because the per unit volume of passing aerosol per unit time is increased if the amount of aerosol spouted is increased, and thus a light beam is considered to be readily reflected by aerosol.

[Operation]

In such light beam emission system 1, as illustrated in FIG. 1 to FIG. 4, controller 40 controls aerosol generator 20 so as to cause aerosol generator 20 to generate aerosol. Aerosol generated by aerosol generator 20 is discharged out of aerosol generator 20 through container 21, aerosol guide 24, and second barrel 25.

Controller 40 generates an air current by controlling blower 10. Specifically, controller 40 drives fan 12 of blower 10, to generate inside blower 10 an air current that flows through storage 11, air guide 14, and first barrel 15 in this order. An air current that passes through space K and out of third opening 17 of first barrel 15 and travels in the first direction is generated in first barrel 15, and thus an air current is generated on the inner circumferential surface of first barrel 15 due to the Coanda effect. Stated differently, if a gas is discharged in the first direction from third opening 17 by controller 40 driving fan 12, the Coanda effect produced along the inner circumferential surface of first barrel 15 due to a discharged jet and a difference in pressure of the surrounding air generates an air current that flows from first opening 15a toward second opening 15b (that is, flows in the first direction). Accordingly, blower 10 forms a flow path extending from first barrel 15 in the first direction. Since this air current passes between first barrel 15 and second barrel aerosol is led from discharge port 25a of second barrel 25, so that the aerosol flows in a flow path extending in the first direction from first barrel 15.

At this time, controller 40 controls emitter 30 to turn emitter 30 on, so that emitter 30 emits a light beam in the first direction. Accordingly, the flow path in which aerosol flows is irradiated with the light beam.

In light beam emission system 1, a single flow path in which aerosol flows is formed, and a light beam propagates within the flow path, so that the light beam is diffused by the aerosol, which causes the flow path to give off light. Accordingly, the light beam can be made visible so as to be readily perceived.

[Operations and Effects]

The following describes operations and effects of light beam emission system 1 according to the present embodiment.

Light beam emission system 1 according to the present embodiment includes: blower 10 that forms a flow path in which aerosol flows; and emitter 30 that emits a light beam. At least part of the light beam propagates along the flow path of the aerosol.

According to this, since a light beam is emitted onto aerosol flowing along the flow path, the emitted light beam can be caused to appear. Stated differently, diffusion of a light beam in aerosol causes the flow path in which the aerosol flows to give off light, thus allowing the light beam to be readily perceived even in a bright space.

Thus, light beam emission system 1 allows a light beam to be clearly perceived.

In particular, a light beam can be perceived from any direction, and thus the place where light beam emission system 1 is installed is not limited.

In light beam emission system 1 according to the present embodiment, the aerosol includes mist.

According to this, since aerosol is mist, a light beam can be readily made visible.

In light beam emission system 1 according to the present embodiment, blower 10 causes the aerosol to flow in a first direction, and the at least part of the light beam propagates along the first direction.

According to this, emitter 30 can emit a light beam in a direction similar to the first direction in which blower 10 causes aerosol to flow. Thus, emitter 30 can be disposed near blower and thus the area for disposing light beam emission system 1 is less likely to increase.

In light beam emission system 1 according to the present embodiment, a direction in which the at least part of the light beam propagates coincides with the first direction.

According to this, a light beam is emitted in a direction along and coinciding with the direction in which aerosol flows, and thus a light beam can be maintained visible over a longer distance.

In light beam emission system 1 according to the present embodiment, an angle between the first direction and a direction in which the at least part of the light beam propagates is less than or equal to 15 degrees.

For example, if the angle between the first direction and the direction in which at least part of a light beam propagates is greater than 15 degrees, most of the light beam is radiated from the aerosol flowing in the flow path, so that the light beam cannot be maintained visible over a long distance. However, according to the present disclosure, a light beam propagates along the flow path of aerosol, and thus the light beam can be maintained visible over a longer distance.

In light beam emission system 1 according to the present embodiment, the at least part of the light beam emitted is scattered and made visible by the aerosol.

According to this, aerosol diffuses a light beam, which ensures that a user perceives the light beam.

Light beam emission system 1 according to the present embodiment further includes: aerosol generator 20 that generates the aerosol.

According to this, aerosol can be readily generated.

In light beam emission system 1 according to the present embodiment, aerosol generator 20 includes: container 21 in which a liquid is stored; and at least one of a heater that generates the aerosol by heating the liquid, an ultrasonic vibrator that vibrates the liquid, or fan 12 that sends a gas to the liquid.

According to this, aerosol can be readily generated from a liquid.

In light beam emission system 1 according to the present embodiment, blower 10 includes: fan 12 that forms the flow path in which the aerosol flows by generating an air current; and first barrel 15 that includes first opening 15a through which a gas is sucked, and second opening 15b from which the gas sucked through first opening 15a is discharged, aerosol generator 20 includes second barrel 25 that guides the aerosol to the flow path, and second barrel 25 is inserted from first opening 15a, and held, being spaced apart from first barrel 15.

According to this, an air current from first opening 15a toward second opening 15b is generated between first barrel 15 and second barrel 25 by blower 10, and a flow path is formed. Thus, an air current forms a flow path that surrounds second barrel 25, and thus the aerosol guided by and discharged from second barrel 25 flows in the flow path. Accordingly, aerosol can be caused uniformly flow along the flow path.

In light beam emission system 1 according to the present embodiment, first barrel 15 is a double-wall barrel that includes: inner barrel 16a that defines first opening 15a and second opening 15b; and outer barrel 16b that is connected to inner barrel 16a at an end at first opening 15a, and covers an outer circumference of inner barrel 16a such that space K is formed between inner barrel 16a and outer barrel 16b, and first barrel 15 defines space K and third opening 17 between inner barrel 16a and outer barrel 16b, space K being a space into which a gas sent by fan 12 flows, third opening 17 being an opening from which the gas that flows into space K is discharged.

According to this, an air current flowing from third opening 17 in the first direction is generated, and thus an air current flowing from first opening 15a toward second opening can be generated by the Coanda effect on the inner circumferential side of inner barrel 16a. Accordingly, an air current having a force greater than or equal to the force of the air current generated by fan 12 can be generated from first barrel 15.

In light beam emission system 1 according to the present embodiment, aerosol generator 20 is located between blower 10 and emitter 30.

According to this, the aerosol generated by aerosol generator 20 can be readily caused to flow in the flow path generated by blower 10.

In light beam emission system 1 according to the present embodiment, emitter 30 includes: light source 31 that emits the light beam; and light guide 33 that guides the light beam emitted by light source 31, light guide 33 being elongated. Light guide 33 passes through first barrel 15 from first opening 15a to second opening 15b, light guide 33 protruding from second opening 15b.

According to this, light guide 33 guides a light beam to the flow path in which aerosol flows, and thus attenuation of the light beam from light source 31 to this flow path can be reduced. In particular, the density of aerosol near second opening 15b is high, and thus excessive attenuation of a light beam due to the highly dense aerosol can be reduced. Accordingly, a light beam can be ensured to be guided to aerosol, and thus it can be further ensured that a light beam propagating in the aerosol is perceived.

In light beam emission system 1 according to the present embodiment, one or more light sources 31 are each a light emitting diode (LED) or a laser diode.

According to this, light beam emission system 1 can be readily achieved with use of an LED or a laser diode commercially available.

In light beam emission system 1 according to the present embodiment, emitter 30 further includes processor 31a that switches between emitting the light beam and stopping emitting the light beam.

According to this, a light beam that appears in aerosol can be caused to be viewed or not viewed.

[Variation of Embodiment 1]

A configuration of light beam emission system 1a according to a variation of Embodiment 1 is to be described.

The other configuration of this variation is similar to Embodiment 1 unless otherwise stated in particular, and the same sign is given to the same configuration while a detailed description of the same configuration is omitted.

Although second barrel 25 of aerosol generator 20 passes through first barrel 15 of blower 10 in Embodiment 1, second barrel 125 does not pass through first barrel 15 in light beam emission system 1*a* according to this variation, and is disposed backward than first barrel 15, which is different from Embodiment 1.

Figure 7:
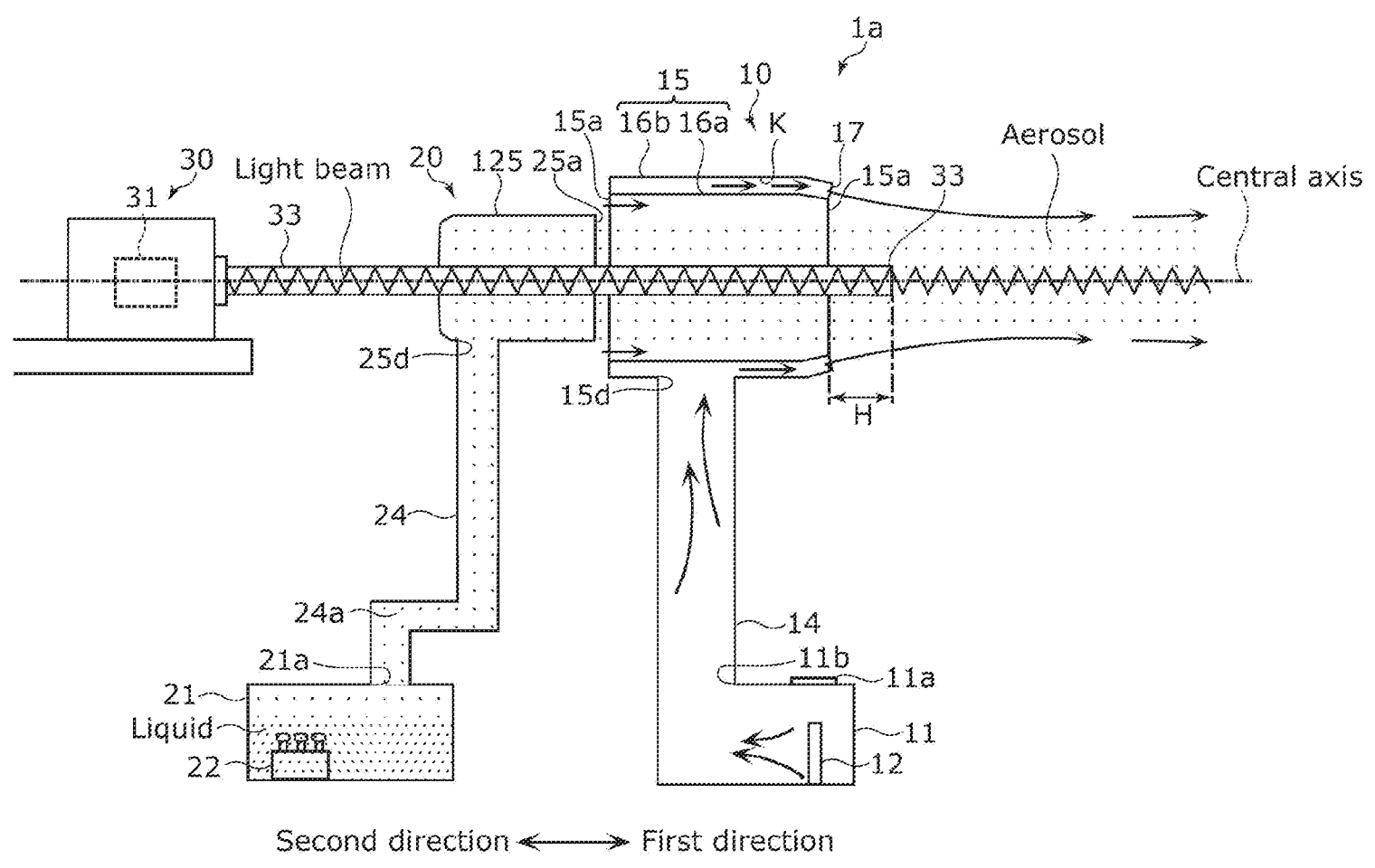

FIG. 6 is a perspective view illustrating light beam emission system 1*a* according to a variation of Embodiment 1. FIG. 7 is a cross sectional view illustrating light beam emission system 1*a* according to the variation of Embodiment 1 when light beam emission system 1*a* is cut in the first direction.

Specifically, as illustrated in FIG. 6 and FIG. 7, in light beam emission system 1*a* according to this variation, second barrel 125 is disposed backward than first barrel 15 in an orientation in which discharge port 25*a* of second barrel 125 faces first opening 15*a* of first barrel 15.

Accordingly, aerosol discharged from discharge port 25*a* of second barrel 125 is guided toward first opening 15*a* of first barrel 15 by an air current sucked through first opening 15*a* of first barrel 15. Aerosol is sucked through first opening 15*a* of blower 10 along the air current, and the sucked aerosol is discharged from second opening 15*b* of blower 10 into a flow path in the first direction.

In light beam emission system 1*a* according to this variation as described above, blower 10 includes: first barrel 15 that includes first opening 15*a* through which the aerosol is sucked along an air current, and second opening 15*b* from which the aerosol sucked through first opening 15*a* is discharged to the flow path; and fan 12 that generates the air current in first barrel 15.

According to this, a flow path of aerosol can be formed in a direction extending from first opening 15*a* toward second opening 15*b* by an air current (wind) generated by fan 12 in first barrel 15. Accordingly, if a light beam is emitted along the flow path, the light beam is diffused in aerosol, so that the flow path in which the aerosol flows can be caused to give off light.

In light beam emission system 1*a* according to the present embodiment, blower 10 includes: fan 12 that forms the flow path in which the aerosol flows by generating an air current; and first barrel 15 that includes first opening 15*a* through which the aerosol is sucked along the air current, and second opening 15*b* from which the aerosol sucked through first opening 15*a* is discharged to the flow path, and aerosol generator 20 includes second barrel 125 that guides the aerosol to first opening 15*a*.

According to this, a flow path extending from first opening 15*a* toward second opening 15*b* is formed, so that aerosol generated by aerosol generator 20 can be readily put on the flow path (caused to flow) from first opening 15*a*. Accordingly, a flow path of aerosol can be readily formed.

This variation also achieves similar operations and effects to those in Embodiment 1.

Embodiment 2

A configuration of light beam emission system 1*b* according to the present embodiment is to be described.

The other configuration of the present embodiment is similar to Embodiment 1 unless otherwise stated in particular, and the same sign is given to the same configuration while a detailed description of the same configuration is omitted.

[Configuration: Light Beam Emission System 1*b*]

In light beam emission system 1 according to Embodiment 1, emitter 30 is disposed backward than blower 10 and aerosol generator 20, whereas in the present embodiment, emitter 30 is disposed frontward than aerosol generator 20 and blower 10, which is different from Embodiment 1.

FIG. 8 is a perspective view illustrating light beam emission system 1*b* according to Embodiment 2.

Specifically, as illustrated in FIG. 8, blower 10 is between emitter 30 and aerosol generator 20, or stated differently, emitter 30 is disposed, facing toward aerosol generator 20 and blower 10.

Emitter 30 emits a light beam that propagates in the second direction that is opposite the first direction, toward the upstream side of a flow path of aerosol. Specifically, emitter 30 emits a light beam toward first barrel 15 of blower 10 and second barrel 25 of aerosol generator 20. The light beam emitted by emitter 30 coincides with or substantially coincides with the central axis of first barrel 15 and the central axis of second barrel 25. An angle between the second direction and a direction in which a light beam propagates is less than or equal to 15 degrees. In the present embodiment, at least part of a light beam propagates along the second direction opposite the first direction, and the direction in which the at least part of the light beam propagates coincides with the second direction. Accordingly, the direction in which a light beam emitted by emitter 30 flows is the second direction, yet the direction in which aerosol flows in a flow path is the first direction.

Light source 31 of emitter 30 is supported in an orientation in which a light beam is emitted in the first direction.

Light guide 33 of emitter 30 is not inserted into second barrel 25, and is disposed in an orientation in which a longer direction is substantially parallel to the second direction. Thus, light guide 33 extends from light source 31 in the second direction. Note that in the present embodiment, emitter 30 may not include light guide 33, and thus light guide 33 is not a structural element necessary for emitter 30.

The operation of light beam emission system 1*b* is similar to that in Embodiment 1, and thus a description thereof is omitted.

Operations and Effects

The following describes operations and effects of light beam emission system 1*b* according to the present embodiment.

In light beam emission system 1*b* according to the present embodiment, blower 10 causes the aerosol to flow in a first direction, and the at least part of the light beam propagates along a second direction opposite the first direction.

According to this, even if emitter 30 is disposed in a position spaced apart from blower 10, a light beam can be clearly perceived. Furthermore, the disposition of emitter 30 can be given a high degree of freedom.

In light beam emission system 1*b* according to the present embodiment, a direction in which the at least part of the light beam propagates coincides with the second direction.

According to this, a light beam is emitted in a direction along and coinciding with the direction in which aerosol flows, and thus a light beam can be maintained visible over a longer distance.

In light beam emission system 1*b* according to the present embodiment, an angle between the second direction and a direction in which the at least part of the light beam propagates is less than or equal to 15 degrees.

For example, if the angle between the second direction and the direction in which at least part of a light beam propagates is greater than 15 degrees, most of the light beam is radiated from the aerosol flowing in the flow path, so that it is difficult to maintain the light beam visible over a long distance. However, according to the present disclosure, a light beam propagates along the flow path of aerosol, and thus the light beam can be maintained visible over a longer distance.

In light beam emission system 1b according to the present embodiment, blower 10 is located between emitter 30 and aerosol generator 20.

According to this, blower 10, emitter 30, and aerosol generator 20 can be disposed close to one another, and thus the size of light beam emission system 1*b* is less likely to increase.

The present embodiment also achieves similar operations and effects to those in Embodiment 1.

Embodiment 3

A configuration of light beam emission system 1*c* according to the present embodiment is to be described.

The other configuration of the present embodiment is similar to, for instance, Embodiment 1 unless otherwise stated in particular, and the same sign is given to the same configuration while a detailed description of the same configuration is omitted.

[Configuration: Light Beam Emission System 1*c*]

In light beam emission system 1 according to Embodiment 1, for instance, emitter 30 is disposed backward than aerosol generator 20 and blower 10, whereas in the present embodiment, emitter 30 is disposed such that a direction in which emitter 30 emits a light beam crosses a flow path in which aerosol flows, which is different from Embodiment 1, for instance.

FIG. 9 is a block diagram illustrating light beam emission system 1*c* according to Embodiment 3. FIG. 10 is a schematic view illustrating light beam emission system 1*c* according to Embodiment 3. Part a of FIG. 10 is a side view of light beam emission system 1*c* according to Embodiment 3, b of FIG. 10 is a top view of light beam emission system 1*c* according to Embodiment 3, and c of FIG. 10 is a front view of light beam emission system 1*c* according to Embodiment 3.

Specifically, as illustrated in FIG. 9 and FIG. 10, emitter 30 is disposed above, below, or on the side of a flow path in which aerosol flows, and is not disposed in a position where emitter 30 faces aerosol generator 20 and blower 10. Emitter is disposed in an orientation in which a light beam emitted crosses the first direction and the second direction. In the present embodiment, emitter 30 is fixed on a construction material (not illustrated) such as a ceiling, and is disposed in an orientation in which a light beam emitted substantially crosses the first direction and the second direction. In the present embodiment, emitter 30 is disposed above the flow path in which aerosol flows. Accordingly, the light beam that emitter 30 emits does not coincide with or substantially coincide with the central axis of the first barrel or the central axis of the second barrel, and does not propagate in the first direction or the second direction.

Light source 31 of emitter 30 is supported in an orientation in which a light beam emitted crosses the first direction and the second direction.

Light guide 33 of emitter 30 is not inserted into the second barrel, and is disposed in an orientation in which a longer direction is crosses the first direction and the second direction. Light guide 33 extends along a flow path in which aerosol flows from light source 31. Note that in the present embodiment, emitter 30 may not include the light guide, and thus the light guide is not a structural element necessary for emitter 30.

Light beam emission system 1*c* further includes driver 50, in addition to blower 10, aerosol generator 20, and emitter 30.

<Driver 50>

Driver 50 is an actuator that changes the tilt of emitter 30 by swinging emitter 30 about a fixed shaft, so that an emission direction of a light beam emitted by emitter 30 is changed by a predetermined angle. Specifically, driver 50 is provided in emitter 30, and swings emitter 30 in a predetermined angle range by being controlled by controller 40 so as to set the emission direction of a light beam within a predetermined angle range. Driver 50 is controlled by controller 40 so as to swing emitter 30 over a certain period and hold emitter 30 such that a light beam from emitter 30 travels at a predetermined angle with the vertical direction, for example. In this manner, driver 50 drives emitter 30 to control an orientation thereof, thus controlling the emission direction of a light beam.

Note that driver 50 may change the orientations of light source 31 and the light guide by swinging light source 31 and the light guide. Further, driver 50 may be or may not be included in structural elements of emitter 30.

[Operation]

In such light beam emission system 1*c*, controller 40 controls aerosol generator 20 so as to cause aerosol generator to generate aerosol. The aerosol generated by aerosol generator 20 is discharged out of aerosol generator 20 through container 21, aerosol guide 24, and the second barrel and flows along the flow path. At this time, controller 40 controls emitter 30, to cause a light beam to be emitted in a direction crossing the first direction and the second direction. Accordingly, aerosol is irradiated with a light beam.

Further, controller 40 controls driver 50 to swing emitter and change the orientation of emitter 30. Thus, controller causes driver 50 to swing emitter 30 over a certain period so that a light beam scans in a direction crossing a flow path of aerosol, and thus the light beam is planarized.

Controller 40 drives fan 12 of blower 10 to cause blower 10 to form a flow path extending from the first barrel in the first direction. Accordingly, aerosol flows in the flow path extending from the first barrel in the first direction.

In light beam emission system 1*c*, a single flow path in which aerosol flows is formed, and a planarized light beam is emitted so as to cross the flow path. Thus, the planarized light beam is made visible by aerosol. Accordingly, part of the flow path in which aerosol flows gives off planarized light.

Operations and Effects

The following describes operations and effects of light beam emission system 1*c* according to the present embodiment.

Light beam emission system 1*c* according to the present embodiment further includes driver 50 that swings emitter 30.

According to this, a flow path in which aerosol flows can be irradiated with a planarized light beam, and thus the planarized light beam can be made visible.

The present embodiment also achieves similar operations and effects to those in Embodiment 1, for instance.

Embodiment 4

A configuration of light beam emission system 1d according to the present embodiment is to be described.

The other configuration of the present embodiment is similar to, for instance, Embodiment 1 unless otherwise stated in particular, and the same sign is given to the same configuration while a detailed description of the same configuration is omitted.

[Configuration: Light Beam Emission System 1d]

In light beam emission system 1 according to Embodiment 1, for instance, a single first barrel, a single second barrel, single light source 31, and single light guide 33 are exemplified, but nevertheless, in the present embodiment, a plurality of first barrels, a plurality of second barrels, a plurality of light sources 31, and a plurality of light guides are exemplified, which differs from Embodiment 1, for instance.

Figure 11:
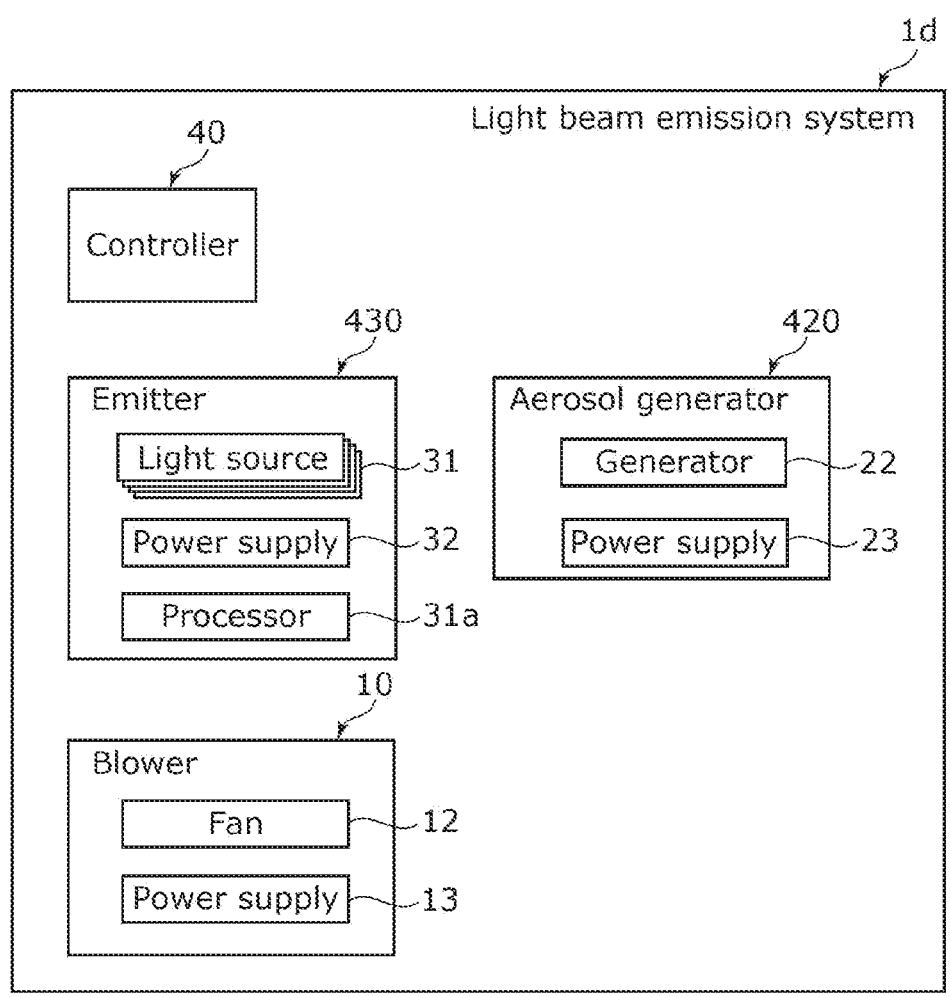
FIG. 11 is a block diagram illustrating a light beam emission system according to Embodiment 4.

FIG. 11 is a block diagram illustrating light beam emission system 1d according to Embodiment 4. FIG. 12 is a schematic diagram illustrating light beam emission system 1d according to Embodiment 4. Part a of FIG. 12 is a side view of light beam emission system 1d according to Embodiment 4, and b of FIG. 12 is a top view of light beam emission system 1d according to Embodiment 4.

As illustrated in FIG. 11 and FIG. 12, blower 10 includes a plurality of first barrels. The plurality of first barrels are arranged in the vertical direction, and each form a flow path in which aerosol flows in the first direction. In the present embodiment, four first barrels are exemplified, yet three or less or five or more first barrels may be included.

Aerosol generator 420 includes a plurality of second barrels in one-to-one correspondence with the plurality of first barrels. The plurality of second barrels are arranged in the vertical direction, and each discharge aerosol in the first direction. Thus, aerosol guide 424 is connected to the connection holes that the plurality of second barrels have, in order to guide aerosol generated by generator 22 to the plurality of second barrels. In the present embodiment, four second barrels are exemplified, yet three or less or five or more second barrels may be included.

Emitter 430 includes a plurality of light sources 31 in one-to-one correspondence with, for instance, the plurality of first barrels, and a plurality of light guides in one-to-one correspondence with the plurality of light sources 31. Note that in the present embodiment, the number of light sources 31 and the number of the light guides are the same as those of the first barrels and the second barrels, but are not necessarily the same. In the present embodiment, four light sources 31 and four light guides are exemplified, yet three or less or five or more light sources 31 and three or less or five or more light guides may be included.

In the present embodiment, emitter 430 is disposed backward than blower 10 and aerosol generator 420. The plurality of light sources 31 each emit light in the first direction, along the flow path of aerosol. Note that emitter 430 may be disposed frontward so as to face blower 10 and aerosol generator 420, and light sources 31 may each emit light in the second direction, along the flow path of aerosol.

Accordingly, in light beam emission system 1d, light beams propagate along the flow paths of aerosol, and thus the flow paths can be made visible in a planarized manner by the light beams. Thus, in light beam emission system 1d, a display surface can be formed by the flow paths in which aerosol flows.

Operations and Effects

The following describes operations and effects of light beam emission system 1d according to the present embodiment.

In light beam emission system 1d according to the present embodiment, emitter 430 includes: one or more light sources 31 that emit one or more light beams; and one or more light guides 33 that guide, in one-to-one correspondence, the one or more light beams emitted by one or more light sources 31 to the aerosol, one or more light guides 33 being elongated.

According to this, a plurality of types of light beams having different wavelengths can be emitted using one or more light sources 31. Accordingly, by forming flow paths in which aerosol flows and causing the plurality of types of light beams to propagate along the flow paths, the flow paths in which aerosol flows can be made visible in a planarized manner.

Further, the color(s) of light beams that propagate along the flow paths in which aerosol flows can be changed by using light beams having different colors from the plurality of light sources 31, and thus how the flow paths in which aerosol flows are viewed can be changed.

The present embodiment also achieves similar operations and effects to those in Embodiment 1, for instance.

Variation of Embodiment 4

A configuration of light beam emission system 1e according to a variation of Embodiment 4 is to be described.

The other configuration of this variation is similar to Embodiment 4 unless otherwise stated in particular, and the same sign is given to the same configuration while a detailed description of the same configuration is omitted.

Aerosol generator 420 in Embodiment 4 includes single aerosol guide 424, whereas aerosol generator 420 in this variation includes a plurality of aerosol guides and a plurality of generators 22 in one-to-one correspondence with a plurality of second barrels.

Figure 13:
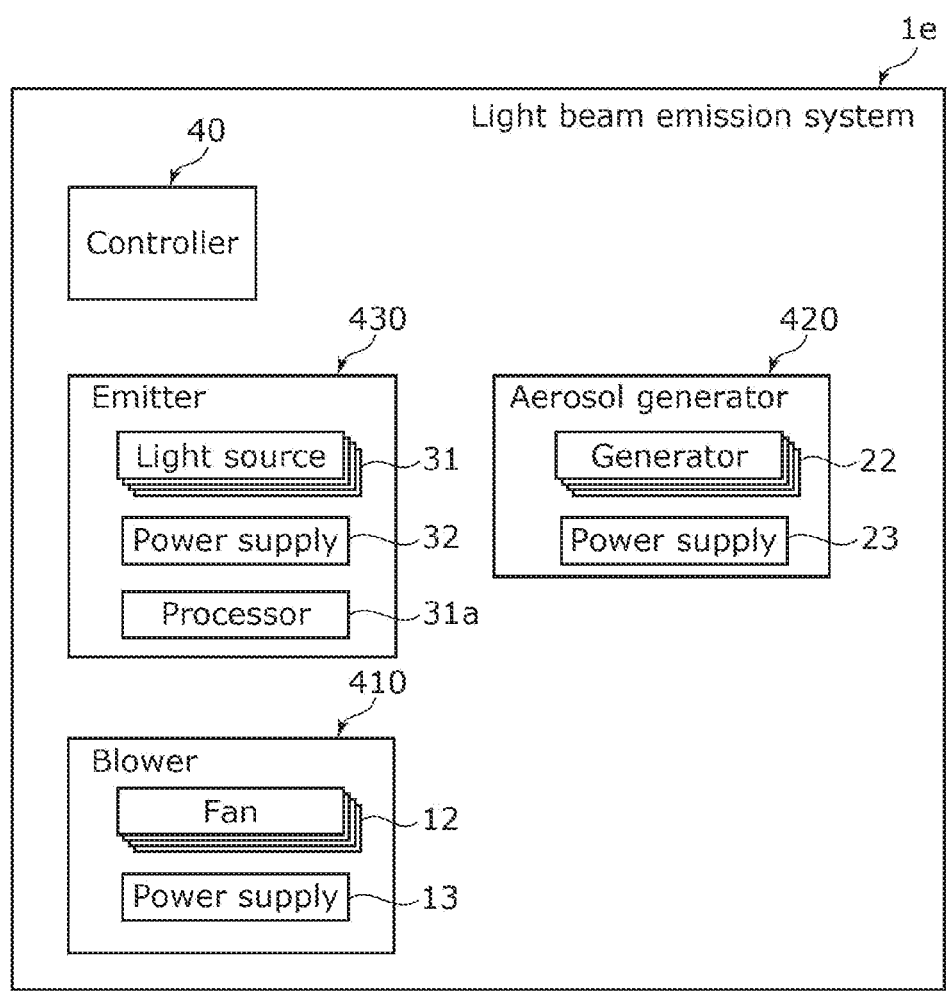
FIG. 13 is a block diagram illustrating a light beam emission system according to a variation of Embodiment 4.

FIG. 13 is a block diagram illustrating light beam emission system 1e according to a variation of Embodiment 4.

As illustrated in FIG. 13, controller 40 switches generators 22 of aerosol generator 420 between on and off and/or switches a plurality of fans 12 of blower 410 between on and off, thus causing aerosol to intermittently flow along the flow paths.

Further, controller 40 switches generators 22 of aerosol generator 420 and/or fans 12 of blower 410 between on and off based on image information, thus causing aerosol to be discharged according to the image information. Accordingly, controller 40 causes aerosol to intermittently flow along flow paths, using one aggregate of aerosol per pixel of an image indicated by image information. Controller 40 causes aggregates of aerosol corresponding to pixels to be discharged according to the image information, onto a display surface formed by the flow paths in which aerosol flows, thus expressing the image indicated by the image information as a raster image using a collection of aggregates of aerosol.

Here, examples of image information include text, graphic, symbol, and pattern. Image information is obtained from a server such as an external apparatus or is generated in response to an input from a user.

Note that aggregates of aerosol discharged by aerosol generator 420 may have the same size, but controller 40 may change the sizes of aggregates according to an image indicated by image information.

[Operation]

A display surface formed by flow paths in which aerosol flows in light beam emission system 1e according to this variation is to be described.

Figure 14:
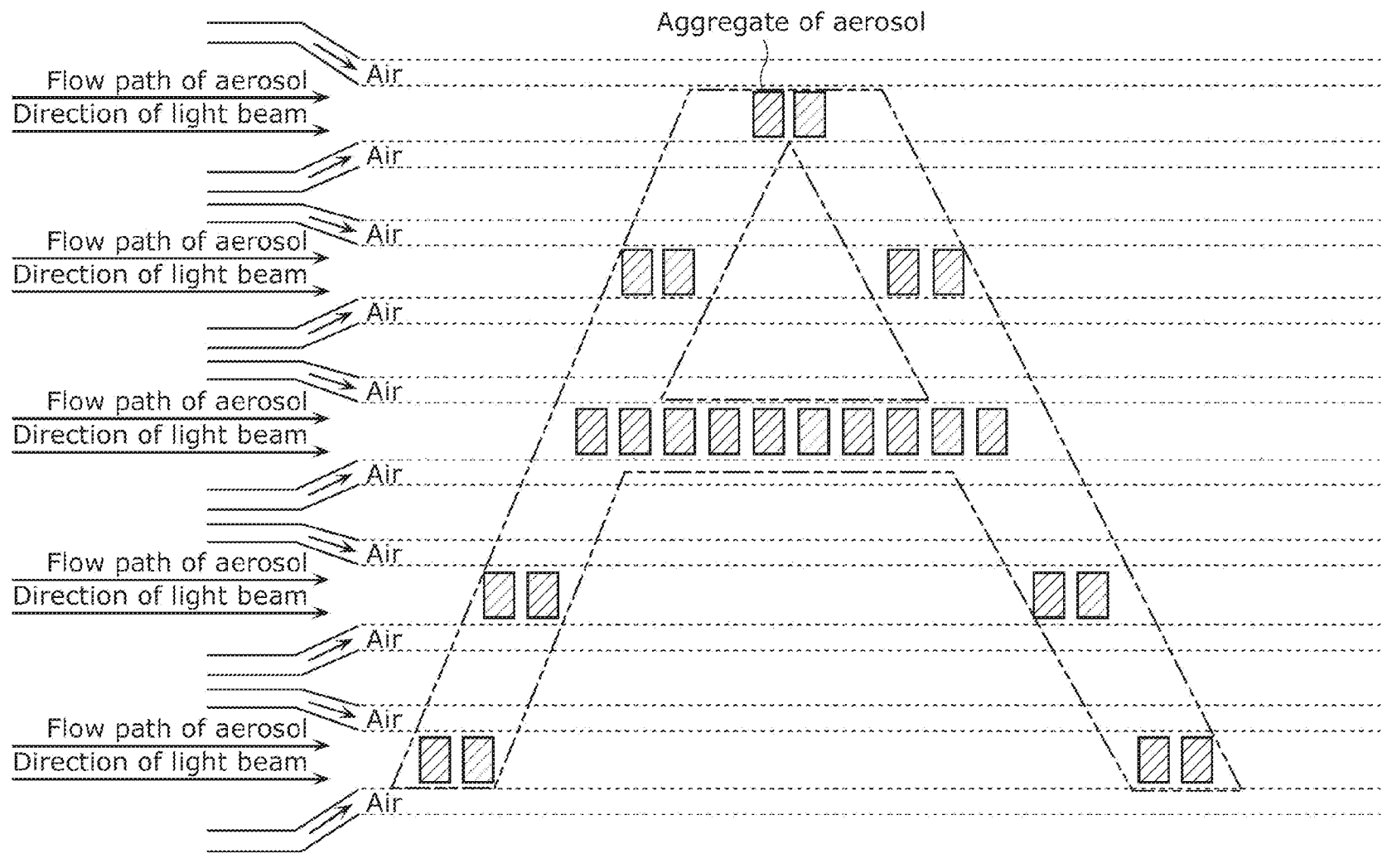
Figure 15:
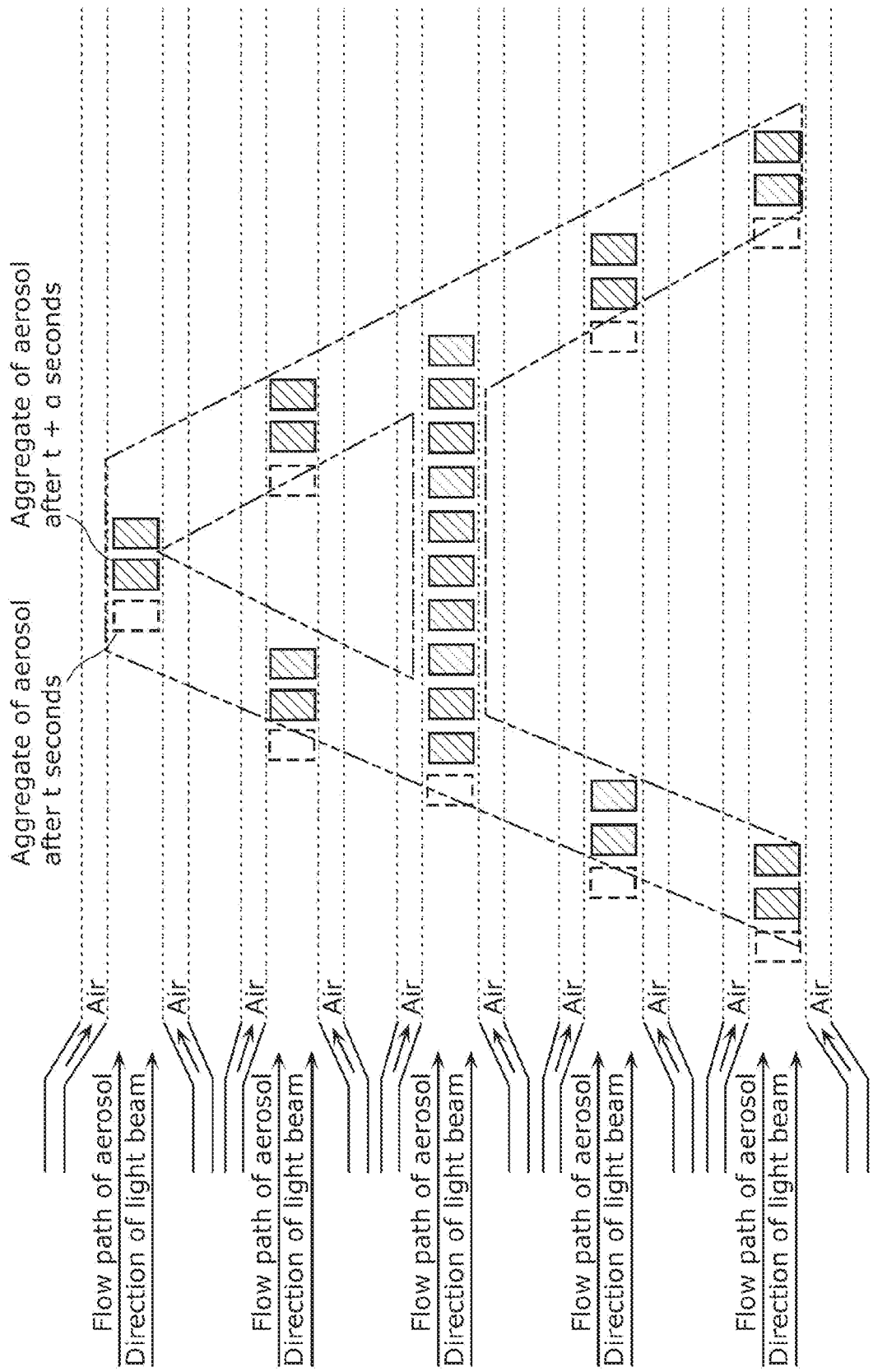
FIG. 15 illustrates the case where an image according to image information is displayed on a display surface formed by flow paths in which aerosol flows when a seconds have elapsed from the state in FIG. 14.

FIG. 14 illustrates the case where an image according to image information is displayed on a display surface formed by flow paths in which aerosol flows. FIG. 14 illustrates, as an example, a state in which t seconds have elapsed after discharge of aggregates of aerosol has started based on image information. FIG. 15 illustrates the case where an image according to image information is displayed on a display surface formed by flow paths in which aerosol flows when a seconds have elapsed from the state in FIG. 14. FIG. 14 and FIG. 15 illustrate that aggregates of aerosol giving off light are hatched with diagonal lines. FIG. 15 illustrates aggregates of aerosol after t seconds have elapsed using broken lines.

In light beam emission system 1e in FIG. 14, image information is text, and description is given using an English letter "A" as an example. In light beam emission system 1e in FIG. 14, an example is shown in which five blowers 410, five aerosol generators 420, five light sources 31, and five light guides are used. An image indicated by image information is a raster image that includes a collection of small pixels (dots). In FIG. 14 and FIG. 15, the velocity of aerosol flowing ranges from (m/sec) to 30 (m/sec), and a time for emitter 430 to emit light beams ranges from 3 (ms) to 6 (ms). A raster image after t seconds have elapsed has a size with a width of approximately 1 (m).

As illustrated in FIG. 14, controller 40 converts an image according to the number of pixels of an image indicated by image information and the number of blowers 410 (the number of first barrels) and/or the number of aerosol generators 420 (the number of second barrels), and controls blowers 410, aerosol generators 420, and light sources 31 according to the pixels of the converted image. Specifically, controller 40 controls blowers 410 and aerosol generators 420, to cause aggregates of aerosol to be intermittently discharged according to the positions of pixels that form an English letter "A" to form a collection that includes the aggregates of aerosol.

Controller 40 controls light sources 31 of emitter 430 to cause light beams emitted from light sources 31 to propagate through a collection of aggregates of aerosol. Accordingly, the light beams clearly make the image visible. As shown by the two-dot chain lines in FIG. 14 and FIG. 15, light beam emission system 1e expresses an English letter "A" shown by the converted image using a raster image on a display surface formed by flow paths in which aerosol flows.

The flow paths in which aerosol flows has a flow in the first direction, and thus the display surface formed by the flow paths in which aerosol flows also shifts in the first direction. Accordingly, the English letter "A" shown by the converted image also shifts in the first direction. In this manner, in light beam emission system 1e, aggregates of aerosol are discharged based on image information, and light beams propagate through the aggregates, which causes an image flowing in the first direction to appear.

Figure 16:
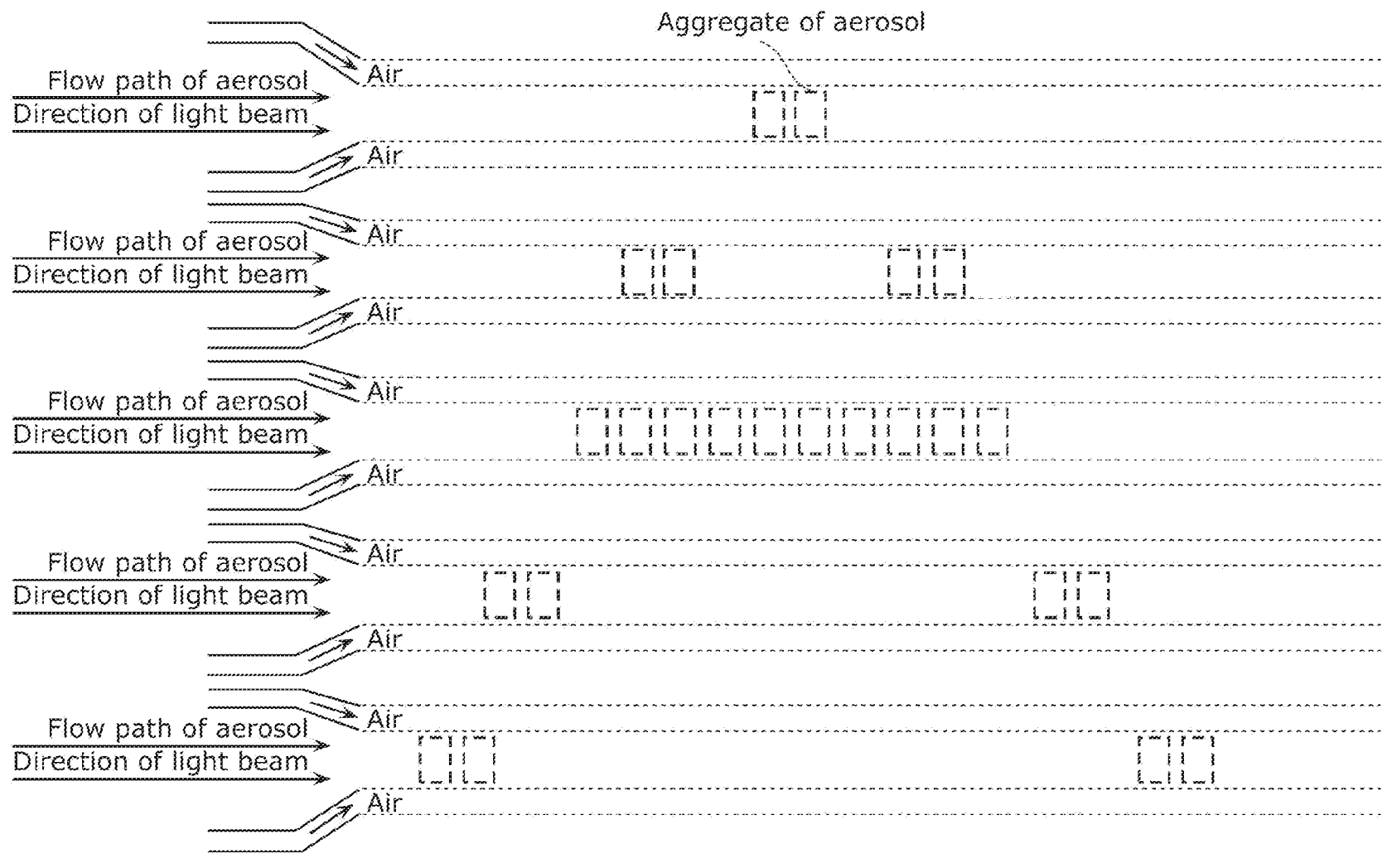

FIG. 16 illustrates the case where aggregates of aerosol according to image information are discharged onto a display surface formed by flow paths in which aerosol flows while emitter 430 is off. FIG. 16 illustrates aggregates of aerosol using broken lines.

As illustrated in FIG. 16, when controller 40 has placed emitter 430 in the off state, it is difficult to make an image visible using only aerosol, and thus an English letter "A" is hard to be seen.

In light beam emission system 1e in FIG. 14 to FIG. 16, aggregates of mist discharged from aerosol generator 420 are shown to have the same size as an example.

Figure 17:
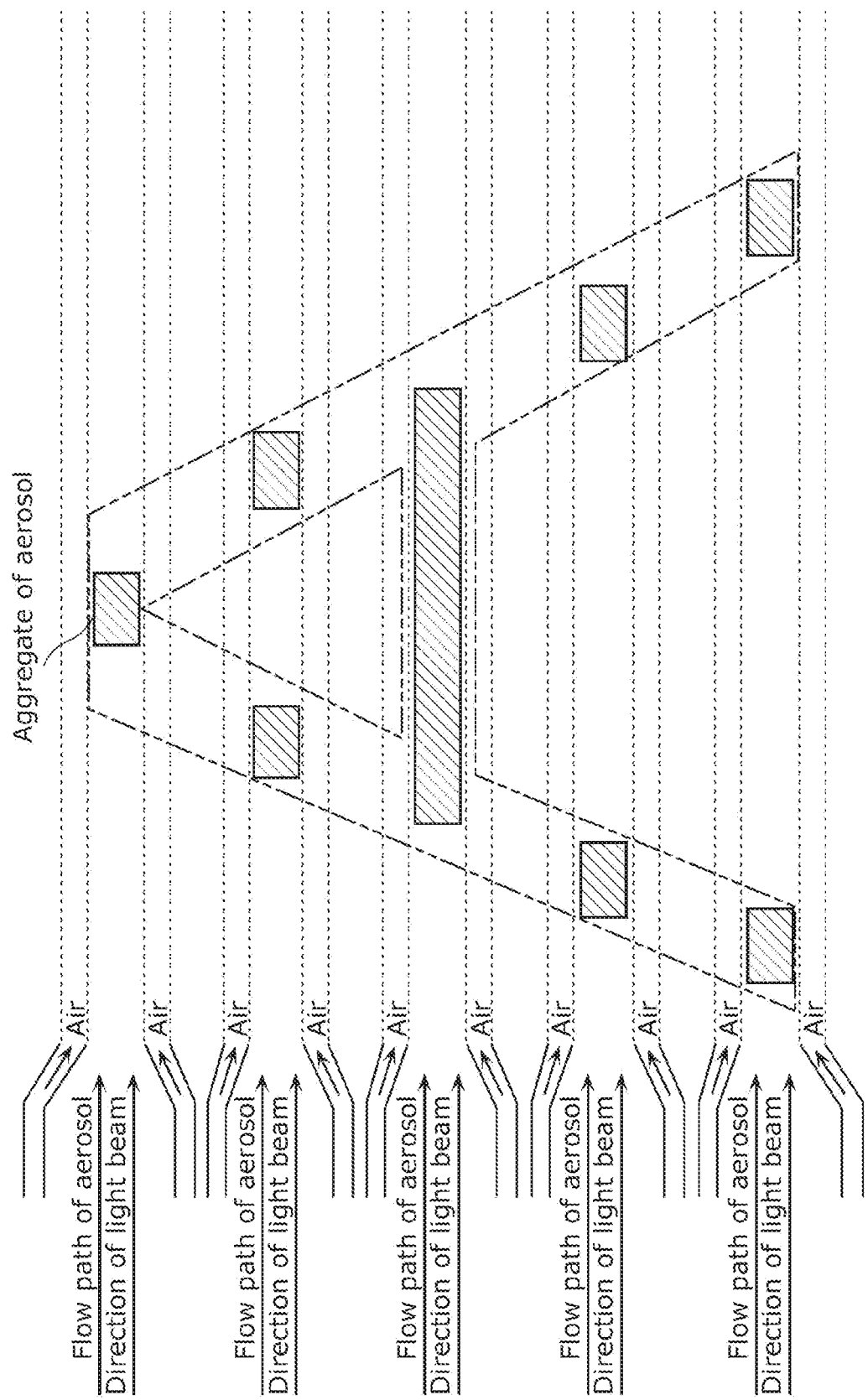
FIG. 17 illustrates the case where an image according to image information is displayed on a display surface formed by flow paths in which aerosol flows.
Figure 18:
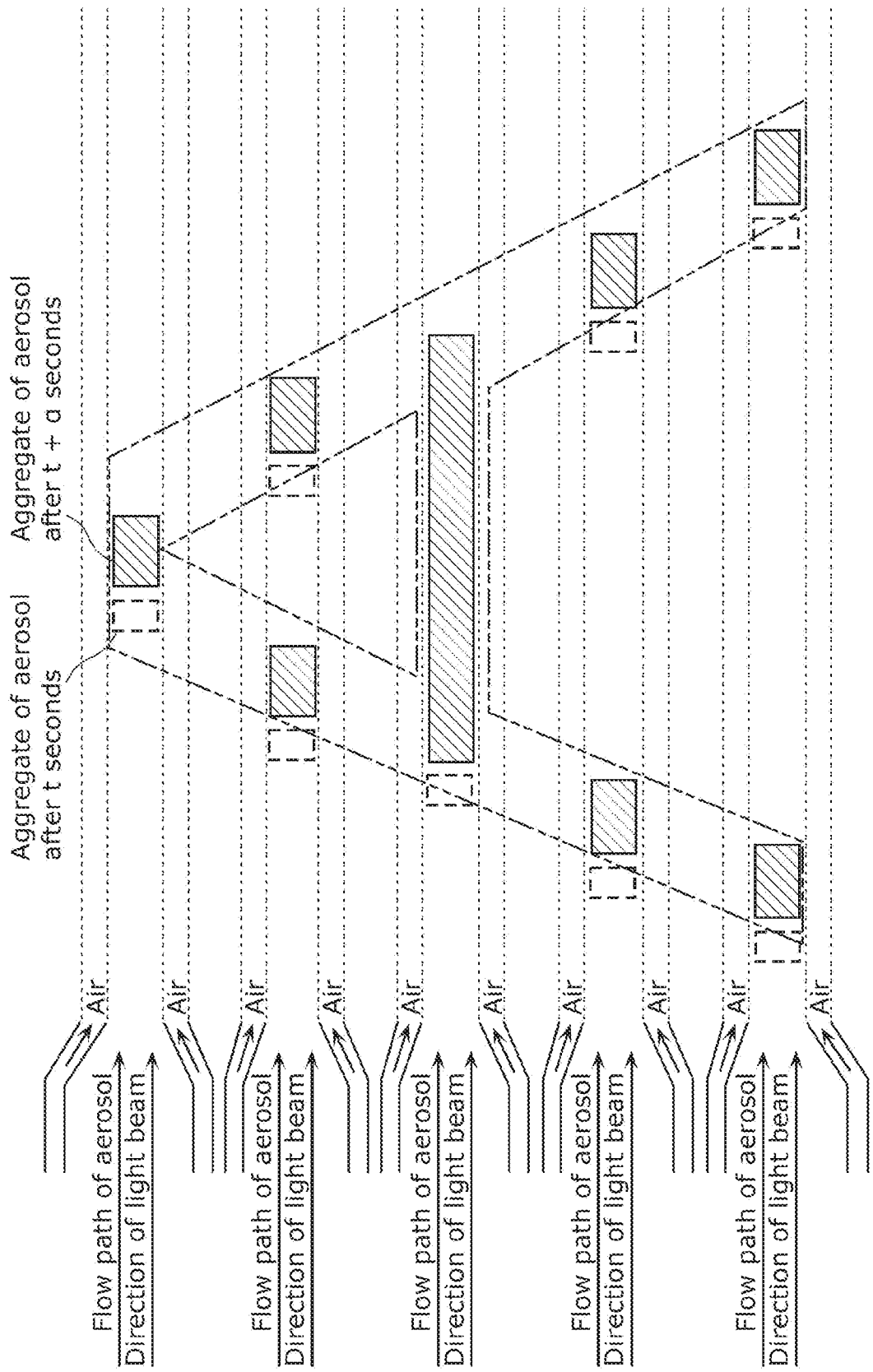
FIG. 18 illustrates the case where an image according to image information is displayed on a display surface formed by flow paths in which aerosol flows when a seconds have elapsed from the state in FIG. 17.

FIG. 17 illustrates the case where an image according to image information is displayed on a display surface formed by flow paths in which aerosol flows. FIG. 18 illustrates, as an example, a state in which t seconds have elapsed after discharge of aggregates of aerosol has started based on image information. FIG. 18 illustrates the case where an image according to image information is displayed on a display surface formed by flow paths in which aerosol flows when a seconds have elapsed from the state in FIG. 17. FIG. 17 and FIG. 18 illustrate that aggregates of aerosol giving off light are hatched with diagonal lines. FIG. 18 illustrates aggregates of aerosol after t seconds have elapsed using broken lines.

In light beam emission system 1e in FIG. 17 and FIG. 18, aggregates of mist discharged from aerosol generator 420 are shown to have various sizes as an example. As illustrated in FIG. 17 and FIG. 18, controller 40 may control generation of aerosol by aerosol generator 420 to give various sizes to aggregates of mist that aerosol generator 420 discharges. Also in this case, in light beam emission system 1e, aggregates of aerosol are discharged based on image information, and light beams propagate through the aggregates, which causes an image shifting in the first direction to appear as shown by the two-dot chain lines in FIG. 17 and FIG. 18.

This variation also achieves similar operations and effects to those in Embodiment 1, for instance.

Embodiment 5

A configuration of light beam emission system 1f according to the present embodiment is to be described.

The other configuration of the present embodiment is similar to, for instance, Embodiment 4 unless otherwise stated in particular, and the same sign is given to the same configuration while a detailed description of the same configuration is omitted.

[Configuration: Light Beam Emission System 1f]

In light beam emission system 1d according to Embodiment 4, light beams emitted by emitter 430 propagate into aerosol, whereas in the present embodiment, beam splitter splits a first light beam into a plurality of light beams, which differs from Embodiment 4, for instance.

Figure 19:
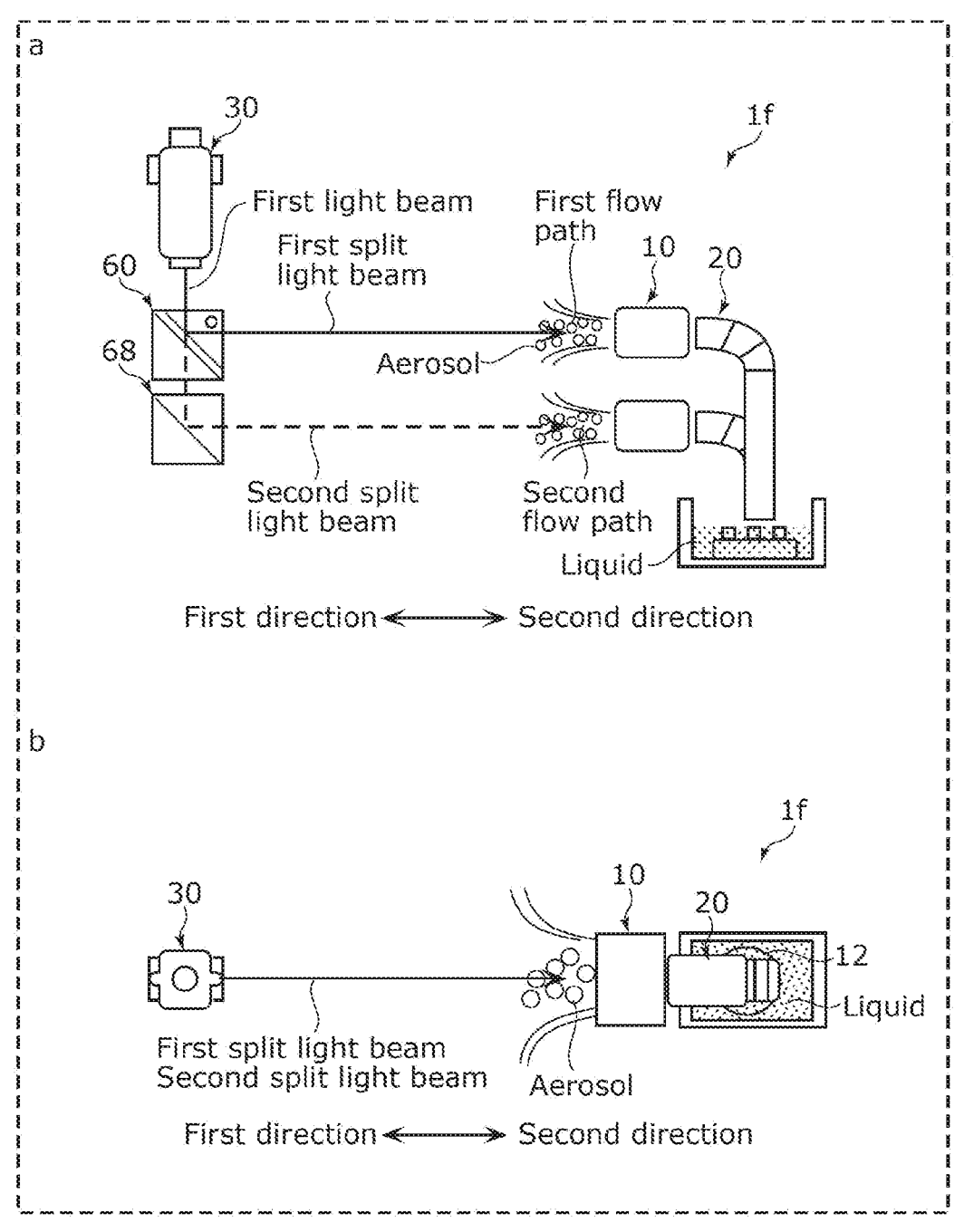

FIG. 19 is a schematic diagram illustrating light beam emission system 1f according to Embodiment 5. Part a of FIG. 19 is a side view of light beam emission system 1f according to Embodiment 5, and b of FIG. 19 is a top view of light beam emission system 1f according to Embodiment 5.

As illustrated in FIG. 1 and FIG. 19, in the present embodiment, blower 10 includes two first barrels, aerosol generator 20 includes two second barrels, and emitter 30 includes two light sources. The two first barrels are disposed in the vertical direction, the two second barrels are disposed in the vertical direction, and the two light sources are disposed in the vertical direction. Accordingly, two flow paths in which aerosol flows are formed in the present embodiment. In the present embodiment, a flow path located on the vertical upper side may be referred to as a first flow path, and a flow path on the vertical lower side may be referred to as a second flow path, unless otherwise stated in particular.

Emitter 30 is disposed above, below, or on the side of the flow paths in which aerosol flows. Emitter 30 is disposed in an orientation in which a first light beam emitted crosses the first direction and the second direction. In the present embodiment, emitter 30 is fixed on a construction material such as a ceiling, and is disposed in an orientation in which the first light beam emitted is substantially orthogonal to the first direction and the second direction. In the present embodiment, emitter 30 is disposed above the flow paths in which aerosol flows.

Note that emitter 30 may be disposed at blower 10 or aerosol generator 20, or disposed frontward than blower 10 and aerosol generator 20 so as to face blower 10 and aerosol generator 20.

Emitter 30 further includes beam splitter 60 and optical element 68, in addition to the light sources and the light guides.

<Beam Splitter 60>

Beam splitter 60 is disposed on an optical axis of the first light beam emitted by emitter 30 and on a straight line of the first flow path in which aerosol flows. Specifically, beam splitter 60 crosses the central axis of one of the first barrels of blower 10 and the central axis of one of the second barrels of aerosol generator 20, and is disposed on the front side, facing the first barrel and the second barrel on the vertical upper side in the present embodiment. In the present embodiment, emitter 30 is fixed on the ceiling, and thus beam splitter 60 is disposed vertically below emitter 30 and vertically above optical element 68.

Note that beam splitter 60 may be disposed backward than the first barrels and the second barrels if beam splitter 60 can cause a first split light beam and a second split light beam to propagate into aerosol flowing in the first flow path and aerosol flowing in the second flow path.

Beam splitter 60 is an optical member (a half mirror) that splits a first light beam that enters beam splitter 60 into reflected light and transmitted light at a predetermined ratio. Beam splitter 60 transmits a first split light beam that is part of the first light beam emitted by one light source 31 and reflects a second split light beam that is the remaining of the first light beam and has a wavelength different from that of the first split light beam, so that the first light beam is split into the first split light beam and the second split light beam. The first light beam here is an example of the light beam described above.

Beam splitter 60 and optical element 68 cause the first split light beam and the second split light beam to travel in the second direction in a state in which the optical axis of the first split light beam and the optical axis of the second split light beam are aligned so as to be substantially parallel to each other. Accordingly, the first split light beam propagates along the first flow path of aerosol.

Beam splitter 60 is formed by stacking a multilayer film on a transparent resin material such as, for example, glass material, acrylic, or polycarbonate.

Note that in the present embodiment, one beam splitter 60 is used, yet a plurality of beam splitters 60 may be used. Thus, the number of beam splitters 60 may be changed according to the number of flow paths in which aerosol flows.

<Optical Element 68>

Optical element 68 is disposed on an optical axis of the first light beam emitted by emitter 30 and on a straight line of the second flow path in which aerosol flows, and furthermore on a side toward which beam splitter 60 causes the second split light beam to travel. Specifically, optical element 68 crosses the central axis of one of the first barrels of blower 10 and the central axis of one of the second barrels of aerosol generator 20, and is disposed on the front side, facing the first barrel and the second barrel on the vertical lower side in the present embodiment.

Note that optical element 68 may be disposed backward than the first barrels and the second barrels if optical element 68 can cause the second split light beam to propagate into aerosol flowing in the second flow path.

Optical element 68 is a light reflection member that changes the direction in which the second split light beam propagates to a propagation direction along the second flow path of aerosol. Thus, optical element 68 guides the second split light beam in the second direction. For example, when the direction in which the second split light beam exiting from beam splitter 60 travels crosses the first split light beam exiting from beam splitter 60, optical element 68 guides the second split light beam in a direction substantially parallel to the second direction. In the present embodiment, optical element 68 is a light reflection member that is mirror-finished, and reflects the second split light beam in a direction substantially parallel to the second direction. Examples of optical element 68 include a mirror, an optical fiber, and a light guide.

[Operation]

Operation of emitter 30 in light beam emission system **1*f*** according to the present embodiment is to be described.

Controller 40 generates aerosol by controlling aerosol generator 20. Aerosol generated by aerosol generator 20 is discharged out of aerosol generator 20 through a container, an aerosol guide, and the second barrels. At this time, controller controls emitter 30 to place emitter 30 in the on state, so that emitter 30 emits a first light beam vertically downward.

The first light beam emitted by emitter 30 enters beam splitter 60. Beam splitter 60 splits the first light beam that has entered into a first split light beam and a second split light beam. Beam splitter 60 causes the first split light beam to propagate in the second direction along the first flow path in which aerosol flows.

Beam splitter 60 causes the second split light beam to travel vertically downward and enter optical element 68. Optical element 68 reflects the second split light beam that has entered, and causes the second split light beam to propagate in the second direction along the second flow path in which aerosol flows.

Accordingly, in light beam emission system **1*f***, the first split light beam propagates along the first flow path and the second split light beam propagates along the second flow path, so that the color of light given off by aerosol flowing in the first flow path and the color of light given off by aerosol flowing in the second flow path are different from each other.

[Operations and Effects]

The following describes operations and effects of light beam emission system **1*f*** according to the present embodiment.

In light beam emission system **1*f* according to the present embodiment, emitter 30 includes beam splitter 60 that splits a first light beam into a first split light beam and a second split light beam, the first light beam being one of the one or more light beams emitted by one or more light sources 31**, the second split light beam having a wavelength different from a wavelength of the first split light beam.

According to this, a plurality of types of light beams having different wavelengths can be emitted using one light source 31. Accordingly, the colors of light beams propagating along the flow paths in which aerosol flows can be changed, and thus how the flow paths in which aerosol flows are viewed can be changed.

In light beam emission system 1f according to the present embodiment, the first split light beam propagates along the flow path of the aerosol.

According to this, aerosol is irradiated with the first split light beam, and thus it can be ensured that the first split light beam is made visible.

In light beam emission system 1f according to the present embodiment, emitter 30 includes optical element 68 that changes a direction of the second split light beam to a direction along the flow path of the aerosol.

According to this, aerosol is irradiated with the second split light beam, and thus it can be ensured that the second split light beam is made visible. Accordingly, the second split light has a color different from the color of the first split light beam so that the colors of light beams propagating along the flow paths in which aerosol flows can be changed, and thus how the flow paths in which aerosol flows are viewed can be changed.

The present embodiment also achieves similar operations and effects to those in Embodiment 4, for instance.

Embodiment 6

A configuration of light beam emission system 1g according to the present embodiment is to be described.

The other configuration of the present embodiment is similar to, for instance, Embodiment 5 unless otherwise stated in particular, and the same sign is given to the same configuration while a detailed description of the same configuration is omitted.

[Configuration: Light Beam Emission System 1g]

In light beam emission system 1f according to Embodiment 5, a single emitter is used, whereas the present embodiment shows an example in which a plurality of emitters and a plurality of beam splitters are used, which differs from Embodiment 5, for instance.

Figure 20:
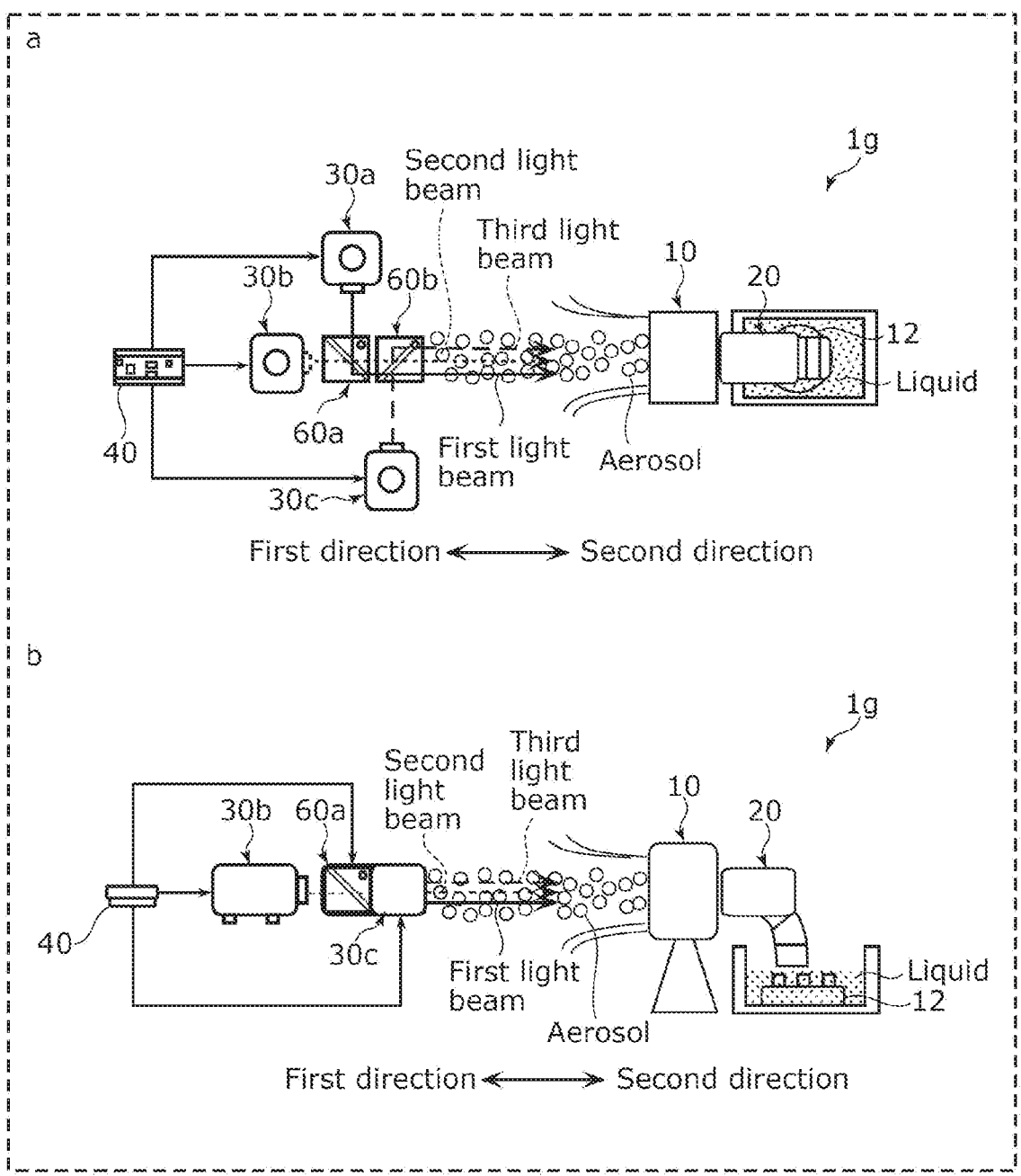
FIG. 20 is a schematic diagram illustrating a light beam emission system according to Embodiment 6.

FIG. 20 is a schematic diagram illustrating light beam emission system 1g according to Embodiment 6. Part a of FIG. is a top view of light beam emission system 1g according to Embodiment 6, and b of FIG. 20 is a side view of light beam emission system 1g according to Embodiment 6.

As illustrated in FIG. 1 and FIG. 20, light beam emission system 1g according to the present embodiment includes first emitter 30a that emits a first light beam, second emitter 30b that emits a second light beam, third emitter 30c that emits a third light beam, and a plurality of beam splitters. Note that light beam emission system 1g may include at least two emitters, and thus may not include one of first emitter 30a, second emitter 30b, and third emitter 30c. Thus, one of first emitter 30a, second emitter 30b, and third emitter 30c is not a structural element necessary for light beam emission system 1g.

The wavelength of the first light beam is different from the wavelength of the second light beam and the wavelength of the third light beam. Also, the wavelength of the second light beam is different from the wavelength of the third light beam. In the present embodiment, the first light beam is a red light beam, the second light beam is a blue light beam, and the third light beam is a green light beam. A red light beam is light in a wavelength range, which can be perceived to be red. A blue light beam is light in a wavelength range, which can be perceived to be blue. A green light beam is light in a wavelength range, which can be perceived to be green.

As illustrated in FIG. 20, first emitter 30a and third emitter 30c are disposed in positions so as to face each other such that the first light beam and the third light beam cross a flow path in which aerosol flows and are substantially parallel to each other. In the present embodiment, in order that the first light beam and the third light beam are substantially orthogonal to the flow path in which aerosol flows, first emitter 30a and third emitter 30c are disposed with the flow path being located therebetween. Second emitter 30b is disposed in a position where second emitter 30b faces the first barrel of blower 10 and the second barrel of aerosol generator 20 with first beam splitter and second beam splitter 60b being provided therebetween, to cause a second light beam to propagate in the second direction along a flow path in which aerosol flows.

A plurality of beam splitters are disposed on a line extending from a flow path in which aerosol flows. In FIG. 20, the case where first beam splitter 60a and second beam splitter out of the plurality of beam splitters are used is to be described.

First beam splitter 60a is disposed so as to be located on a first light beam and a second light beam and furthermore, between second emitter 30b and second beam splitter 60b. A first light beam and a second light beam enter first beam splitter 60a. First beam splitter 60a transmits and guides the second light beam to second beam splitter 60b. First beam splitter 60a reflects and guides the first light beam to second beam splitter 60b. In the present embodiment, first beam splitter 60a has a function of reflecting a light beam in a red wavelength range and transmitting a light beam in another wavelength range (for example, a blue light beam and a green light beam). Note that first beam splitter 60a may be a light reflection member having a function of reflecting only a first light beam and absorbing light in another wavelength range.

Second beam splitter 60b is disposed so as to be located on a second light beam and a third light beam and furthermore, between first beam splitter 60a and the first and second barrels. A first light beam and a second light beam that have passed through first beam splitter 60a and a third light beam emitted by third emitter 30c enter second beam splitter 60b. Second beam splitter 60b transmits a first light beam and a second light beam, and causes the first light beam and the second light beam to propagate in the second direction along a flow path in which aerosol flows. Second beam splitter 60b reflects a third light beam, and causes the third light beam to propagate in the second direction along a flow path in which aerosol flows. In the present embodiment, second beam splitter 60b has a function of reflecting a light beam in a green wavelength range and transmitting a light beam in another wavelength range (for example, a red light beam and/or a blue light beam). Note that second beam splitter 60b may be a light reflection member having a function of reflecting only a third light beam and absorbing light in another wavelength range.

[Operation]

Propagation of a light beam in light beam emission system 1g according to the present embodiment is to be described.

Figure 21A:
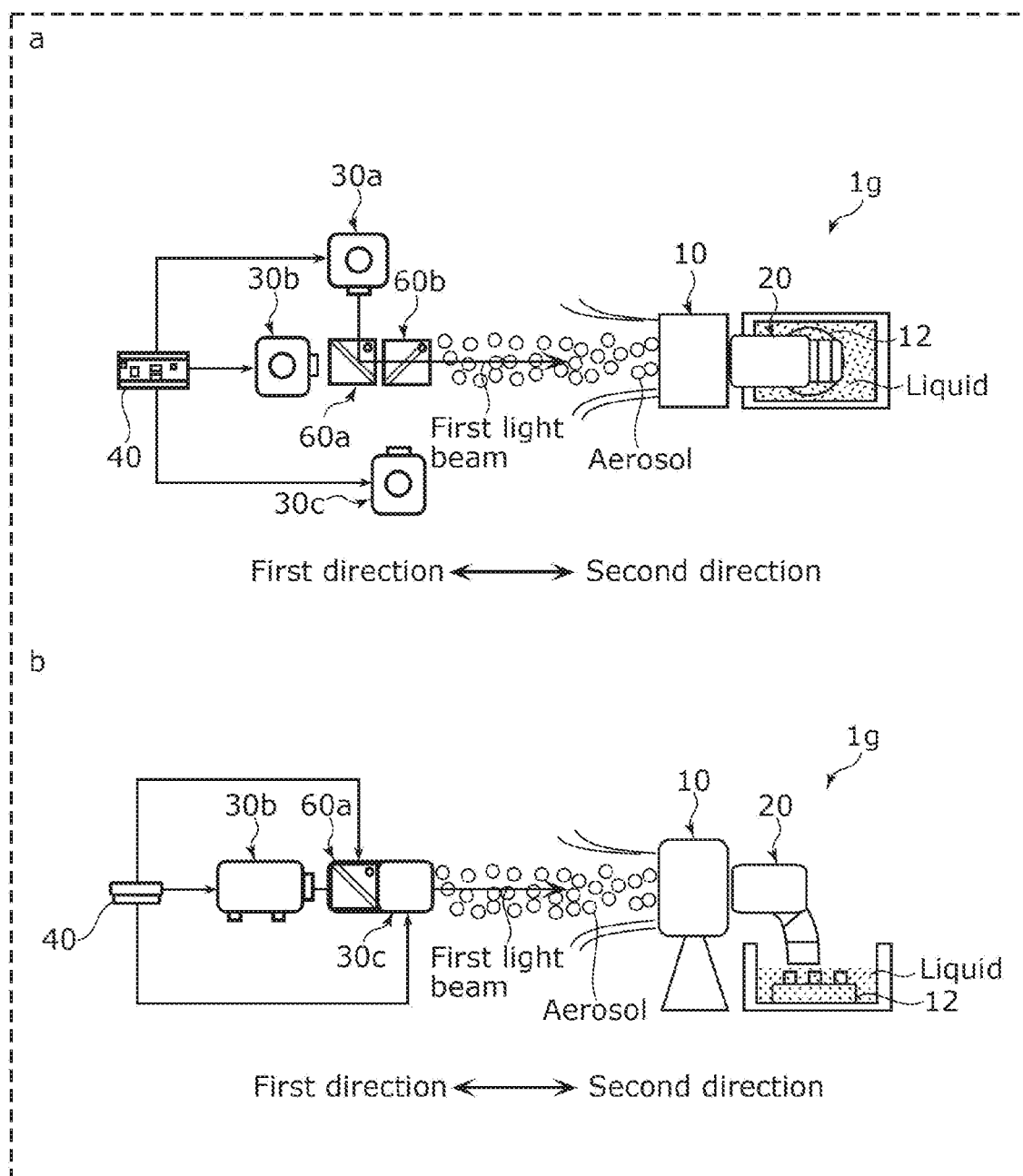
FIG. 21A is a schematic diagram illustrating a state in which a first light beam from a first emitter in the light beam emission system according to Embodiment 6 propagates into aerosol flowing in a flow path.

FIG. 21A is a schematic diagram illustrating a state in which a first light beam from first emitter 30a in light beam emission system 1g according to Embodiment 6 propagates into aerosol flowing in a flow path. Part a of FIG. 21A is a top view of light beam emission system 1g according to Embodiment 6, and b of FIG. 21A is a side view of light beam emission system 1g according to Embodiment 6.

As illustrated in FIG. 21A, first beam splitter 60a reflects a light beam emitted by first emitter 30a, and guides the light beam to second beam splitter 60b. Second beam splitter 60b transmits a first light beam, and thus the first light beam propagates along a flow path in which aerosol flows. Accordingly, the flow path in which aerosol flows gives off red light in FIG. 21A.

Figure 21B:
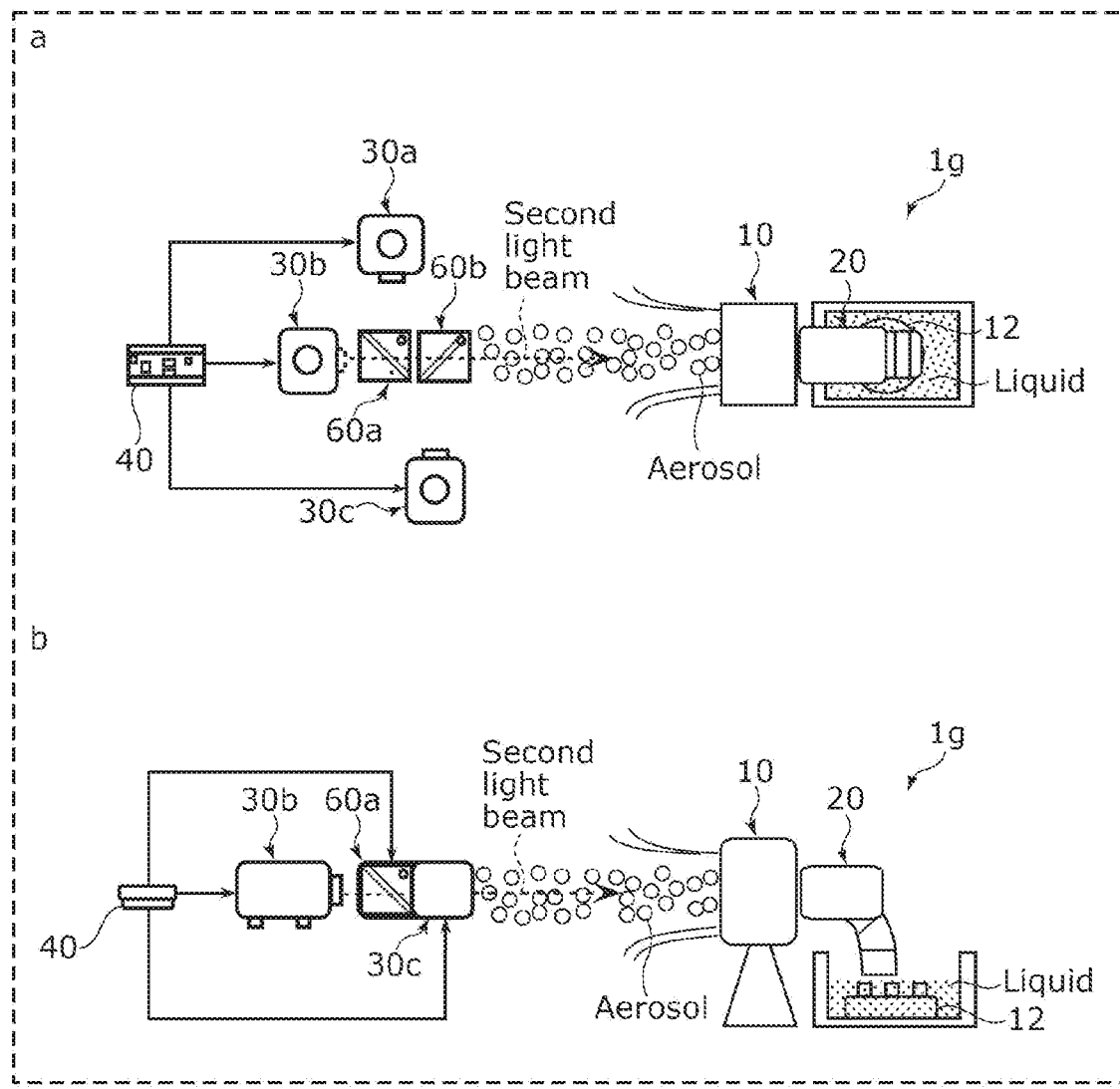
FIG. 21B is a schematic diagram illustrating a state in which a second light beam from a second emitter in the light beam emission system according to Embodiment 6 propagates into aerosol flowing in a flow path.

FIG. 21B is a schematic diagram illustrating a state in which a second light beam from second emitter 30b in light beam emission system 1g according to Embodiment 6 propagates into aerosol flowing in a flow path. Part a of FIG. 21B is a top view of light beam emission system 1g according to Embodiment 6, and b of FIG. 21B is a side view of light beam emission system 1g according to Embodiment 6.

As illustrated in FIG. 21B, a light beam emitted by second emitter 30b passes through first beam splitter 60a and second beam splitter 60b, and thus a second light beam propagates along a flow path in which aerosol flows. Accordingly, the flow path in which aerosol flows gives off blue light in FIG. 21B.

Figure 21C:
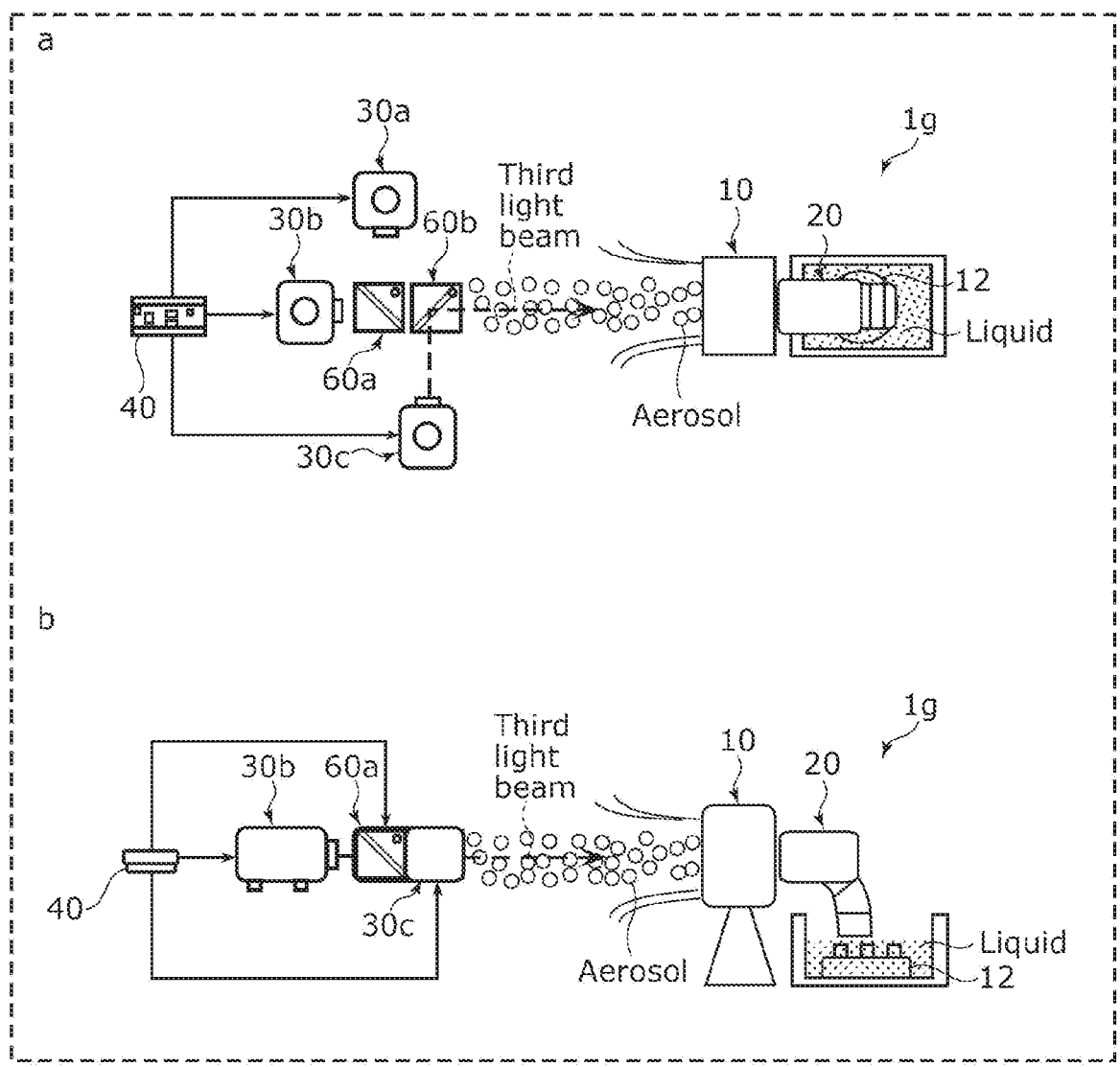
FIG. 21C is a schematic diagram illustrating a state in which a third light beam from a third emitter in the light beam emission system according to Embodiment 6 propagates into aerosol flowing in a flow path.

FIG. 21C is a schematic diagram illustrating a state in which a third light beam from third emitter 30c in light beam emission system 1g according to Embodiment 6 propagates into aerosol flowing in a flow path. Part a of FIG. 21C is a top view of light beam emission system 1g according to Embodiment 6, and b of FIG. 21C is a side view of light beam emission system 1g according to Embodiment 6.

As illustrated in FIG. 21C, a light beam emitted by third emitter 30c is reflected by second beam splitter 60b, and a third light beam propagates along a flow path in which aerosol flows. Accordingly, the flow path in which aerosol flows gives off green light in FIG. 21C.

In all the cases illustrated in FIG. 20 to FIG. 21C, controller 40 controls first emitter 30a, second emitter 30b, and third emitter 30c individually, thus changing a light beam that propagates along a flow path in which aerosol flows. Thus, controller 40 combines one or more light beams out of the first light beam, the second light beam, and the third light beam, to change the color of a light beam that propagates along a flow path in which aerosol flows.

beam to first beam splitter 60a. In this variation, second beam splitter 60b has a function of reflecting a light beam in a green wavelength range and transmitting a light beam in another wavelength range (for example, a red light beam and a blue light beam). Note that fourth beam splitter 60d may be a light reflection member having a function of reflecting only a third light beam and absorbing light in another wavelength range.

This variation also achieves similar operations and effects to those in Embodiment 6, for instance.

Embodiment 7

A configuration of light beam emission system 1h according to the present embodiment is to be described.

The other configuration of the present embodiment is similar to, for instance, Embodiment 1 unless otherwise stated in particular, and the same sign is given to the same configuration while a detailed description of the same configuration is omitted.

[Configuration: Light Beam Emission System 1h]

Figure 23:
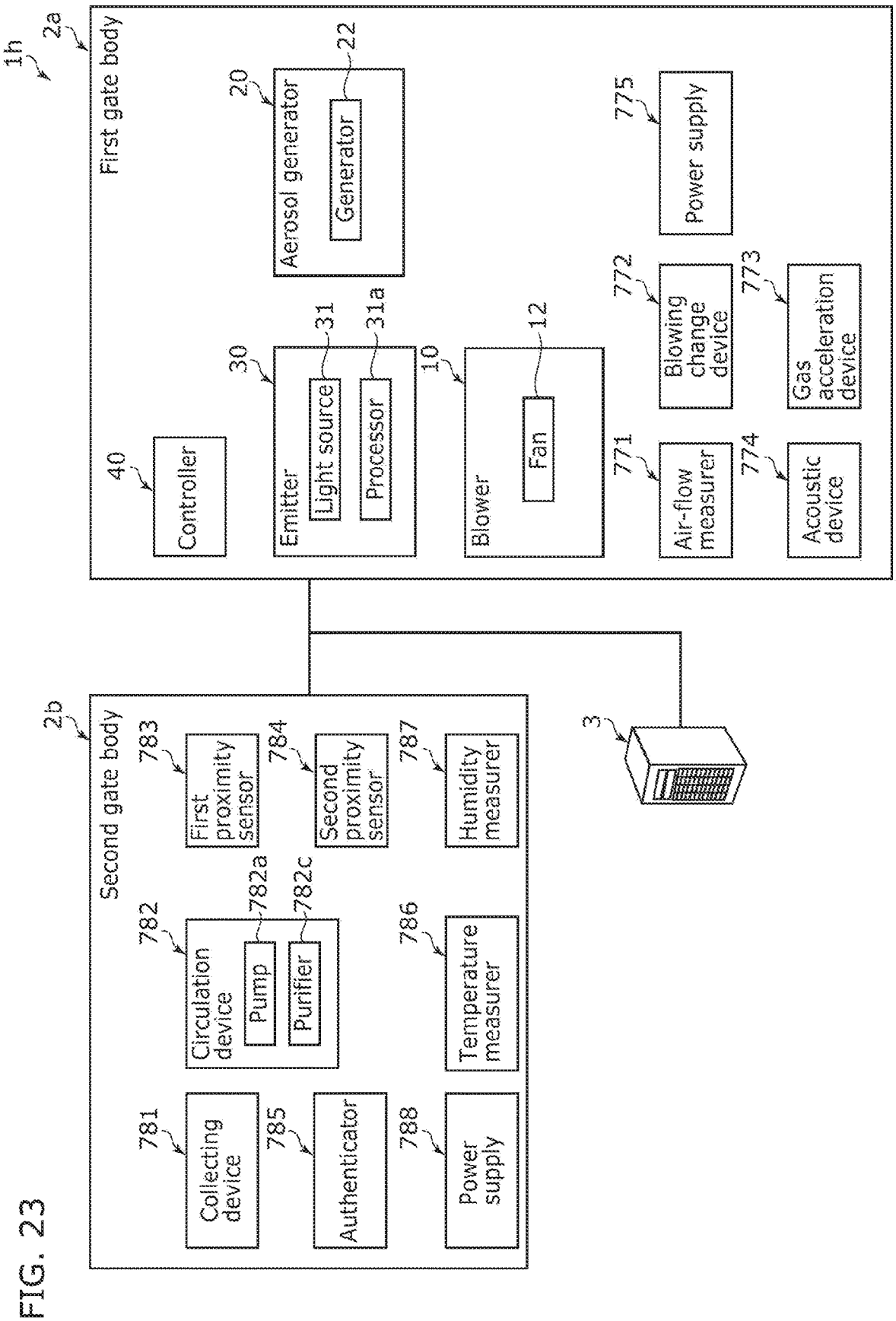
FIG. 23 is a block diagram illustrating a light beam emission system according to Embodiment 7.
Figure 24:
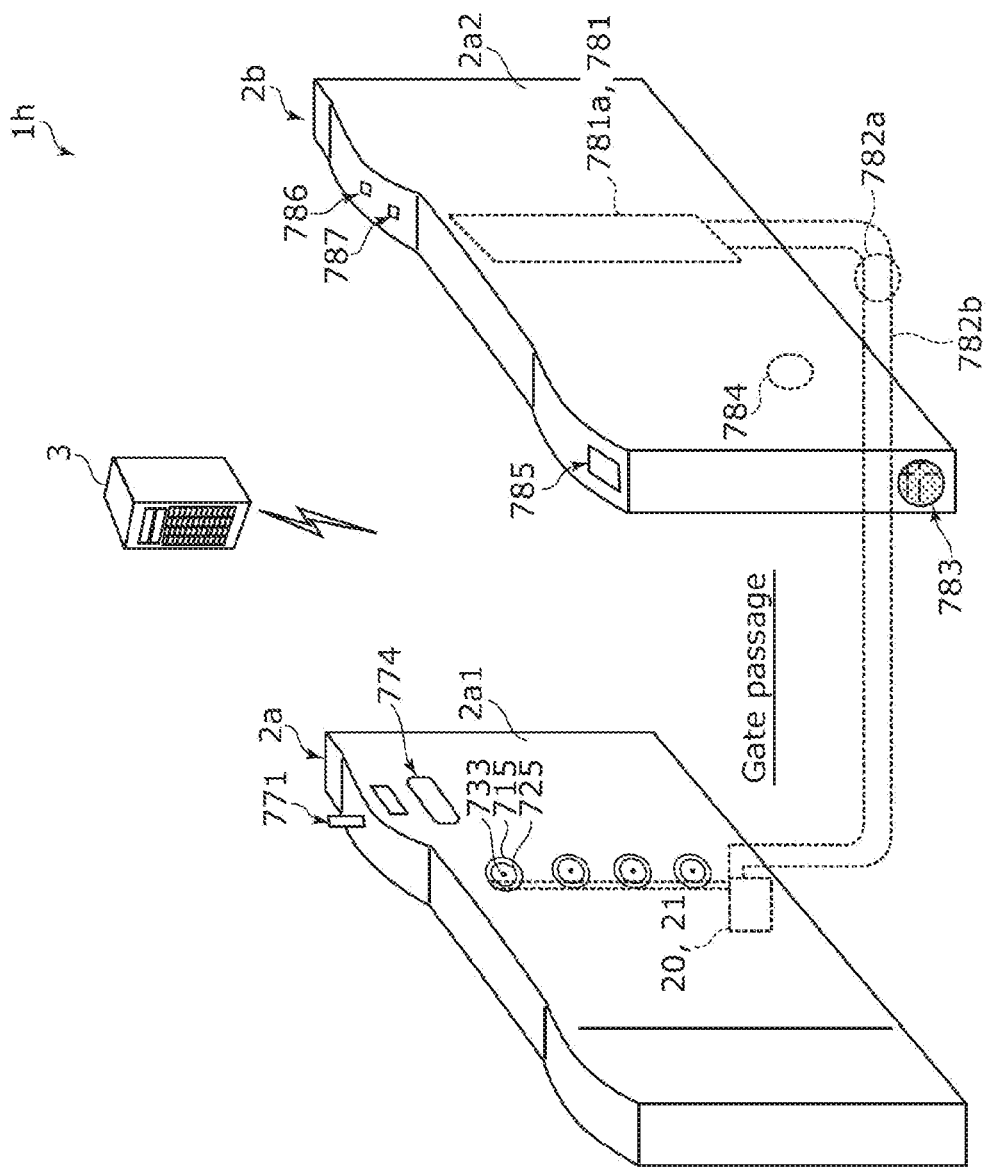
FIG. 24 is a schematic diagram illustrating the light beam emission system according to Embodiment 7.
Figure 25:
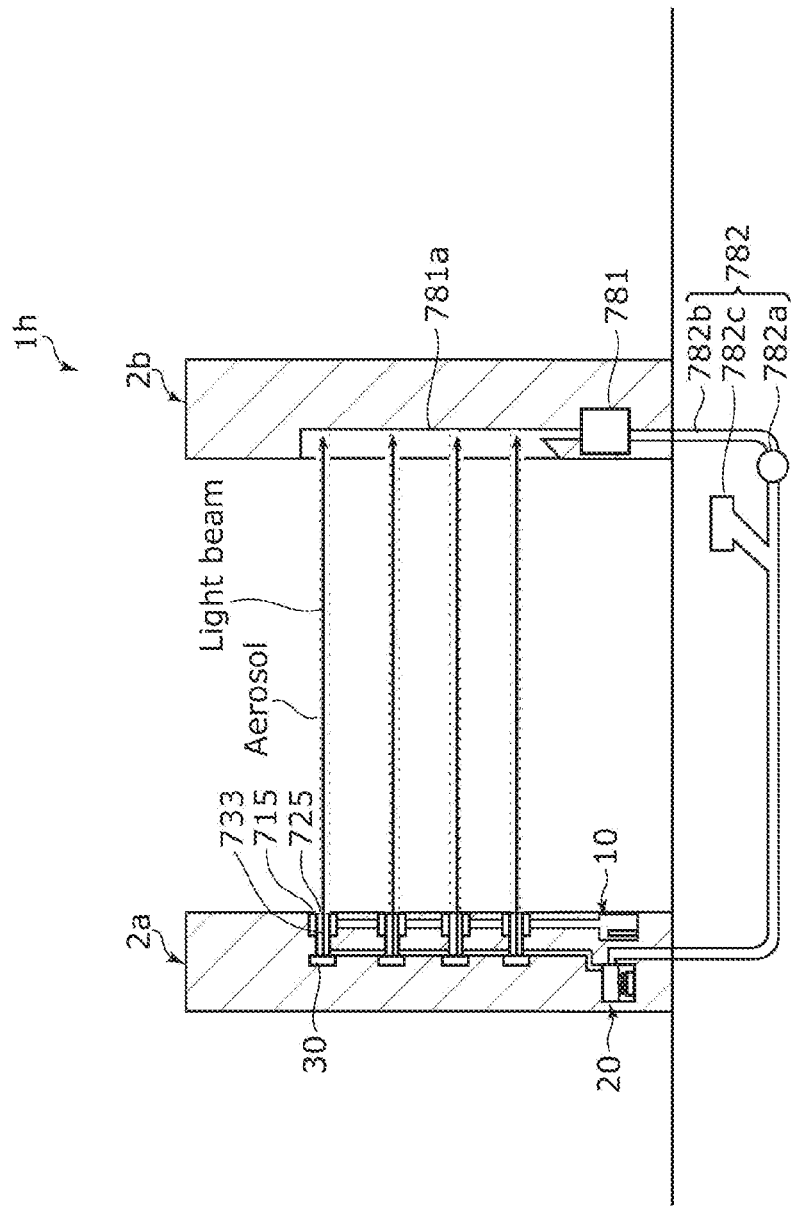
FIG. 25 is a cross sectional view illustrating the case where a pair of gate bodies of the light beam emission system according to Embodiment 7 are cut along a flow path in which aerosol flows.

FIG. 23 is a block diagram illustrating light beam emission system 1h according to Embodiment 7. FIG. 24 is a schematic diagram illustrating light beam emission system 1h according to Embodiment 7. FIG. 25 is a cross sectional view illustrating the case where a pair of gate bodies of light beam emission system 1h according to Embodiment 7 are cut along a flow path in which aerosol flows.

As illustrated in FIG. 23, FIG. 24, and FIG. 25, light beam emission system 1h includes a pair of gate bodies and server device 3.

<Gate Body>

A pair of gate bodies constitute a gate device (an automatic gate device) that includes first gate body 2a and second gate body 2b. First gate body 2a and second gate body 2b function as a gate that allows an approaching object moving along a passage to pass through or prohibits the approaching object from passing through. An approaching object is a mobile object such as a person, an animal, a cart, or a wheel chair.

First gate body 2a and second gate body 2b are disposed, facing each other. First gate body 2a and second gate body 2b are separated with a given space therebetween, as a gate passage for an approaching object that satisfies a predetermined condition to pass through. Stated differently, first gate body 2a and second gate body 2b are disposed, facing each other with a gate passage being located therebetween. An approaching object passes through the gate passage bidirectionally. The external shape of first gate body 2a and the external shape of second gate body 2b are the same. First gate body 2a is communicably connected to second gate body 2b in a wireless or wired manner. Note that a plurality of first gate bodies 2a and a plurality of second gate bodies 2b may be included, and the numbers of the bodies are not limited in particular. The same applies to elements included in first gate body 2a and second gate body 2b.

<First Gate Body 2a>

First gate body 2a includes air-flow measurer 771, blowing change device 772, gas acceleration device 773, acoustic device 774, and power supply 775, in addition to blower 10, aerosol generator 20, emitter 30, and controller 40 that are described above. Thus, first gate body 2a stores, in casing 2a1, blower 10, aerosol generator 20, emitter 30, controller 40, air-flow measurer 771, blowing change device 772, gas acceleration device 773, and acoustic device 774.

In first gate body 2a, one or more second openings 715 and one or more discharge ports 725 are concentrically formed in order that blower 10 and aerosol generator 20 form a flow path in which aerosol flows in the first direction. In each pair of one or more second openings 715 and one or more discharge ports 725, light source 31 for emitting a light beam is disposed, and a light beam is emitted through light guide 733 in second opening 715 in the pair. In the present embodiment, four second openings 715 are formed. Second openings 715 are formed in the side facing second gate body 2b, being arranged in the vertical direction.

<Air-Flow Measurer 771>

Air-flow measurer 771 is disposed on the top surface of casing 2a1, measures the velocity and the direction of an air flow through the gate passage, and outputs air-flow information that is a result of the measurement to controller 40 at predetermined time intervals. Air-flow measurer 771 is an anemometer or an air velocity sensor, for example.

<Blowing Change Device 772>

Blowing change device 772 changes the air volume and the blowing direction of an air flow produced by blower 10 by being controlled by controller 40 according to air-flow information. For example, if the velocity of an air flow through the gate passage is greater than or equal to a predetermined velocity, blowing change device 772 directs the blowing direction of blower 10 into the air flow, and furthermore increases the air volume. If the velocity of an air flow through the gate passage is less than the predetermined velocity, blowing change device 772 changes the blowing direction of an air flow produced by blower 10 to be substantially parallel to the first direction, that is, toward later-described collecting port 781a of second gate body 2b.

<Gas Acceleration Device 773>

Gas acceleration device 773 is an air-blowing device that increases the volume of air let out through each second opening 715, in order to send aerosol over a long distance. Gas acceleration device 773 increases the volume of air that generates an air current in the first direction along a flow path in which aerosol flows. Gas acceleration device 773 increases the air volume of the flow path in which aerosol flows by being controlled by controller 40 based on air-flow information from air-flow measurer 771. For example, if the velocity indicated by the air-flow information is greater than or equal to a predetermined velocity, gas acceleration device 773 generates an air current having an increased air volume on the windward side, to guide aerosol to collecting port 781a of second gate body 2b.

<Acoustic Device 774>

Acoustic device 774 is a loudspeaker that outputs, for instance, a beep sound to an approaching object that is going to pass through the gate passage. Acoustic device 774 obtains a control command for outputting a beep sound from controller 40, unless later-described authenticator 785 gives the approaching object permission to pass through the gate passage. In this case, acoustic device 774 outputs a beep sound indicating that the approaching object is not permitted to pass through the gate passage. Acoustic device 774 obtains a control command for outputting a sound indicating permission to pass through from controller 40, if authenticator 785 gives the approaching object permission to pass through the gate passage. In this case, acoustic device 774 outputs a sound indicating that the approaching object is permitted to pass through the gate passage. Note that acoustic device 774 may not output a sound if permission information is obtained.

Acoustic device 774 changes a sound to be emitted, according to the distance from the approaching object to the gate body. For example, acoustic device 774 outputs a beep sound having a first volume when first proximity sensor 783 detects an approaching object that approaches a position at a second predetermined distance from the gate body. Further, acoustic device 774 outputs a beep sound having a second volume higher than the first volume when second proximity sensor 784 detects an approaching object that approaches a position at a third predetermined distance from the gate body. Here, the third predetermined distance is shorter than the second predetermined distance. Note that acoustic device 774 may produce different sounds for the beep sound having the first volume and the beep sound having the second volume.

<Power Supply 775>

Power supply 775 is a power module that supplies power for driving blower 10, aerosol generator 20, emitter 30, controller 40, air-flow measurer 771, blowing change device 772, gas acceleration device 773, and acoustic device 774, for instance. Power supply 775 is controlled by controller 40 to provide and stop power supply to, for instance, blower 10, aerosol generator 20, emitter 30, blowing change device 772, gas acceleration device 773, and acoustic device 774.

<Second Gate Body 2b>

Second gate body 2b includes collecting device 781, circulation device 782, first proximity sensor 783, second proximity sensor 784, authenticator 785, temperature measurer 786, and humidity measurer 787. Thus, second gate body 2b stores, in casing 2a2, collecting device 781, circulation device 782, first proximity sensor 783, second proximity sensor 784, authenticator 785, temperature measurer 786, and humidity measurer 787.

Collecting port 781a for collecting aerosol discharged from first gate body 2a is formed in a surface of second gate body 2b on a side that faces first gate body 2a. Collecting port 781a is a recessed portion in a side surface of casing 2a2 of second gate body 2b. Not only aerosol, but also a light beam emitted by each light source 31 of first gate body 2a enters collecting port 781a. A light receiving element that receives the light beam may be disposed inside collecting port 781a. Whether an approaching object has passed through the gate passage can be determined by disposing such a light receiving element. In the present embodiment, collecting port 781a collects aerosol discharged from the four openings of first gate body 2a, yet one or more collecting ports 781a may be provided in second gate body 2b so as to face one or more second openings 715 in one-to-one correspondence.

<Collecting Device 781>

Collecting device 781 is a condenser that facilitates liquefaction of aerosol that adheres to collecting port 781a by cooling the aerosol. In order that collecting device 781 cools the surrounding of collecting port 781a, a heat exchanger, for instance, may be provided in collecting port 781a. Note that collecting device 781 may include a reflective material collector that collects a reflective material from the liquid resulting from aerosol being liquefied. Collecting device 781 may reuse the collected reflective material.

<Circulation Device 782>

Circulation device 782 connects first gate body 2a to second gate body 2b using pipe 782b, and supplies a liquid collected by collecting device 781 of second gate body 2b to aerosol generator 20 of first gate body 2a through pipe 782b. Specifically, circulation device 782 includes pipe 782b, pump 782a, and purifier 782c.

Pipe 782b connects collecting port 781a of collecting device 781 stored in casing 2a2 of second gate body 2b and container 21 of aerosol generator 20 stored in casing 2a1 of first gate body 2a to provide communication therebetween. Thus, pipe 782b returns a liquid collected through collecting port 781a to container 21 using pump 782a. Pipe 782b is provided in the ground on which first gate body 2a and second gate body 2b are installed.

Pump 782a is provided in pipe 782b, sucks a liquid collected through collecting port 781a, and sends the liquid to container 21 through pipe 782b, to supply the liquid to container 21. An example of pump 782a is a motor pump. Pump 782a is disposed vertically below collecting port 781a, and is provided in the ground on which first gate body 2a and second gate body 2b are installed.

Purifier 782c is provided in the ground on which first gate body 2a and second gate body 2b are installed. Purifier 782c is provided in pipe 782b, and disinfects or sanitizes a liquid flowing through pipe 782b. Purifier 782c is a heating purifying device that disinfects or sterilizes a liquid flowing through pipe 782b by collecting and heating the liquid. Purifier 782c may disinfect or sanitize a liquid flowing through pipe 782b by using, for instance, an ultraviolet irradiation device or a disinfectant/a sanitizer.

<First Proximity Sensor 783>

First proximity sensor 783 is a motion sensor that is disposed in a lower portion of casing 2a2 of second gate body 2b (on the entrance side of the gate passage), and can detect an approaching object, such as a person, that approaches second gate body 2b. First proximity sensor 783 can detect an approaching object using infrared light or visible light, for instance. First proximity sensor 783 is, for example, an image sensor of an infrared image capturing device or a camera, for instance. First proximity sensor 783 can detect an approaching object within a range of a first predetermined distance from first proximity sensor 783. First proximity sensor 783 outputs first detection information that is a result of the detection to controller 40, upon detecting the approach of an approaching object.

<Second Proximity Sensor 784>

Second proximity sensor 784 is disposed on a surface of casing 2a2 of second gate body 2b on the side facing first gate body 2a. Second proximity sensor 784 is a motion sensor that is disposed in the vicinity of second openings 715 and discharge ports 725, and can detect an approaching object that approaches a flow path in which aerosol discharged from each pair of second openings 715 and discharge ports 725 flows. Second proximity sensor 784 can detect an approaching object using infrared light or visible light, for instance. Second proximity sensor 784 is, for example, an image sensor of an infrared image capturing device or a camera, for instance. Second proximity sensor 784 can detect an approaching object within ranges of a second predetermined distance and a third predetermined distance from second proximity sensor 784.

Thus, second proximity sensor 784 can detect an approaching object that is closer to second gate body 2b than an approaching object that first proximity sensor 783 can detect. Second proximity sensor 784 outputs second detection information that is a result of the detection to controller 40, upon detecting the approach of an approaching object. Here, the second predetermined distance is shorter than the first predetermined distance, and the third predetermined distance is shorter than the second predetermined distance. The second predetermined distance is an example of a predetermined distance.

<Authenticator 785>

Authenticator 785 authenticates whether an approaching object that is going to pass through the gate passage can be given permission to pass therethrough. Specifically, authenticator 785 tries to authenticate an approaching object that has a communication terminal (not illustrated) as an authentication device by communicating with the communication terminal. For example, authenticator 785 compares information on an approaching object that the communication terminal has with permission information stored in server device 3, to authenticate the approaching object. Authenticator 785 controls blower 10, aerosol generator 20, and emitter 30, based on the result of the authentication. Here, examples of the communication terminal include an integrated circuit (IC) tag, a radio frequency identifier (RFID) card, and a smartphone.

For example, if permission to pass through the gate passage can be given to an approaching object, authenticator 785 outputs, to controller 40, instructions to stop an air current that blower 10 generates, stop aerosol generator 20 from generating aerosol, and stop emitter 30 from emitting a light beam through each light guide 733. If permission to pass through the gate passage cannot be given to the approaching object, authenticator 785 outputs, to controller 40, instructions to change the color of a light beam from emitter 30 and furthermore, cause acoustic device 774 to output a beep sound.

<Temperature Measurer 786>

Temperature measurer 786 is disposed in the vicinity of acoustic device 774, measures the temperature at and near the gate passage, and outputs, to controller 40, temperature information that is a result of the measurement. Examples of temperature measurer 786 include a thermometer and a temperature sensor.

<Humidity Measurer 787>

Humidity measurer 787 is disposed in the vicinity of acoustic device 774, measures the humidity at and near the gate passage, and outputs to controller 40 humidity information that is a result of the measurement. Examples of humidity measurer 787 include a hygrometer and a humidity sensor.

<Power Supply 788>

Power supply 788 is a power module that supplies power for driving collecting device 781, circulation device 782, first proximity sensor 783, second proximity sensor 784, and authenticator 785, for instance. Power supply 788 provides and stops power supply to, for instance, collecting device 781 and circulation device 782 by being controlled by controller 40.

<Controller 40>

Controller 40 is a control device that controls, for instance, blower 10, aerosol generator 20, emitter 30, blowing change device 772, gas acceleration device 773, and acoustic device 774, based on information obtained from first gate body 2*a* and information obtained from second gate body 2*b*. In the present embodiment, controller 40 is included in first gate body 2*a*, but may be included in second gate body 2*b* or in server device 3. Controller 40 may be a device different from first gate body 2*a*, second gate body 2*b*, and server device 3.

Upon obtaining, from first proximity sensor 783, first detection information generated by first proximity sensor 783 detecting an approaching object that approaches the gate passage, controller 40 outputs control commands for driving blower 10 and aerosol generator 20. Thus, controller 40 switches blower 10 and aerosol generator 20 from off to on.

Also when controller 40 obtains first detection information from first proximity sensor 783, controller 40 outputs a control command for driving emitter 30. Thus, controller 40 switches each light source 31 of emitter 30 from off to on.

Further, based on second detection information, controller 40 outputs control commands for changing the volume of a beep sound output by acoustic device 774 and causing acoustic device 774 to change the beep sound itself. Thus, controller 40 causes acoustic device 774 to output a beep sound.

Controller 40 determines whether an approaching object has reached a range of the second predetermined distance from the gate passage (a flow path in which aerosol flows or a light beam), based on second detection information. Specifically, controller 40 determines, based on second detection information, whether to change the color of a light beam from emitter 30 or whether to cause acoustic device 774 to output a beep sound, according to a distance between an approaching object and the gate passage (a flow path in which aerosol flows or a light beam).

Controller 40 determines whether an approaching object has reached a range of the third predetermined distance shorter than the second predetermined distance from the gate passage (a flow path in which aerosol flows or a light beam), based on second detection information. Specifically, controller 40 determines, based on second detection information, whether to register an approaching object in an attention required list (a blacklist) in server device 3, according to a distance between the approaching object and the gate passage (a flow path in which aerosol flows or a light beam).

Furthermore, controller 40 obtains, from authenticator 785, instructions to stop an air current that blower 10 generates, stop aerosol generator 20 from generating aerosol, and stop emitter 30 from emitting a light beam. In this case, controller outputs, to blower 10, aerosol generator 20, and emitter 30, respectively, control commands for switching blower 10, aerosol generator 20, and emitter 30 from on to off.

Controller 40 outputs a control command to aerosol generator 20 to change the temperature of aerosol, based on temperature information. Thus, controller 40 controls aerosol generator 20 to decrease a difference between the ambient temperature and the temperature of aerosol. For example, if the ambient temperature is high, controller 40 outputs a control command for increasing the temperature of aerosol to aerosol generator 20.

Controller 40 outputs a control command to aerosol generator 20 to control the amount of aerosol spouted, based on humidity information. Thus, if the ambient humidity is low, controller 40 controls aerosol generator 20 to increase the amount of aerosol spouted.

<Server Device 3>

Server device 3 is a personal computer that is connected to controller 40 in a wired or wireless manner, and stores information on an approaching object and the attention required list, for instance. Server device 3 stores permission information for permitting an approaching object to pass through the gate passage. Permission information is used to determine whether authenticator 785 can give an approaching object a permission to pass through the gate passage, by being compared to information on the approaching object.

Note that in light beam emission system 1*h*, first gate body 2*a* may further include at least one of circulation device 782, collecting device 781, server device 3, first proximity sensor 783, second proximity sensor 784, authenticator 785, temperature measurer 786, or humidity measurer 787. If first gate body 2*a* includes collecting device 781, collecting device 781 may collect aerosol flowing in a flow path from a surface of first gate body 2*a* on the side opposite the side where second openings 715 are provided. Stated differently, first gate body 2*a* may have similar functions to those of second gate body 2*b*.

In light beam emission system 1*h*, second gate body 2*b* may further include at least one of blower 10, aerosol generator emitter 30, controller 40, acoustic device 774, gas acceleration device 773, blowing change device 772, or air-flow measurer 771. If second gate body 2*b* includes blower 10, aerosol generator 20, and emitter 30, a light beam may propagate along a flow path in which aerosol flows, from a surface of second gate body 2*b* on the side opposite the surface on the side where collecting port 781*a* is provided. Thus, second gate body 2*b* may have similar functions to those of first gate body 2*a*.

[Operation]

Operation of light beam emission system 1*h* according to the present embodiment is to be described.

FIG. 26A is a flowchart illustrating operation of light beam emission system 1*h* according to Embodiment 7.

Here, the case where an approaching object is to come close to a gate passage of a pair of gate bodies.

First, as illustrated in FIG. 26A, first proximity sensor 783 detects an approaching object, such as a person, that approaches the pair of gate bodies (S101). If an approaching object reaches a range of the first predetermined distance from first proximity sensor 783, first proximity sensor 783 detects the approaching object, and outputs first detection information that is a result of the detection to controller 40.

Next, upon obtaining the first detection information, controller 40 outputs control commands for driving blower 10 and aerosol generator 20. Thus, controller 40 switches blower and aerosol generator 20 from off to on. Accordingly, blower and aerosol generator 20 are driven, so as to form a plurality of flow paths of aerosol in the first direction (S102).

Controller 40 outputs a control command for driving emitter 30. Thus, controller 40 switches light sources 31 of emitter 30 from off to on. Accordingly, emitter 30 is driven, so as to emit a plurality of light beams along the flow paths of aerosol (S103). Controller 40 causes emitter 30 to emit blue light beams. As a result, the flow paths in which aerosol flows appear to be glowing blue. Note that step S102 and step S103 may be performed concurrently.

Next, second proximity sensor 784 detects an approaching object, such as a person, that approaches the gate passage (S104). If an approaching object reaches a range of the second predetermined distance from second proximity sensor 784, second proximity sensor 784 detects the approaching object, and outputs second detection information that is a result of the detection to controller 40.

Next, controller 40 determines whether an approaching object has reached a range of the second predetermined distance from the gate passage (flow paths in which aerosol flows or light beams) (S105). Thus, controller 40 determines whether the distance indicated by the obtained second detection information is the second predetermined distance or shorter.

If the distance indicated by the second detection information is the second predetermined distance or shorter (Yes in S105), controller 40 outputs a control command for changing the color of light beams emitted by emitter 30 in order to show that an approaching object has reached the range of the second predetermined distance from the gate passage (the flow paths in which aerosol flows or light beams). In response thereto, emitter 30 changes the color of light beams emitted by light sources 31 from blue to red, so as to emit red light beams (S106). As a result, the flow paths in which aerosol flows appear to be glowing red. Here, the second predetermined distance is less than or equal to, for example, several meters or several tens of centimeters, and is 50 centimeters in the present embodiment.

Upon obtaining the second detection information, controller 40 outputs a control command for causing acoustic device 774 to output a beep sound, to cause acoustic device 774 to output a beep sound having the first volume to the approaching object (S107). Note that step S106 and step S107 may be performed concurrently.

Next, controller 40 determines whether the approaching object has reached a range of the third predetermined distance from the gate passage (the flow paths in which aerosol flows or light beams) (S108). Thus, controller 40 determines whether the distance indicated by the obtained second detection information is the third predetermined distance or shorter. Here, the third predetermined distance is less than or equal to, for example, several tens of centimeters, and is 15 centimeters in the present embodiment.

If the distance indicated by the second detection information is the third predetermined distance or shorter (Yes in S108), controller 40 outputs control commands for stopping driving blower 10 and aerosol generator 20 in order to show that an approaching object has reached the range of the third predetermined distance from the gate passage (the flow paths in which aerosol flows or light beams). Thus, controller 40 switches blower 10 and aerosol generator 20 from on to off. Accordingly, this stops driving blower 10 and aerosol generator and thus blower 10 and aerosol generator 20 stop forming the flow paths in which aerosol flows (S109).

Note that if the distance indicated by the second detection information is less than or equal to the third predetermined distance (Yes in S108), controller 40 may output a control command for causing acoustic device 774 to output a beep sound to cause acoustic device 774 to output a beep sound having the second volume to the approaching object.

Controller 40 outputs a control command for stopping driving emitter 30. Thus, controller 40 switches light sources 31 of emitter 30 from on to off. Accordingly, driving emitter 30 is stopped so that emitter 30 stops emitting light beams (S110).

Next, authenticator 785 obtains information on an approaching object (S111). For example, authenticator 785 captures an image of the approaching object, generates approaching object information indicating the captured image, and outputs the generated approaching object information to server device 3. When the approaching object includes a communication terminal, authenticator 785 may obtain approaching object information stored in the communication terminal, and output the obtained approaching object information to server device 3. Server device 3 registers the obtained approaching object information in the attention required list. Then, light beam emission system 1*h* ends processing.

Next, upon obtaining the approaching object information, server device 3 stores the approaching object indicated by the approaching object information into the attention required list (S112).

If the distance indicated by the second detection information is not the second predetermined distance (No in S105) or is not the third predetermined distance (No in S108), authenticator 785 authenticates the approaching object and determines whether the approaching object can be permitted to pass through the gate passage (S121). Thus, authenticator 785 authenticates the communication terminal included in the approaching object, and determines whether the approaching object can be permitted to pass through the gate passage. Specifically, authenticator 785 compares information on the approaching object that the communication terminal has with information stored in server device 3. If information on the approaching object is stored in server device 3, authenticator 785 permits the approaching object to pass through the gate passage (Yes in S121).

If authenticator 785 permits the approaching object to pass through the gate passage (Yes in S121), authenticator 785 outputs, to controller 40, instructions to stop air currents generated by blower 10, stop aerosol generator 20 from generating aerosol, and stop emitter 30 from emitting light beams. Upon obtaining the instructions, controller 40 outputs control commands for stopping driving blower 10, aerosol generator 20, and emitter 30. Blower 10, aerosol generator 20, and emitter 30 stop forming the flow paths in which aerosol flows (S122), and stop emitting light beams (S123). In this manner, the approaching object is allowed to pass through the gate passage. Then, light beam emission system 1h ends processing.

Figure 26A:
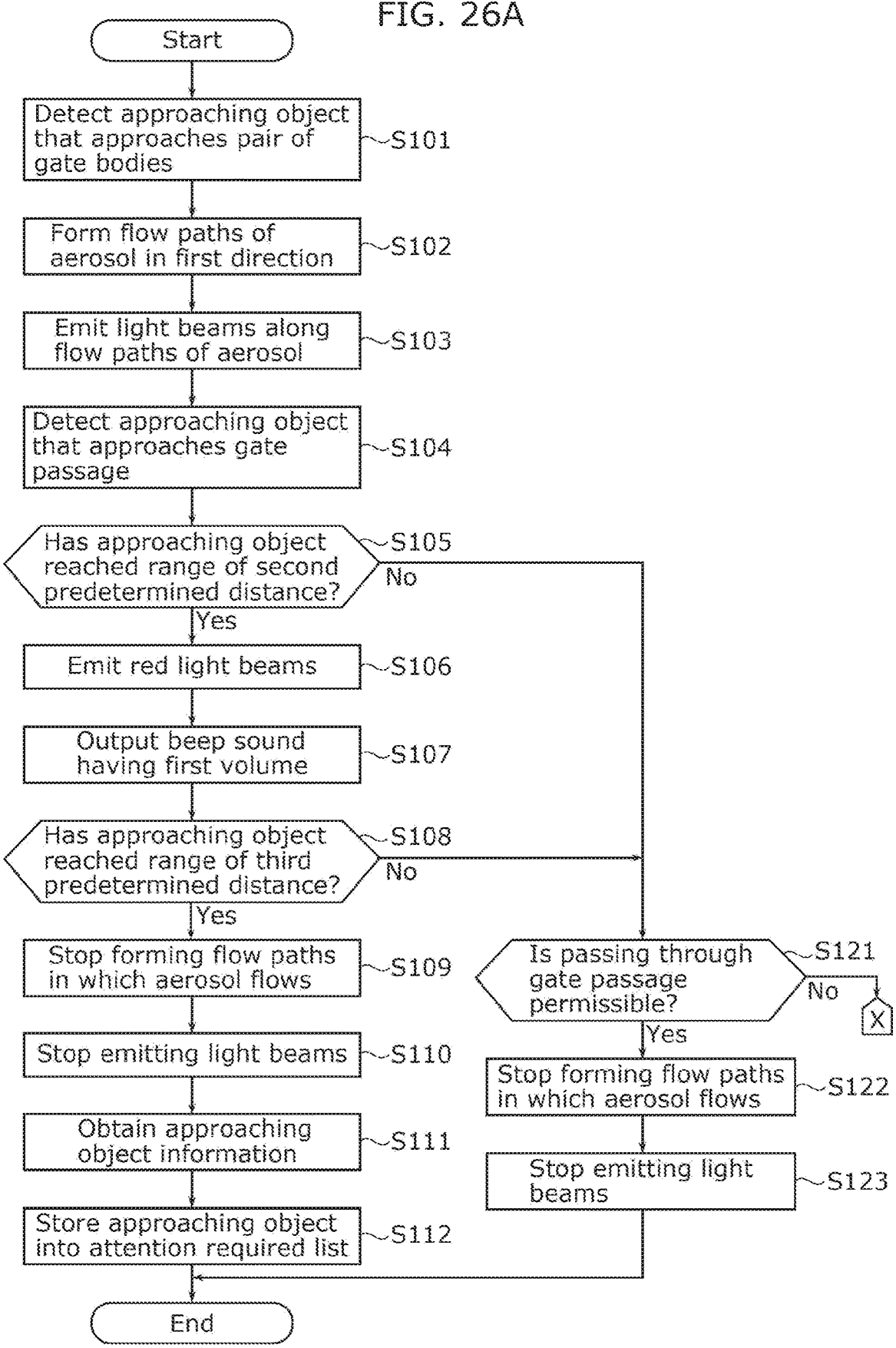
FIG. 26A is a flowchart illustrating operation of the light beam emission system according to Embodiment 7.
Figure 26B:
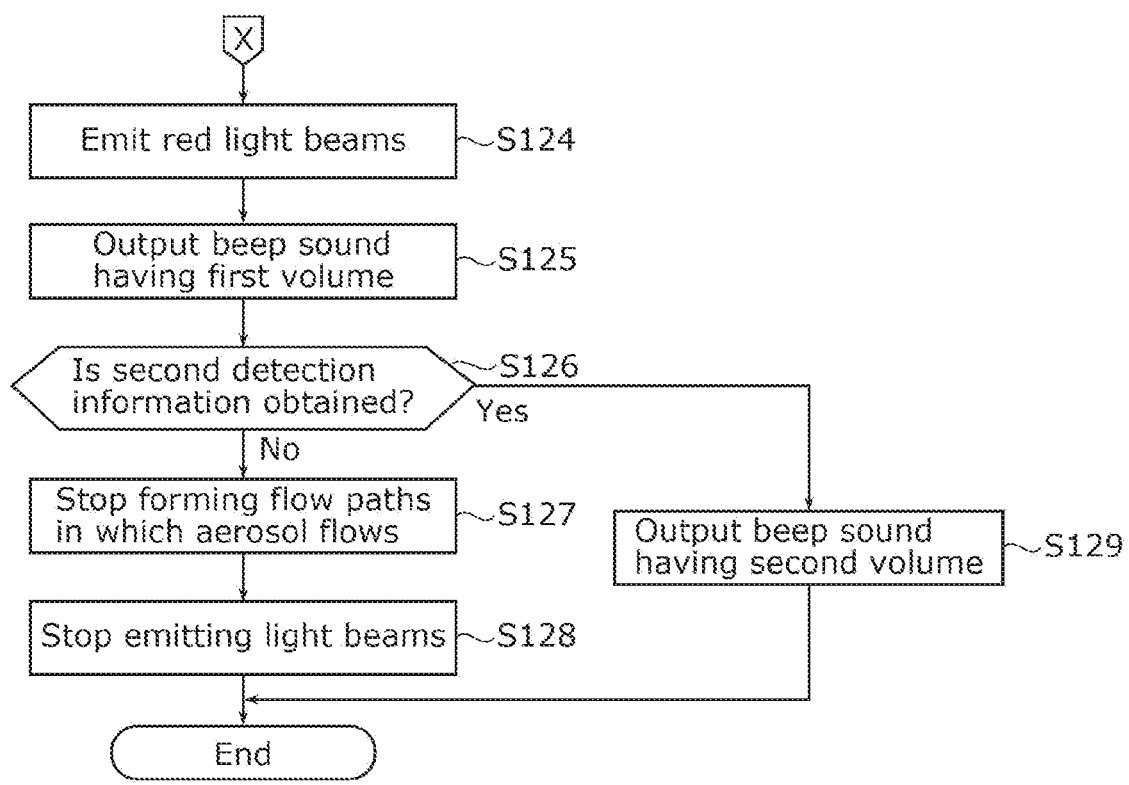
FIG. 26B is a flowchart illustrating operation of the light beam emission system, which is processing continued from X in FIG. 26A.

FIG. 26B is a flowchart illustrating operation of light beam emission system 1h, which is processing continued from X in FIG. 26A.

As illustrated in FIG. 26B, if, on the other hand, authenticator 785 cannot permit the approaching object to pass through the gate passage (No in S121), authenticator 785 outputs, to controller 40, an instruction to change the color of light beams from emitter 30 and furthermore, cause acoustic device 774 to output a beep sound. Controller 40 outputs a control command for causing emitter 30 to change the color of light beams to be emitted. In response thereto, emitter 30 changes the color of light beams emitted by light sources 31 from blue to red, so as to emit red light beams (S124). As a result, the flow paths in which aerosol flows appear to be glowing red.

Controller 40 outputs a control command for causing acoustic device 774 to output a beep sound, to cause acoustic device 774 to output a beep sound having the first volume to the approaching object (S125). Note that step S124 and step S125 may be performed concurrently.

Next, controller 40 determines whether second detection information is obtained (S126).

If the second detection information is not obtained (No in S126), it indicates that the approaching object is spaced apart from the gate passage (the pair of gate bodies), and thus controller 40 switches blower 10 and aerosol generator 20 from on to off. Accordingly, this stops driving blower 10 and aerosol generator 20, and thus blower 10 and aerosol generator 20 stop forming the flow paths in which aerosol flows (S127).

Controller 40 outputs a control command for stopping driving emitter 30. Thus, controller 40 switches light sources 31 of emitter 30 from on to off. Accordingly, driving emitter 30 is stopped so that emitter 30 stops emitting light beams (S128). Then, light beam emission system 1h ends processing.

If the second detection information is obtained (Yes in S126), or more specifically, if the approaching object stops or approaches the gate passage (the flow paths in which aerosol flows or light beams), controller 40 outputs a control command for causing acoustic device 774 to output a beep sound, to cause acoustic device 774 to output a beep sound having the second volume to the approaching object (S129). Then, light beam emission system 1h ends processing.

The present embodiment also achieves similar operations and effects to those in Embodiment 1, for instance.

Embodiment 8

A configuration of light beam emission system 1j according to the present embodiment is to be described.

The other configuration of the present embodiment is similar to, for instance, Embodiment 1 unless otherwise stated in particular, and the same sign is given to the same configuration while a detailed description of the same configuration is omitted.

[Configuration: Light Beam Emission System 1j]

Figure 28:
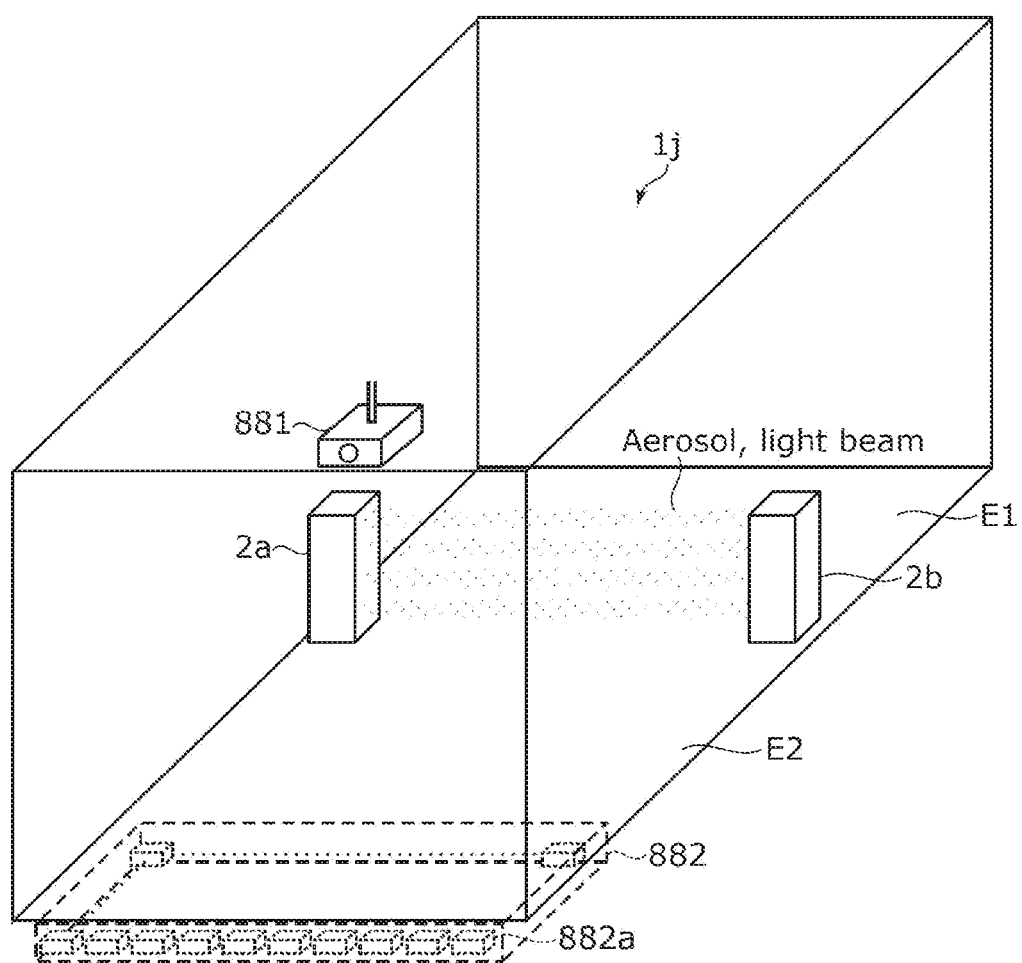
FIG. 28 is a schematic diagram illustrating the light beam emission system according to Embodiment 8.

FIG. 27 is a block diagram illustrating light beam emission system 1j according to Embodiment 8. FIG. 28 illustrates a predetermined space in which light beam emission system 1j is disposed, in a passage. FIG. 28 illustrates a configuration of first gate body 2a and second gate body 2b in a simplified manner. In FIG. 28, the state in which aerosol is made visible by light beams is shown using dotted hatching. FIG. 28 is a schematic diagram illustrating light beam emission system 1j according to Embodiment 8.

As illustrated in FIG. 27 and FIG. 28, first gate body 2a and second gate body 2b are disposed at the edges of the passage, facing each other, in light beam emission system 1j. In light beam emission system 1j, if passing of an approaching object is rejected, flow paths in which aerosol flows are formed between first gate body 2a and second gate body 2b, and furthermore light beams are emitted along aerosol, and thus the aerosol is made visible. If passing of an approaching object is permitted, aerosol does not flow between first gate body 2a and second gate body 2b, and light beams are not emitted either.

Light beam emission system 1j includes detection system 2c, in addition to first gate body 2a, second gate body 2b, and server device 3.

First gate body 2a and second gate body 2b are disposed as a gate for restricted area E1 for restricting entry of an approaching object. Thus, first gate body 2a and second gate body 2b are disposed at the boundary between non-restricted area E2 where entry of an approaching object is not restricted and restricted area E1, and restrict entry of an approaching object that is not permitted to enter restricted area E1. The boundary between non-restricted area E2 and restricted area E1 is delimited by aerosol.

Detection system 2c is disposed at a location spaced apart from first gate body 2a and second gate body 2b, in order to detect an approaching object that approaches first gate body 2a and second gate body 2b.

Detection system 2c includes authenticator 881 and weight detector 882. Note that a plurality of authenticators 881 and a plurality of weight detectors 882 may be included, and thus the numbers of those are not particularly limited.

Authenticator 881 is a detection authenticator that detects and authenticates an approaching object that approaches first gate body 2a and second gate body 2b. Authenticator 881 checks whether to permit the approaching object to pass between first gate body 2a and second gate body 2b (pass through the gate). Specifically, authenticator 881 detects an approaching object based on an image and permits/rejects the approaching object to pass through by detecting the weight of the approaching object. In the present embodiment, authenticator 881 permits the approaching object to pass between first gate body 2a and second gate body 2b when a first passing requirement and a second passing requirement are satisfied.

First, authenticator 881 captures an image of an approaching object using, for example, infrared light or visible light to recognize the approaching object to determine whether the first passing requirement is satisfied. Specifically, when authenticator 881 includes an image capturing device, the image capturing device captures an image of a face of a person, that is, the approaching object. Authenticator 881 recognizes a person from the image of the face of the person captured by the image capturing device. Authenticator 881 accesses server device 3 and determines whether the person is registered in the attention required list in server device 3. If the person is not registered in the attention required list, the person satisfies the first passing requirement. If the person is registered in the attention required list, the person does not satisfy the first passing requirement, and thus authenticator 881 rejects passing of the person.

Note that if persons that satisfy the first passing requirement are registered in advance in a permission list in server device 3, authenticator 881 may access server device 3 and determine whether an approaching person is registered in the permission list. If the approaching person is registered in the permission list, authenticator 881 may determine that the person satisfies the first passing requirement. If the approaching person is not registered in the permission list, authenticator 881 may determine that the person does not satisfy the first passing requirement, and reject passing of the person.

If the person satisfies the first passing requirement, authenticator 881 determines whether the person satisfies the second passing requirement, based on weight information indicating the weight of the person (approaching object) obtained from weight detector 882. Specifically, authenticator 881 determines whether the weight of the person indicated by the weight information is greater than or equal to a predetermined weight. If the weight of the person is the predetermined weight or more, the person does not satisfy the second passing requirement, and thus authenticator 881 rejects passing of the person. If the weight of the person is less than the predetermined weight, the person satisfies the second passing requirement, and thus authenticator 881 permits passing of the person. The weight of a person may be the weight of the person itself or may be a total weight that includes the weight of the person's bag, for instance.

When authenticator 881 does not permit (rejects) an approaching object to pass between first gate body 2a and second gate body 2b, based on the checked result, authenticator 881 outputs an instruction to reject passing to each of first gate body 2a and second gate body 2b. Note that when authenticator 881 permits an approaching object to pass between first gate body 2a and second gate body 2b, based on the checked result, authenticator 881 may output no instruction to first gate body 2a and second gate body 2b. Note that when authenticator 881 permits the passing, authenticator 881 may output an instruction to permit passing to each of first gate body 2a and second gate body 2b, to cause first gate body 2a and second gate body 2b to output presentation indicating that passing is permitted.

Figure 29:
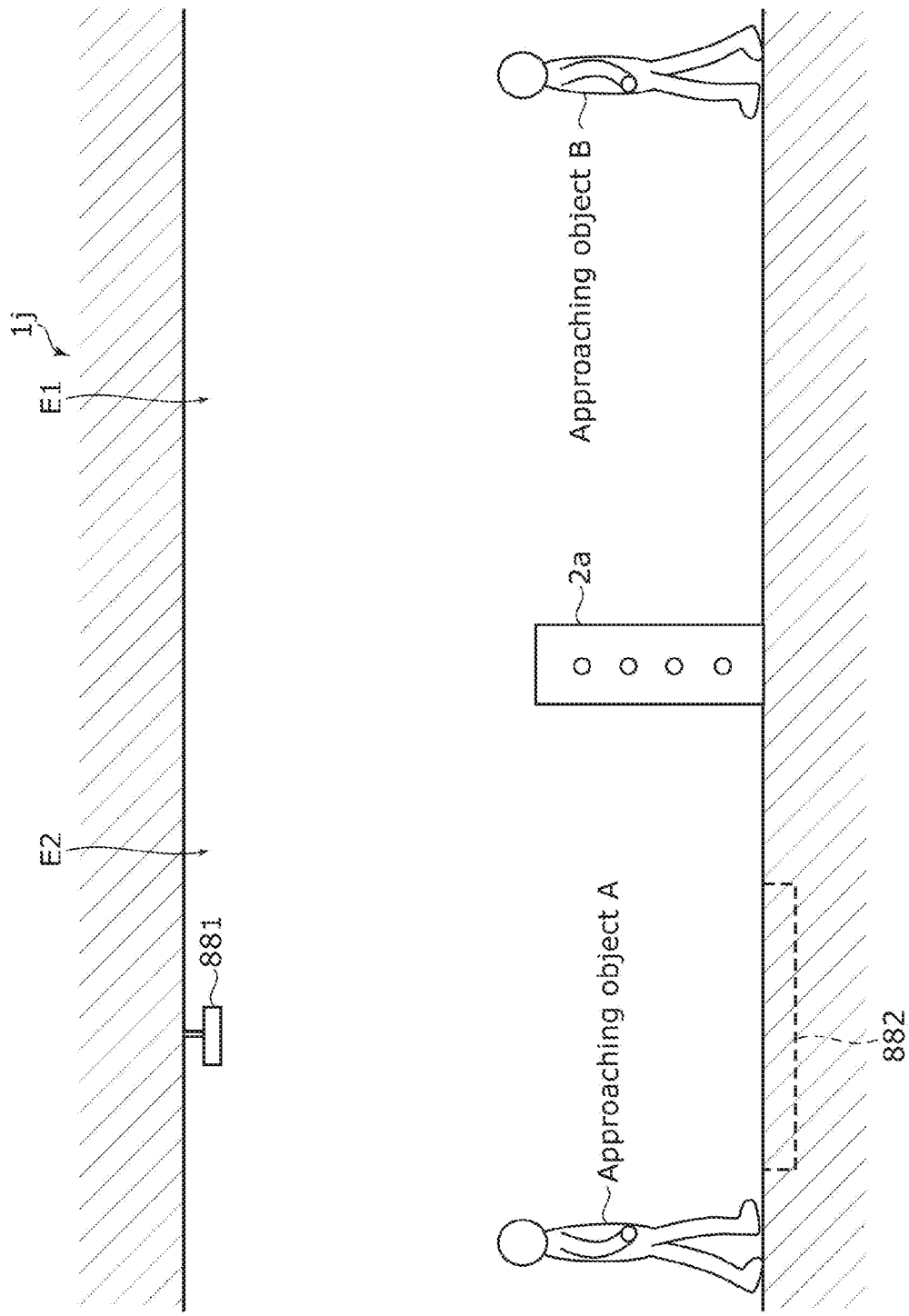
FIG. 29 is a schematic diagram illustrating the case where the light beam emission system according to Embodiment 8 is viewed from the side.
Figure 30:
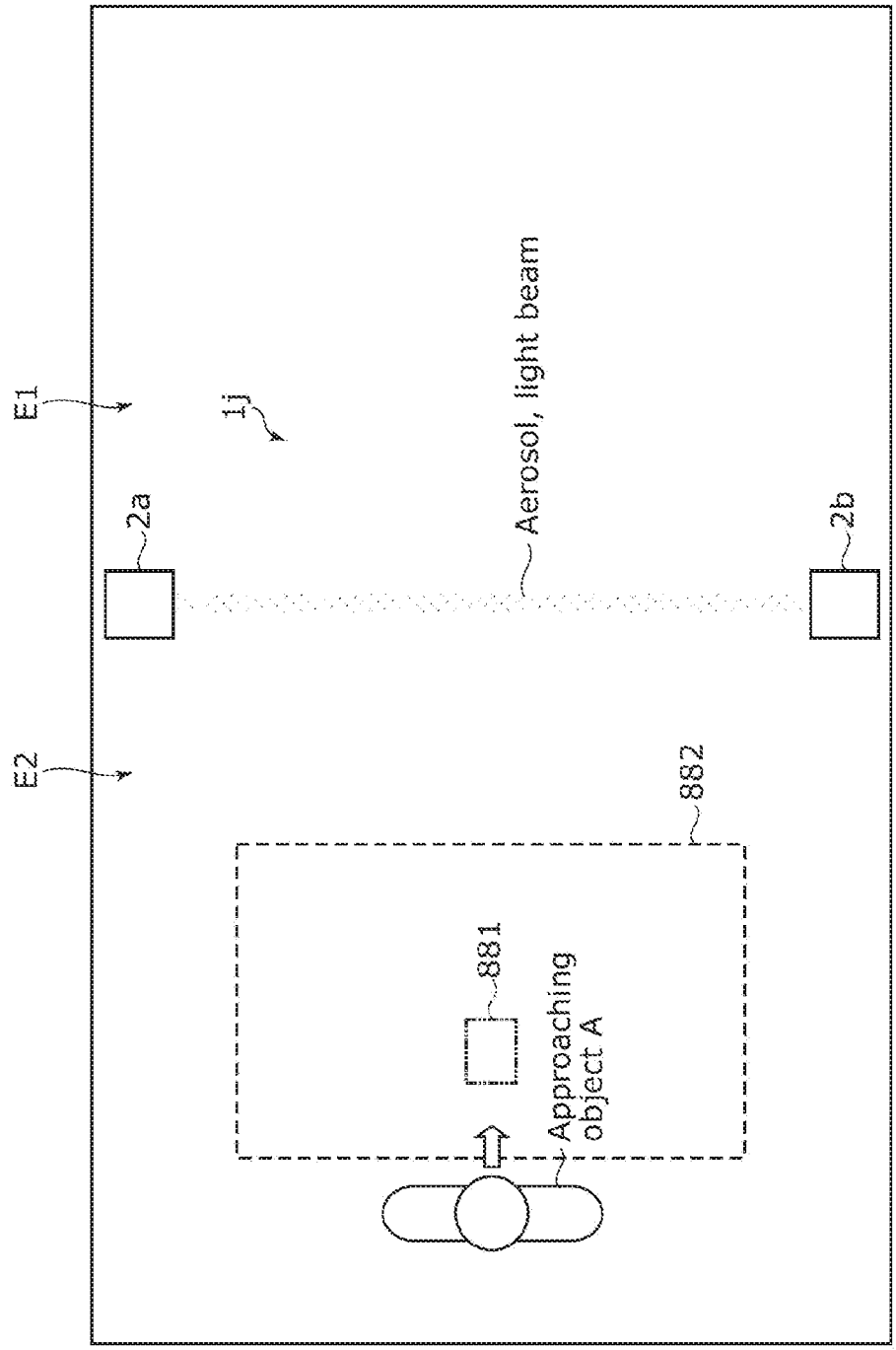
FIG. 30 is a schematic diagram illustrating a state in which approaching object A is moving from a non-restricted area to a restricted area when the light beam emission system according to Embodiment 8 is viewed from above.
Figure 31:
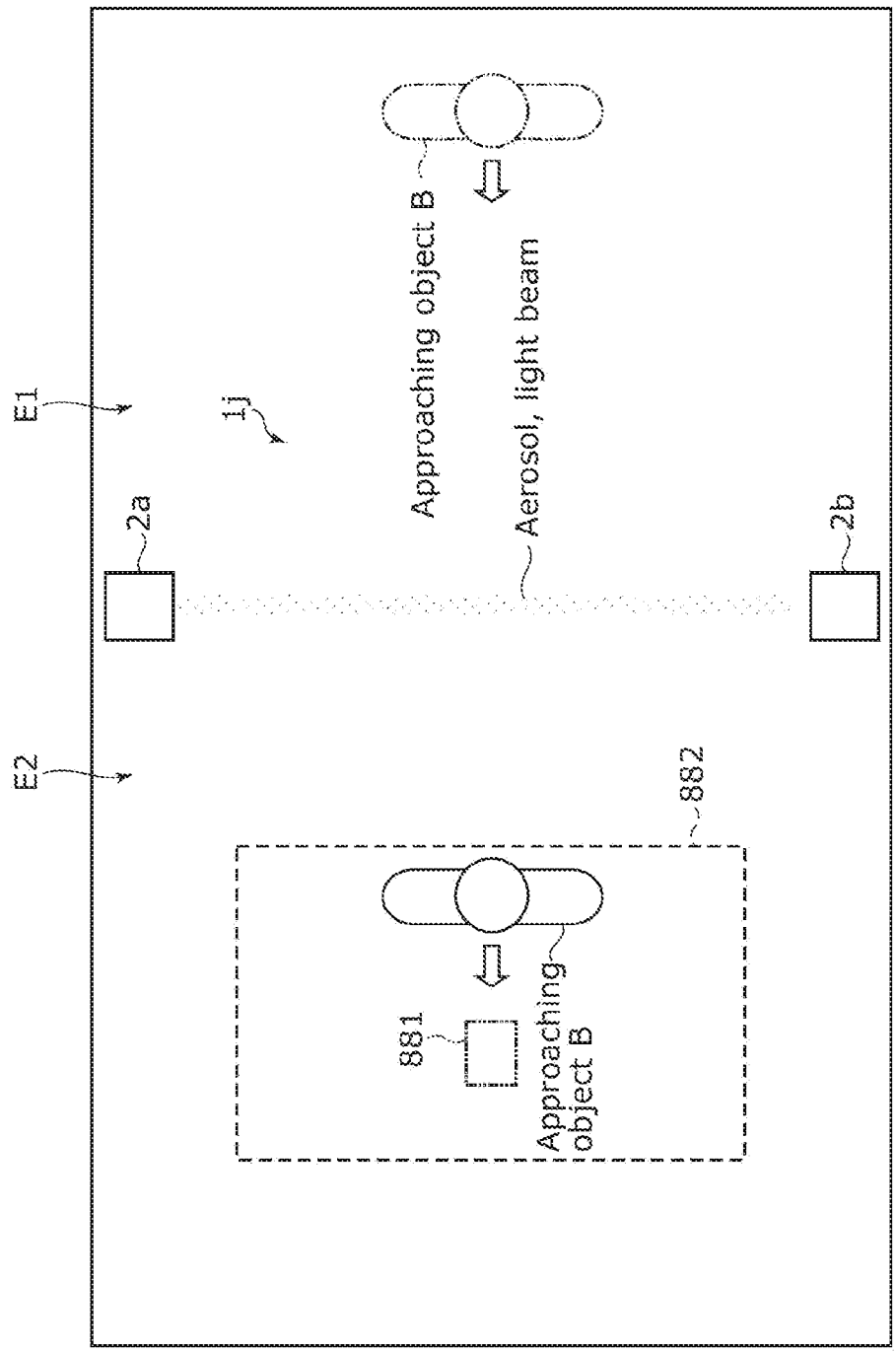
FIG. 31 is a schematic diagram illustrating a state in which approaching object B is moving from the restricted area to the non-restricted area when the light beam emission system according to Embodiment 8 is viewed from above.

FIG. 29 is a schematic diagram illustrating the case where light beam emission system 1j according to Embodiment 8 is viewed from the side. FIG. 30 is a schematic diagram illustrating a state in which approaching object A is moving from non-restricted area E2 to restricted area E1 when light beam emission system 1j according to Embodiment 8 is viewed from above. FIG. 31 is a schematic diagram illustrating a state in which approaching object B is moving from restricted area E1 to non-restricted area E2 when light beam emission system 1j according to Embodiment 8 is viewed from above. In FIG. 30 and FIG. 31, the state in which aerosol is made visible by light beams is shown using dotted hatching.

In FIG. 29 and FIG. 30, approaching object A is in non-restricted area E2, whereas approaching object B is in restricted area E1. In this case, authenticator 881 determines whether to permit passing of approaching object A between first gate body 2a and second gate body 2b. On the other hand, in FIG. 29 and FIG. 31, authenticator 881 does not determine whether to permit passing of approaching object B between first gate body 2a and second gate body 2b. Approaching object B is in restricted area E1 and has been permitted to pass through, and thus authenticator 881 does not perform authentication again.

Weight detector 882 is disposed on a passage for passing between first gate body 2a and second gate body 2b. Weight detector 882 includes a plurality of weight sensors, and the plurality of weight sensors are disposed in the floor of the passage in non-restricted area E2, thus detecting the weight of an approaching object that approaches first gate body 2a and second gate body 2b. Weight detector 882 is disposed in a position spaced apart from first gate body 2a and second gate body 2b by a predetermined distance. Weight detector 882 outputs weight information indicating the weight of an approaching object to authenticator 881. Note that weight detector 882 may detect the position in which an approaching object is, based on the approaching object detected by one or more of the weight sensors.

Note that weight detector 882 is not a structural element necessary for detection system 2c. Accordingly, detection system 2c may not include weight detector 882. In this case, authenticator 881 may determine whether to permit passing of an approaching object based only on the first passing requirement.

Examples of Application

Figure 32:
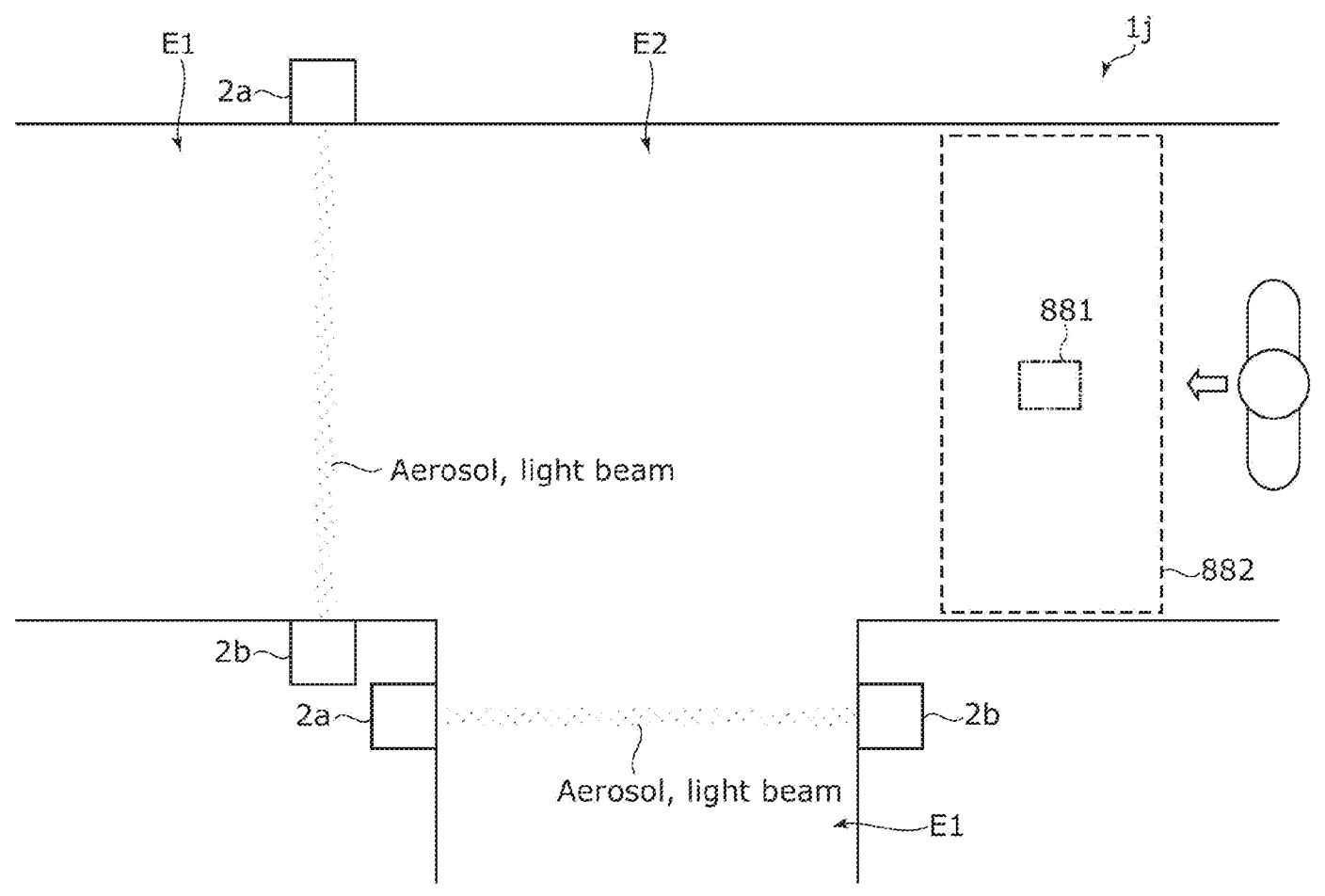

FIG. 32 is a schematic diagram illustrating a state in which light beam emission system 1j according to Embodiment 8 is disposed on a T-intersection. FIG. 32 illustrates a state in which pairs of gate bodies are disposed at two locations near the intersection of two passages.

Figure 33:
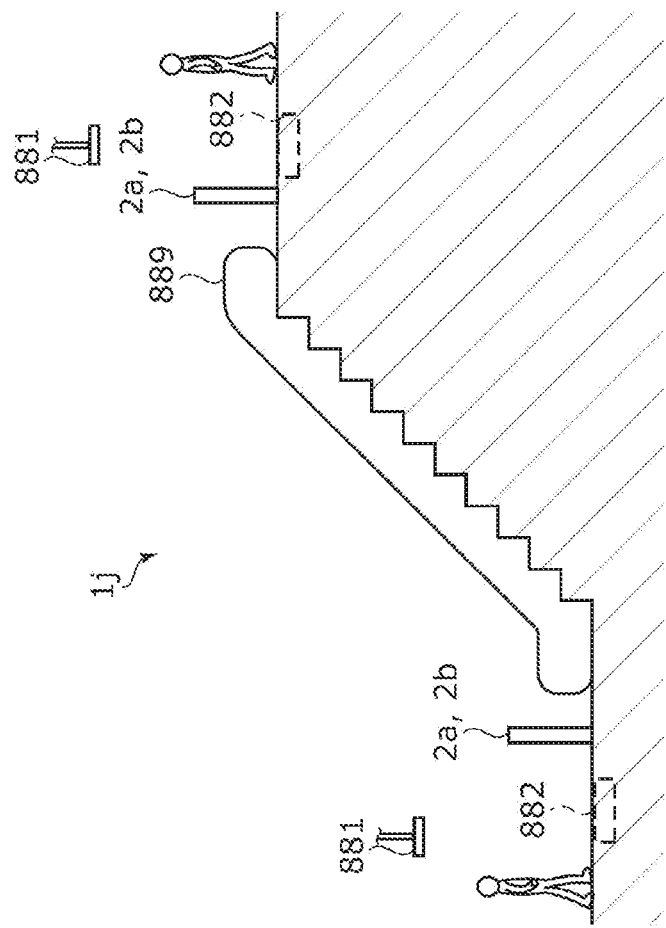
FIG. 33 is a schematic diagram illustrating a state in which the light beam emission system according to Embodiment 8 is disposed at escalators.

FIG. 33 is a schematic diagram illustrating a state in which light beam emission system 1j according to Embodiment 8 is disposed at escalator 889. FIG. 33 illustrates a state in which pairs of gate bodies are disposed at two locations, that is, the upper place and the lower place where people can ride escalators 889.

Figure 34:
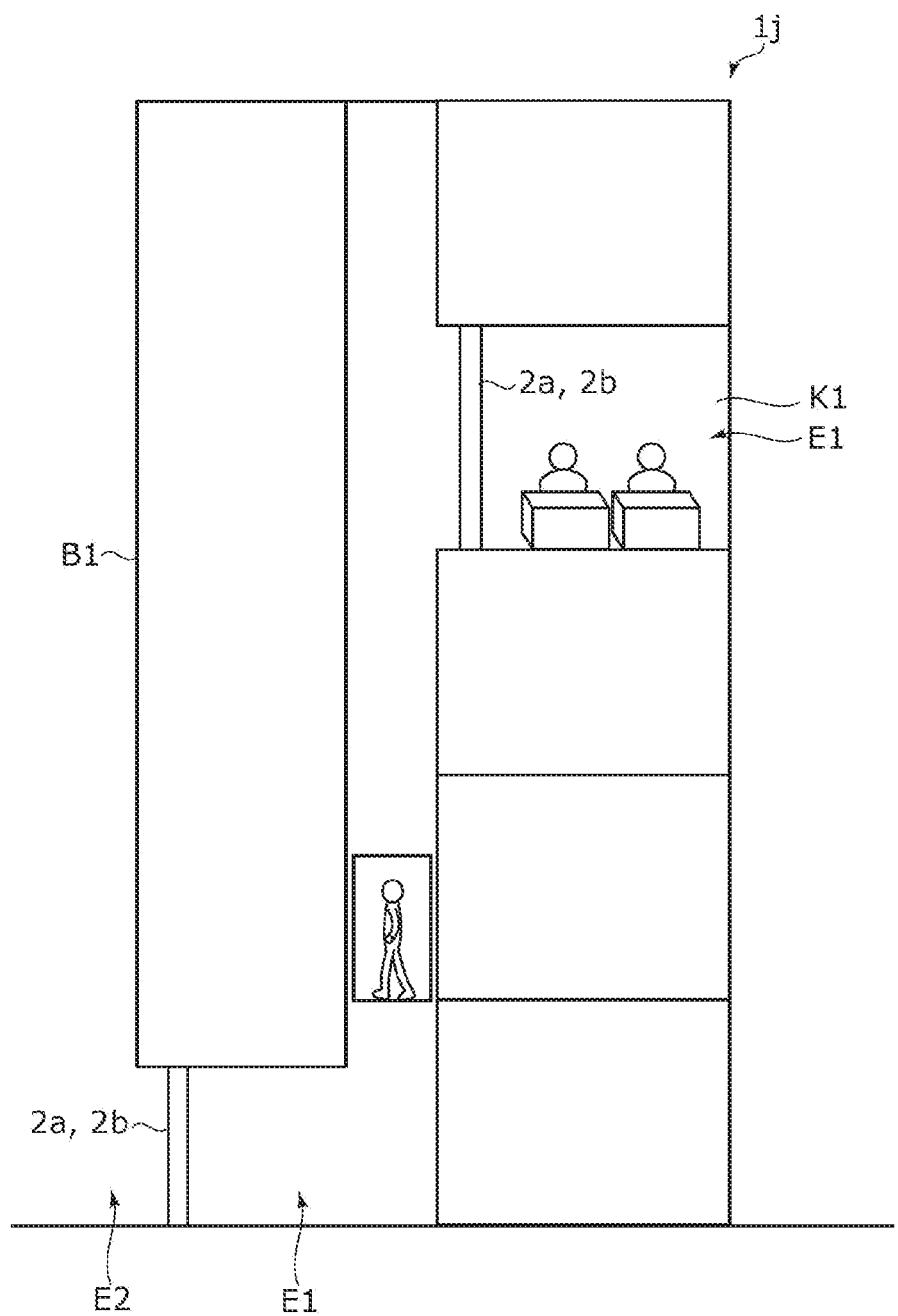
FIG. 34 is a schematic diagram illustrating a state in which the light beam emission system according to Embodiment 8 is disposed in a building.

FIG. 34 is a schematic diagram illustrating a state in which light beam emission system 1j according to Embodiment 8 is disposed in building B1. FIG. 34 illustrates a state in which pairs of gate bodies are disposed at two locations, that is, the entrance of building B1 and the entrance of room K1 in building B1. The inside of building B1 is restricted area E1 as compared to non-restricted area E2 that is the outside of building B1, and room K1 in building B1 is further restricted area E1 as compared to restricted area E1 inside building B1.

Figure 35:
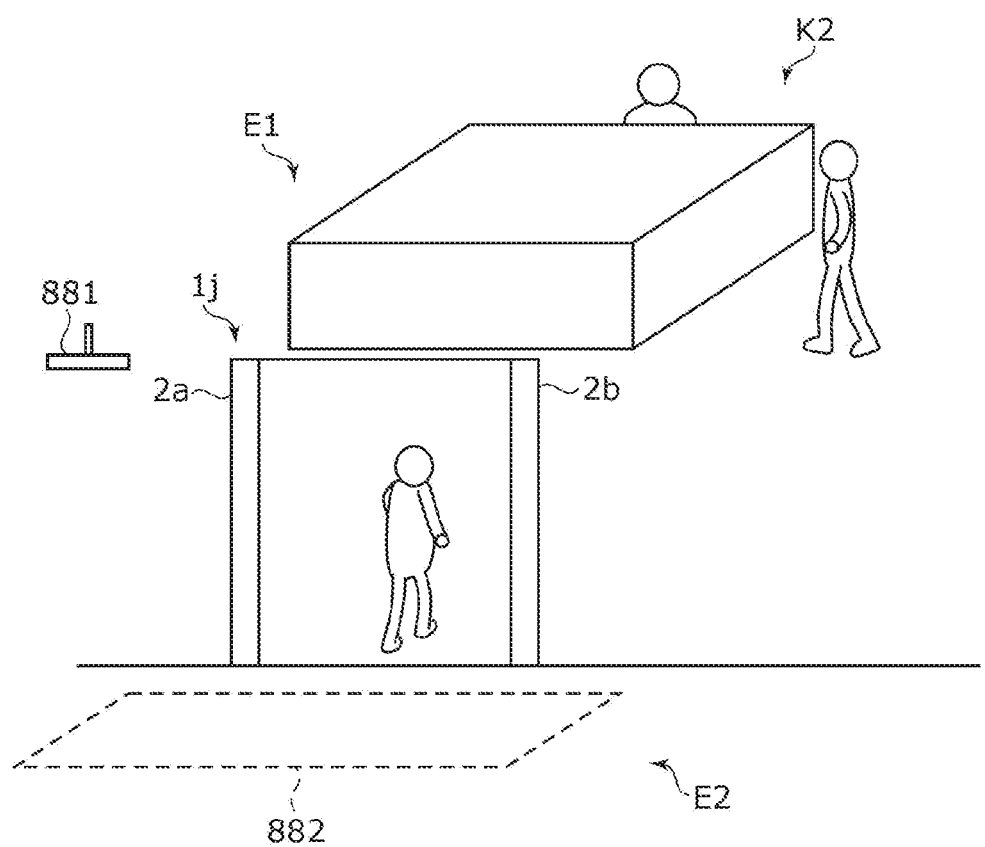
FIG. 35 is a schematic diagram illustrating a state in which the light beam emission system according to Embodiment 8 is disposed at the entrance of meeting room K2.

FIG. 35 is a schematic diagram illustrating a state in which light beam emission system 1j according to Embodiment 8 is disposed at the entrance of meeting room K2. FIG. 35 illustrates a state in which a pair of gate bodies are disposed at the entrance of meeting room K2.

In FIG. 30 to FIG. 32, the state in which aerosol is made visible by light beams is shown using dotted hatching.

Example 1 of Operation

Example 1 of operation of light beam emission system 1j according to the present embodiment is to be described.

FIG. 36 is a flowchart showing Example 1 of operation of light beam emission system 1j according to Embodiment 8.

Here, the case where an approaching object approaches first gate body 2a and second gate body 2b is assumed.

First, as illustrated in FIG. 36, detection system 2c of light beam emission system 1j detects an approaching object, such as a person, that approaches first gate body 2a and second gate body 2*b* (S181). Authenticator 881 of detection system 2*c* detects an approaching object if the approaching object reaches a range of a predetermined distance from authenticator 881.

Authenticator 881 checks whether to permit the approaching object to pass between first gate body 2*a* and second gate body 2*b* (S182). Specifically, authenticator 881 detects the approaching object based on an image, and permits or rejects passing of the approaching object by detecting the weight of the approaching object. Authenticator 881 permits the approaching object to pass between first gate body 2*a* and second gate body 2*b* when the first passing requirement and the second passing requirement are satisfied. On the other hand, authenticator 881 rejects passing of the approaching object between first gate body 2*a* and second gate body 2*b* when at least one of the first passing requirement or the second passing requirement is not satisfied.

When the result of checking in step S182 indicates that passing between first gate body 2*a* and second gate body 2*b* is permitted (Yes in S183), authenticator 881 may end processing. In this case, first gate body 2*a* and second gate body 2*b* may not operate.

When authenticator 881 rejects passing of the approaching object between first gate body 2*a* and second gate body 2*b*, based on the result of checking in step S182 (No in S183), authenticator 881 outputs an instruction to reject passing to each of first gate body 2*a* and second gate body 2*b*. Upon first gate body 2*a* and second gate body 2*b* obtaining the instruction to reject passing, blower 10 and aerosol generator are driven to form a plurality of flow paths of aerosol in the first direction (S184).

Since emitter 30 is driven, first gate body 2*a* emits a plurality of light beams along flow paths of aerosol using emitter (S185). Accordingly, the light beams clearly make the aerosol visible. Note that step S184 and step S185 may be performed concurrently.

For example, if the approaching object moves away from or comes too close to first gate body 2*a* and second gate body 2*b* as shown by S108 in FIG. 26A, first gate body 2*a* stops driving emitter 30 to stop emitting light beams (S186).

Further, first gate body 2*a* and second gate body 2*b* stop forming the flow paths in which aerosol flows by stopping driving blower 10 and aerosol generator 20 (S187). Note that step S186 and step S187 may be performed concurrently.

Then, light beam emission system 1*j* ends processing.

Example 2 of Operation

Example 2 of operation of light beam emission system 1*j* according to the present embodiment is to be described.

In Example 2 of operation, the same numeral is given to the same operation as that in Example 1 of operation, and description is omitted as appropriate.

FIG. 37 is a flowchart showing Example 2 of operation of light beam emission system 1*j* according to Embodiment 8.

First, as illustrated in FIG. 37, detection system 2*c* of light beam emission system 1*j* detects an approaching object, such as a person, that approaches first gate body 2*a* and second gate body 2*b* (S181).

Next, authenticator 881 of detection system 2*c* determines whether the direction in which the approaching object moves is toward one of the gate bodies (first gate body 2*a* or second gate body 2*b*) (S192). Thus, authenticator 881 determines whether the approaching object is approaching first gate body 2*a* or second gate body 2*b*. Authenticator 881 determines whether the approaching object reaches a range of a predetermined distance from first gate body 2*a* or second gate body 2*b*.

Authenticator 881 ends processing if the approaching object is not approaching first gate body 2*a* or second gate body 2*b* (No in S192).

Authenticator 881 performs the processing in steps S184 to S187 and ends processing if the approaching object is approaching first gate body 2*a* or second gate body 2*b* (Yes in S192).

[Operations and Effects]

The following describes operations and effects of light beam emission system 1*j* according to the present embodiment.

For example, it is not preferable to dispose a gate device that is a physical barrier such as an existing flapper gate at each of the places where people ride and get off an escalator, since it is highly dangerous. However, if an approaching object that does not satisfy a specific condition is to be prevented from coming close, there is no way to avoid its approach. Further, during a time period, such as a rush hour, in which many people are going back and forth, people cannot smoothly move near a gate device that includes a physical barrier at a main entrance of an office building, for instance. Accordingly, there has been a demand for a system that, only when an approaching object that satisfies a specific condition approaches, allows such an approaching object to readily pass through.

In view of this, light beam emission system 1*j* according to the present embodiment includes: first gate body 2*a* that includes blower 10 and emitter 30; second gate body 2*b* that collects the aerosol flowing in the flow path formed by blower 10, and is irradiated with the light beam emitted by emitter 30; and detection system 2*c* that detects an approaching object that approaches first gate body 2*a* and second gate body 2*b*. In first gate body 2*a*, when detection system 2*c* detects that the approaching object has reached a range of a predetermined distance from first gate body 2*a* and second gate body 2*b*, blower 10 forms the flow path in which the aerosol flows, and emitter 30 emits the light beam.

Further, a gate that is made visible to an approaching object that approaches first gate body 2*a* and second gate body 2*b* can be caused to appear. Thus, light beam emission system 1*j* allows a light beam to be clearly perceived. Accordingly, an approaching object that does not satisfy the specific condition can be prevented from passing between first gate body 2*a* and second gate body 2*b*. Further, an approaching object that satisfies the specific condition can readily pass through since no gate is formed.

In addition, first gate body 2*a* and second gate body 2*b* that allow passing only when an approaching object that satisfies the specific condition approaches are disposed, and thus such an approaching object can readily pass through. Accordingly, an area near first gate body 2*a* and second gate body 2*b* is less likely to get crowded. If an approaching object does not satisfy the specific condition, a psychological gate is created using a light beam, so that the approaching object can be prevented from passing through.

In light beam emission system 1*j* according to the present embodiment, first gate body 2*a* and second gate body 2*b* are disposed at a boundary between restricted area E1 and non-restricted area E2, restricted area E1 being an area that a specific approaching object is allowed to enter, non-restricted area E2 being an area that no approaching object is prevented from entering. Detection system 2*c* includes weight detector 882 that detects a weight of an approaching object. Weight detector 882 is disposed in non-restricted area E2.

According to this, the weight of an approaching object that moves from non-restricted area E2 toward restricted area E1 and approaches first gate body 2a and second gate body 2b can be detected. Accordingly, for example, if the weight of an approaching object is greater than or equal to a predetermined weight, the approaching object can be prevented from passing through for not satisfying a passing requirement. Further, if the weight of the approaching object is less than the predetermined weight, the approaching object can be permitted to pass through since the passing requirement is satisfied.

The present embodiment also achieves similar operations and effects to those in Embodiment 7, for instance.

[Variation of Embodiment 8]

A configuration of light beam emission system 1j according to this variation is to be described.

Figure 39:
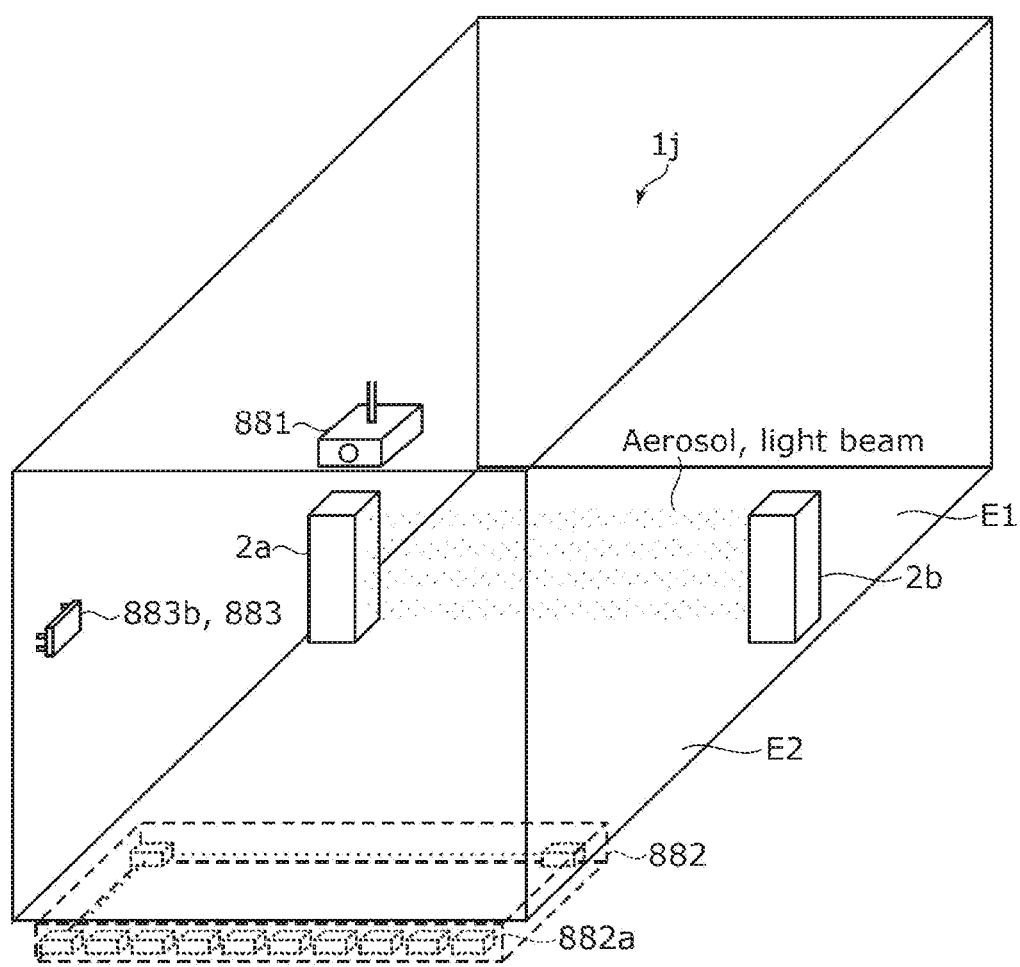
FIG. 39 is a perspective view illustrating the light beam emission system according to the variation of Embodiment 8.

FIG. 38 is a block diagram illustrating light beam emission system 1j according to the variation of Embodiment 8. FIG. 39 is a perspective view illustrating light beam emission system 1j according to the variation of Embodiment 8.

This variation is different from Embodiment 8 in that tag authenticator 883 is included instead of authenticator 881. The other configuration of this variation is similar to, for instance, Embodiment 8 unless otherwise stated in particular, and the same sign is given to the same configuration while a detailed description of the same configuration is omitted.

Detection system 2d includes tag authenticator 883, in addition to weight detector 882. Note that a plurality of tag authenticators 883 may be included, and thus the number thereof is not particularly limited.

Tag authenticator 883 is an RFID that authenticates an approaching object that approaches first gate body 2a and second gate body 2b. Tag authenticator 883 includes tag 883a and reader 883b. Tag 883a is a radio frequency (RF) tag that an approaching object has. Tag 883a is provided in a card, a coin, or accessory, for instance. Reader 883b is a reader that can obtain information stored in tag 883a contactlessly from tag 883a. Reader 883b can obtain information from a plurality of tags 883a.

Tag authenticator 883 determines whether tag 883a is registered in an allow list in memory of reader 883b, through communication between tag 883a and reader 883b. If tag 883a is registered in the allow list, tag authenticator 883 determines that a person having tag 883a satisfies a first passing requirement. If tag 883a is not registered in the allow list, tag authenticator 883 determines that the person does not satisfy the first passing requirement, and thus rejects passing of the person. Note that tag authenticator 883 and authenticator 881 may be used in light beam emission system 1j.

Note that tag authenticator 883 may determine whether tag 883a is registered in an attention required list in the memory of reader 883b. If tag 883a is not registered in the attention required list, a person having tag 883a satisfies a first passing requirement. If tag 883a is registered in the attention required list, the person does not satisfy the first passing requirement, and thus tag authenticator 883 rejects passing of the person.

In the present embodiment, reader 883b is disposed on the wall of a passage, but may be disposed in/on the floor or a ceiling, for instance. Note that reader 883b and tag 883a can write information.

Examples of Application

Figure 40:
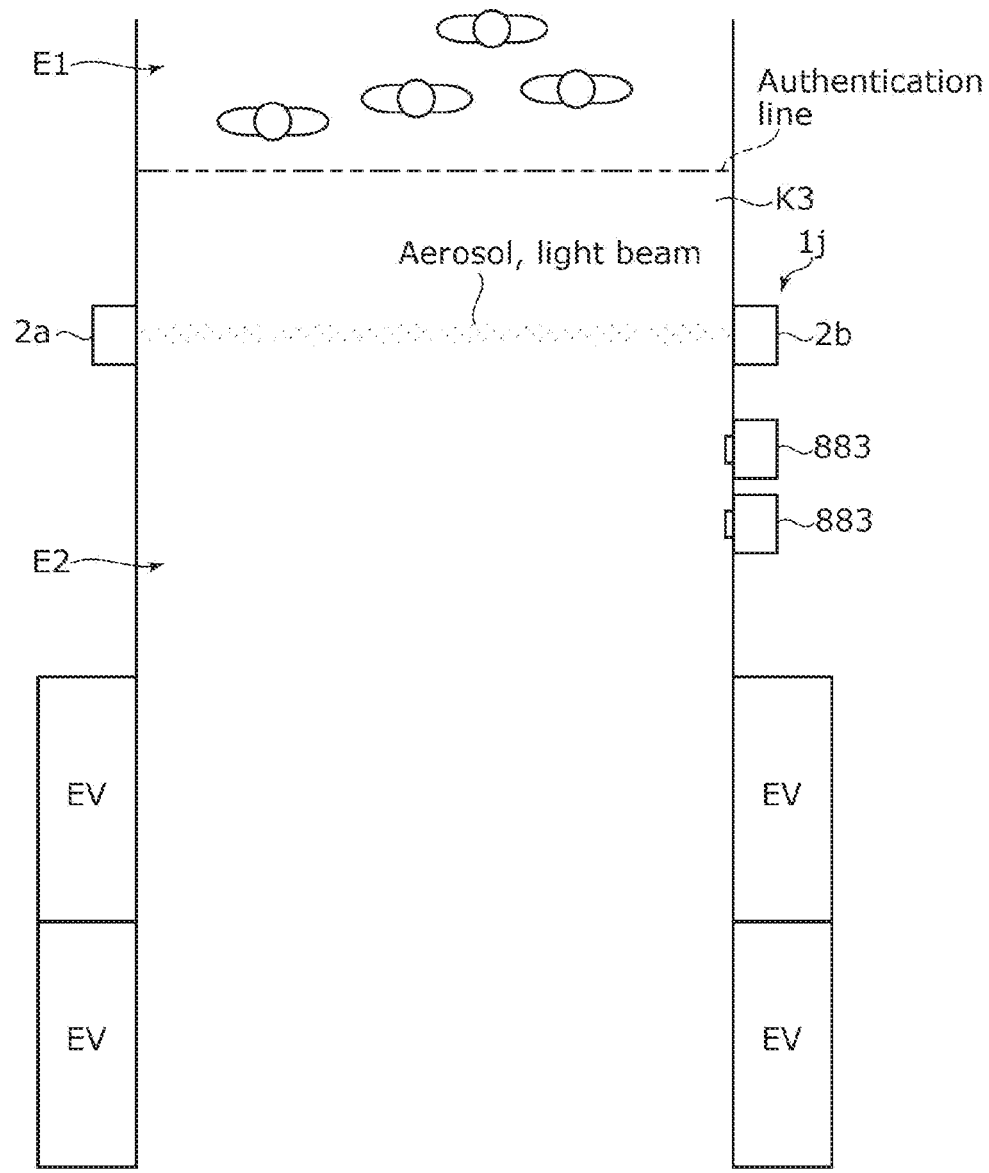
FIG. 40 is a schematic diagram illustrating a state in which the light beam emission system according to the variation of Embodiment 8 is disposed at the entrance of an elevator hall.

FIG. 40 is a schematic diagram illustrating a state in which light beam emission system 1j according to this variation of Embodiment 8 is disposed at the entrance of elevator hall K3 where elevators EV are disposed. FIG. 40 illustrates a state in which a pair of gate bodies are disposed at the entrance of the elevator hall. In FIG. 40, when an approaching object reaches an authentication line indicated by the two-dot chain line (a range of a predetermined distance), tag authenticator 883 detects an approach of the approaching object. Furthermore, tag authenticator 883 detects the number of approaching bodies that have reached the authentication line. Note that FIG. 38 omits weight detector 882, yet light beam emission system 1j may not include weight detector 882.

Figure 41:
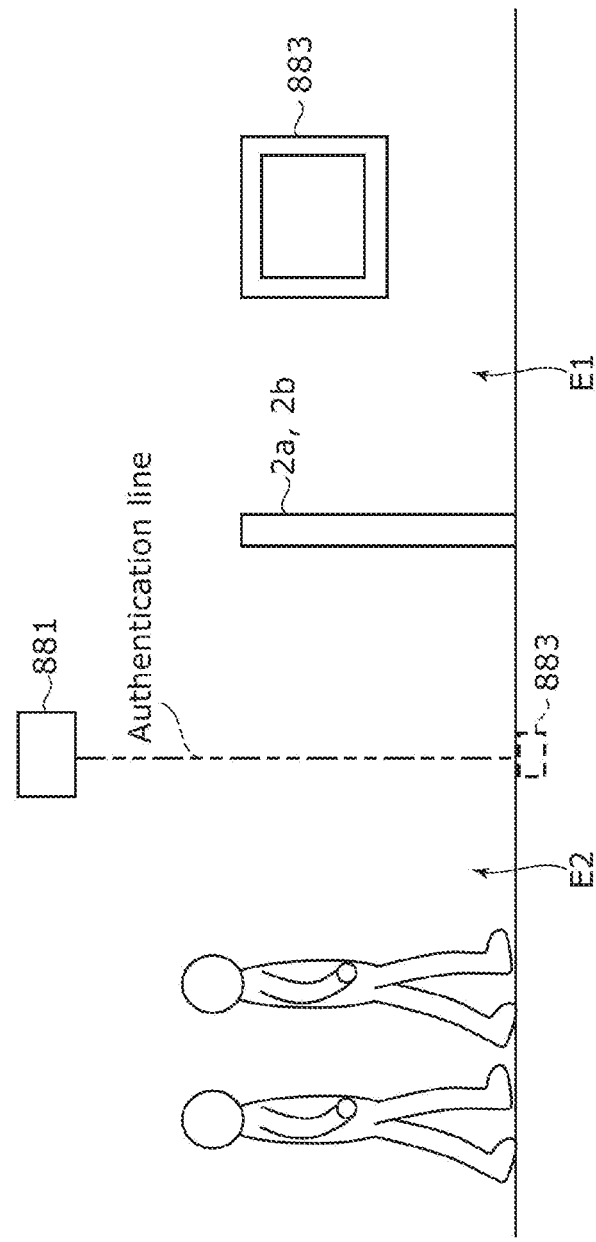
FIG. 41 is a schematic diagram illustrating the case where tag authenticators of the light beam emission system according to the variation of Embodiment 8 are disposed in the floor.

FIG. 41 is a schematic diagram illustrating the case where tag authenticators 883 of light beam emission system 1j according to the variation of Embodiment 8 are disposed in/on the floor and the wall. In FIG. 41, one of tag authenticators 883 is disposed in non-restricted area E2, and the other of tag authenticators 883 is disposed in restricted area E1. Note that FIG. 41 omits weight detector 882, yet light beam emission system 1j may not include weight detector 882.

This variation also achieves similar operations and effects to those in Embodiment 8, for instance.

[Other Variations Etc.]

The above has described the present disclosure based on Embodiments 1 to 7 and the variations of Embodiments 1, 4, and 6, yet the present disclosure is not limited to Embodiments 1 to 7 and the variations of Embodiments 1, 4, and 6.

For example, the blowers in Embodiments 1 to 7 and the variations of Embodiments 1, 4, and 6 described above may each include a sound reducer that reduces sound of an air current generated by sending air. The sound reducer may be a sound reduction device (a silencer) made of a fibrous material having a high sound reducing property or an exhaust hole muffler disposed in the space of the first barrel.

In each of the light beam emission systems according to Embodiments 1 to 7 and the variations of Embodiments 1, 4, and 6 described above, the blower, the aerosol generator, the emitter, the controller, the driver, the beam splitter, and the optical element, for instance, may be different and separate devices.

A program that implements the light beam emission systems according to Embodiments 1 to 7 and the variations of Embodiments 1, 4, and 6 described above are typically achieved as large scale integrated circuits (LSIs). These may be each achieved as a single chip or may be achieved as a single chip that includes some or all of the elements.

Furthermore, the way to achieve integration is not limited to LSIs, and implementation through a dedicated circuit or a general-purpose processor is also possible. A field programmable gate array (FPGA) that can be programmed after manufacturing an LSI or a reconfigurable controller that allows re-configuration of the connection and configuration of circuit cells inside an LSI may be used.

Note that in Embodiments 1 to 7 and the variations of Embodiments 1, 4, and 6 described above, each of the elements may be configured of dedicated hardware, or may be implemented by executing a software program suitable for the element. Each element may be implemented by a program executor such as a central processing unit (CPU) or a controller reading and executing a software program recorded on a recording medium such as a hard disk or semiconductor memory.

The numerals used above are all examples in order to specifically describe the present disclosure, and thus the embodiments of the present disclosure are not limited to the exemplified numerals.

Split of functional blocks in the block diagrams is an example, and thus a plurality of functional blocks may be achieved as one functional block, one functional block may be split into a plurality of blocks, or some functions may be transferred to another functional block. Single hardware or software may process similar functions of a plurality of functional blocks, in parallel or by time division.

The order in which steps included in a flowchart are performed is an example for specifically describing the present disclosure, and the order other than the above may be applied. Further, one or more of the steps may be performed simultaneously (in parallel) with other steps.

The present disclosure also includes embodiments as a result of adding, to Embodiments 1 to 7 and the variations of Embodiments 1, 4, and 6, various modifications that may be conceived by those skilled in the art, and embodiments achieved by combining elements and functions in Embodiments 1 to 7 and the variations of Embodiments 1, 4, and 6 in any manner without departing from the scope of the present disclosure.

INDUSTRIAL APPLICABILITY

The light beam emission system according to the present disclosure is applicable to a ticket gate serving as a gate, for example.

What is claimed is:

1. A light beam emission system, comprising:
    a blower that forms a flow path in which aerosol flows;
    an emitter that emits a laser beam; and
    a light guide that guides the laser beam to the flow path in which the aerosol flows, the light guide being hollow,
    wherein at least a part of the laser beam passing through the light guide and guided to the flow path propagates along the flow path of the aerosol.

2. The light beam emission system according to claim 1, wherein the laser beam passes through an end portion of the light guide, and travels straight in a direction in which the flow path extends.

3. The light beam emission system according to claim 1, wherein the light guide extends from a light emitting surface of the emitter in a direction in which the aerosol flows, and passes through the blower.

4. The light beam emission system according to claim 1, wherein the blower includes a first barrel that includes:
    a first opening through which the aerosol or air is sucked; and
    a second opening from which the aerosol or the air sucked through the first opening is discharged to the flow path, and
    the light guide passes through the first barrel from the first opening to the second opening.

5. The light beam emission system according to claim 1, further comprising:
    an aerosol generator that generates the aerosol,
    wherein the aerosol generator includes a second barrel that guides the aerosol to the flow path, and
    the light guide passes through the second barrel.

6. The light beam emission system according to claim 5, wherein the light guide passes through the second barrel from an insertion hole of the second barrel to a discharge port of the second barrel, and protrudes from a second opening.

7. The light beam emission system according to claim 5, wherein the light guide is connected to an insertion hole of the second barrel.

8. A method for controlling a light beam emission system, the method comprising:
    forming, by a blower, a flow path in which aerosol flows;
    emitting, by an emitter, a laser beam; and
    guiding, by a light guide, the laser beam to the flow path in which the aerosol flows, the light guide being hollow,
    wherein at least a part of the laser beam passing through the light guide and guided to the flow path propagates along the flow path of the aerosol.

* * * * *